(12) United States Patent
Barday et al.

(10) Patent No.: US 11,182,501 B2
(45) Date of Patent: *Nov. 23, 2021

(54) DATA PROCESSING SYSTEMS FOR FULFILLING DATA SUBJECT ACCESS REQUESTS AND RELATED METHODS

(71) Applicant: OneTrust, LLC, Atlanta, GA (US)

(72) Inventors: Kabir A. Barday, Atlanta, GA (US); Jason L. Sabourin, Brookhaven, GA (US); Jonathan Blake Brannon, Smyrna, GA (US); Mihir S. Karanjkar, Marietta, GA (US); Kevin Jones, Atlanta, GA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/201,040

(22) Filed: Mar. 15, 2021

(65) Prior Publication Data

US 2021/0286897 A1  Sep. 16, 2021

Related U.S. Application Data

(63) Continuation of application No. 17/019,771, filed on Sep. 14, 2020, now Pat. No. 10,949,567, which is a
(Continued)

(51) Int. Cl.
*G06F 9/44* (2018.01)
*G06F 21/62* (2013.01)
(Continued)

(52) U.S. Cl.
CPC .......... *G06F 21/6245* (2013.01); *G06F 15/76* (2013.01); *G06F 21/31* (2013.01);
(Continued)

(58) Field of Classification Search
None
See application file for complete search history.

(56) References Cited

U.S. PATENT DOCUMENTS

| 4,536,866 A | 8/1985 | Jerome et al. |
| 5,193,162 A | 3/1993 | Bordsen et al. |

(Continued)

FOREIGN PATENT DOCUMENTS

| CN | 111496802 | 8/2020 |
| CN | 112115859 | 12/2020 |

(Continued)

OTHER PUBLICATIONS

Srinivasan et al, "Descriptive Data Analysis of File Transfer Data," ACM, pp. 1-8 (Year: 2014).
(Continued)

*Primary Examiner* — Anna C Deng
(74) *Attorney, Agent, or Firm* — Brient IP Law, LLC

(57) ABSTRACT

Responding to a data subject access request includes receiving the request and identifying the requestor and source. In response to identifying the requestor and source, a computer processor determines whether the data subject access request is subject to fulfillment constraints, including whether the requestor or source is malicious. If so, then the computer processor denies the request or requests a processing fee prior to fulfillment. If not, then the computer processor fulfills the request.

20 Claims, 52 Drawing Sheets

Related U.S. Application Data continuation of application No. 16/786,196, filed on Feb. 10, 2020, now Pat. No. 10,776,515, which is a continuation of application No. 16/512,011, filed on Jul. 15, 2019, now Pat. No. 10,558,821, which is a continuation of application No. 16/226,290, filed on Dec. 19, 2018, now Pat. No. 10,354,089, which is a continuation of application No. 16/054,672, filed on Aug. 3, 2018, now Pat. No. 10,169,609, which is a continuation-in-part of application No. 15/996,208, filed on Jun. 1, 2018, now Pat. No. 10,181,051, which is a continuation-in-part of application No. 15/853,674, filed on Dec. 22, 2017, now Pat. No. 10,019,597, which is a continuation-in-part of application No. 15/619,455, filed on Jun. 10, 2017, now Pat. No. 9,851,966, which is a continuation-in-part of application No. 15/254,901, filed on Sep. 1, 2016, now Pat. No. 9,729,583.

(60) Provisional application No. 62/360,123, filed on Jul. 8, 2016, provisional application No. 62/353,802, filed on Jun. 23, 2016, provisional application No. 62/348,695, filed on Jun. 10, 2016, provisional application No. 62/541,613, filed on Aug. 4, 2017, provisional application No. 62/537,839, filed on Jul. 27, 2017, provisional application No. 62/547,530, filed on Aug. 18, 2017.

(51) Int. Cl.
| | | |
|---|---|---|
| *H04L 29/06* | (2006.01) | |
| *H04L 12/24* | (2006.01) | |
| *G06F 15/76* | (2006.01) | |
| *G06F 21/55* | (2013.01) | |
| *G06F 21/31* | (2013.01) | |
| *H04L 29/08* | (2006.01) | |

(52) U.S. Cl.
CPC ........ *G06F 21/552* (2013.01); *H04L 41/5029* (2013.01); *H04L 41/5064* (2013.01); *H04L 63/102* (2013.01); *H04L 63/107* (2013.01); *H04L 63/108* (2013.01); *H04L 63/12* (2013.01); *H04L 63/20* (2013.01); *G06F 2221/2103* (2013.01); *G06F 2221/2111* (2013.01); *G06F 2221/2137* (2013.01); *H04L 67/20* (2013.01)

(56) References Cited

U.S. PATENT DOCUMENTS

| | | | |
|---|---|---|---|
| 5,276,735 | A | 1/1994 | Boebert et al. |
| 5,329,447 | A | 7/1994 | Leedom, Jr. |
| 5,404,299 | A | 4/1995 | Tsurubayashi et al. |
| 5,535,393 | A | 7/1996 | Reeve et al. |
| 5,560,005 | A | 9/1996 | Hoover et al. |
| 5,668,986 | A | 9/1997 | Nilsen et al. |
| 5,761,529 | A | 6/1998 | Raji |
| 5,764,906 | A | 6/1998 | Edelstein et al. |
| 5,872,973 | A | 2/1999 | Mitchell et al. |
| 5,913,214 | A | 6/1999 | Madnick et al. |
| 6,016,394 | A | 1/2000 | Walker |
| 6,122,627 | A | 9/2000 | Carey et al. |
| 6,148,342 | A | 11/2000 | Ho |
| 6,240,416 | B1 | 5/2001 | Immon et al. |
| 6,253,203 | B1 | 6/2001 | Oflaherty et al. |
| 6,263,335 | B1 | 7/2001 | Paik et al. |
| 6,272,631 | B1 | 8/2001 | Thomlinson et al. |
| 6,275,824 | B1 | 8/2001 | Oflaherty et al. |
| 6,282,548 | B1 | 8/2001 | Burner et al. |
| 6,363,488 | B1 | 3/2002 | Ginter et al. |
| 6,374,237 | B1 | 4/2002 | Reese |
| 6,374,252 | B1 | 4/2002 | Althoff et al. |
| 6,408,336 | B1 | 6/2002 | Schneider et al. |
| 6,427,230 | B1 | 7/2002 | Goiffon et al. |
| 6,442,688 | B1 | 8/2002 | Moses et al. |
| 6,446,120 | B1 | 9/2002 | Dantressangle |
| 6,463,488 | B1 | 10/2002 | San Juan |
| 6,484,180 | B1 | 11/2002 | Lyons et al. |
| 6,519,571 | B1 | 2/2003 | Guheen et al. |
| 6,591,272 | B1 | 7/2003 | Williams |
| 6,601,233 | B1 | 7/2003 | Underwood |
| 6,606,744 | B1 | 8/2003 | Mikurak |
| 6,611,812 | B2 | 8/2003 | Hurtado et al. |
| 6,625,602 | B1 | 9/2003 | Meredith et al. |
| 6,629,081 | B1 | 9/2003 | Cornelius et al. |
| 6,633,878 | B1 | 10/2003 | Underwood |
| 6,662,192 | B1 | 12/2003 | Rebane |
| 6,662,357 | B1 | 12/2003 | Bowman-Amuah |
| 6,697,824 | B1 | 2/2004 | Bowman-Amuah |
| 6,725,200 | B1 | 4/2004 | Rost |
| 6,732,109 | B2 | 5/2004 | Lindberg et al. |
| 6,755,344 | B1 | 6/2004 | Mollett et al. |
| 6,757,685 | B2 | 6/2004 | Raffaele et al. |
| 6,757,888 | B1 | 6/2004 | Knutson et al. |
| 6,816,944 | B2 | 11/2004 | Peng |
| 6,826,693 | B1 | 11/2004 | Yoshida et al. |
| 6,886,101 | B2 | 4/2005 | Glazer et al. |
| 6,901,346 | B2 | 5/2005 | Tracy et al. |
| 6,904,417 | B2 | 6/2005 | Clayton et al. |
| 6,925,443 | B1 | 8/2005 | Baggett, Jr. et al. |
| 6,938,041 | B1 | 8/2005 | Brandow et al. |
| 6,978,270 | B1 | 12/2005 | Carty et al. |
| 6,980,987 | B2 | 12/2005 | Kaminer |
| 6,983,221 | B2 | 1/2006 | Tracy et al. |
| 6,985,887 | B1 | 1/2006 | Sunstein et al. |
| 6,990,454 | B2 | 1/2006 | McIntosh |
| 6,993,448 | B2 | 1/2006 | Tracy et al. |
| 6,993,495 | B2 | 1/2006 | Smith, Jr. et al. |
| 6,996,807 | B1 | 2/2006 | Vardi et al. |
| 7,003,560 | B1 | 2/2006 | Mullen et al. |
| 7,003,662 | B2 | 2/2006 | Genty et al. |
| 7,013,290 | B2 | 3/2006 | Ananian |
| 7,017,105 | B2 | 3/2006 | Flanagin et al. |
| 7,039,594 | B1 | 5/2006 | Gersting |
| 7,039,654 | B1 | 5/2006 | Eder |
| 7,047,517 | B1 | 5/2006 | Brown et al. |
| 7,051,036 | B2 | 5/2006 | Rosnow et al. |
| 7,051,038 | B1 | 5/2006 | Yeh et al. |
| 7,058,970 | B2 | 6/2006 | Shaw |
| 7,069,427 | B2 | 6/2006 | Adler et al. |
| 7,076,558 | B1 | 7/2006 | Dunn |
| 7,095,854 | B1 | 8/2006 | Ginter et al. |
| 7,100,195 | B1 | 8/2006 | Underwood |
| 7,120,800 | B2 | 10/2006 | Ginter et al. |
| 7,124,101 | B1 | 10/2006 | Mikurak |
| 7,127,705 | B2 | 10/2006 | Christfort et al. |
| 7,127,741 | B2 | 10/2006 | Bandini et al. |
| 7,133,845 | B1 | 11/2006 | Ginter et al. |
| 7,139,999 | B2 | 11/2006 | Bowman-Amuah |
| 7,143,091 | B2 | 11/2006 | Charnock et al. |
| 7,167,842 | B1 | 1/2007 | Josephson, II et al. |
| 7,167,844 | B1 | 1/2007 | Leong et al. |
| 7,171,379 | B2 | 1/2007 | Menninger et al. |
| 7,181,438 | B1 | 2/2007 | Szabo |
| 7,203,929 | B1 | 4/2007 | Vinodkrishnan et al. |
| 7,213,233 | B1 | 5/2007 | Vinodkrishnan et al. |
| 7,216,340 | B1 | 5/2007 | Vinodkrishnan et al. |
| 7,219,066 | B2 | 5/2007 | Parks et al. |
| 7,223,234 | B2 | 5/2007 | Stupp et al. |
| 7,225,460 | B2 | 5/2007 | Barzilai et al. |
| 7,234,065 | B2 * | 6/2007 | Breslin ............... G06Q 10/10 713/165 |
| 7,247,625 | B2 | 7/2007 | Zhang et al. |
| 7,251,624 | B1 | 7/2007 | Lee et al. |
| 7,260,830 | B2 | 8/2007 | Sugimoto |
| 7,266,566 | B1 | 9/2007 | Kennaley et al. |
| 7,272,818 | B2 | 9/2007 | Ishimitsu et al. |
| 7,275,063 | B2 | 9/2007 | Horn |
| 7,281,020 | B2 | 10/2007 | Fine |

(56) References Cited

U.S. PATENT DOCUMENTS

| | | |
|---|---|---|
| 7,284,232 B1 | 10/2007 | Bates et al. |
| 7,284,271 B2 | 10/2007 | Lucovsky et al. |
| 7,287,280 B2 | 10/2007 | Young |
| 7,290,275 B2 | 10/2007 | Baudoin et al. |
| 7,302,569 B2 | 11/2007 | Betz et al. |
| 7,313,575 B2 | 12/2007 | Carr et al. |
| 7,313,699 B2 | 12/2007 | Koga |
| 7,313,825 B2 | 12/2007 | Redlich et al. |
| 7,315,849 B2 | 1/2008 | Bakalash et al. |
| 7,322,047 B2 | 1/2008 | Redlich et al. |
| 7,330,850 B1 | 2/2008 | Seibel et al. |
| 7,340,447 B2 | 3/2008 | Ghatare |
| 7,340,776 B2 | 3/2008 | Zobel et al. |
| 7,343,434 B2 | 3/2008 | Kapoor et al. |
| 7,346,518 B1 | 3/2008 | Frank et al. |
| 7,353,204 B2 | 4/2008 | Liu |
| 7,356,559 B1 | 4/2008 | Jacobs et al. |
| 7,367,014 B2 | 4/2008 | Griffin |
| 7,370,025 B1 | 5/2008 | Pandit |
| 7,376,835 B2 | 5/2008 | Olkin et al. |
| 7,380,120 B1 | 5/2008 | Garcia |
| 7,383,570 B2 | 6/2008 | Pinkas et al. |
| 7,391,854 B2 | 6/2008 | Salonen et al. |
| 7,398,393 B2 | 7/2008 | Mont et al. |
| 7,401,235 B2 | 7/2008 | Mowers et al. |
| 7,403,942 B1 | 7/2008 | Bayliss |
| 7,409,354 B2 | 8/2008 | Putnam et al. |
| 7,412,402 B2 | 8/2008 | Cooper |
| 7,424,680 B2 | 9/2008 | Carpenter |
| 7,430,585 B2 | 9/2008 | Sibert |
| 7,454,457 B1 | 11/2008 | Lowery et al. |
| 7,454,508 B2 | 11/2008 | Mathew et al. |
| 7,478,157 B2 | 1/2009 | Bohrer et al. |
| 7,480,755 B2 | 1/2009 | Herrell et al. |
| 7,487,170 B2 | 2/2009 | Stevens |
| 7,493,282 B2 | 2/2009 | Manly et al. |
| 7,512,987 B2 | 3/2009 | Williams |
| 7,516,882 B2 | 4/2009 | Cucinotta |
| 7,523,053 B2 | 4/2009 | Pudhukottai et al. |
| 7,529,836 B1 | 5/2009 | Bolen |
| 7,548,968 B1 | 6/2009 | Bura et al. |
| 7,552,480 B1 | 6/2009 | Voss |
| 7,562,339 B2 | 7/2009 | Racca et al. |
| 7,567,541 B2 | 7/2009 | Karimi et al. |
| 7,584,505 B2 | 9/2009 | Mondri et al. |
| 7,587,749 B2 | 9/2009 | Leser et al. |
| 7,590,705 B2 | 9/2009 | Mathew et al. |
| 7,590,972 B2 | 9/2009 | Axelrod et al. |
| 7,603,356 B2 | 10/2009 | Schran et al. |
| 7,606,783 B1 | 10/2009 | Carter |
| 7,606,790 B2 | 10/2009 | Levy |
| 7,607,120 B2 | 10/2009 | Sanyal et al. |
| 7,613,700 B1 | 11/2009 | Lobo et al. |
| 7,617,136 B1 | 11/2009 | Lessing et al. |
| 7,617,167 B2 | 11/2009 | Griffis et al. |
| 7,620,644 B2 | 11/2009 | Cote et al. |
| 7,630,874 B2 | 12/2009 | Fables et al. |
| 7,630,998 B2 | 12/2009 | Zhou et al. |
| 7,636,742 B1 | 12/2009 | Olavarrieta et al. |
| 7,640,322 B2 | 12/2009 | Wendkos et al. |
| 7,650,497 B2 | 1/2010 | Thornton et al. |
| 7,653,592 B1 | 1/2010 | Flaxman et al. |
| 7,657,476 B2 | 2/2010 | Barney |
| 7,657,694 B2 | 2/2010 | Mansell et al. |
| 7,665,073 B2 | 2/2010 | Meijer et al. |
| 7,665,125 B2 | 2/2010 | Heard et al. |
| 7,668,947 B2 | 2/2010 | Hutchinson et al. |
| 7,673,282 B2 | 3/2010 | Amaru et al. |
| 7,681,034 B1 | 3/2010 | Lee et al. |
| 7,685,561 B2 | 3/2010 | Deem et al. |
| 7,685,577 B2 | 3/2010 | Pace et al. |
| 7,693,593 B2 | 4/2010 | Ishibashi et al. |
| 7,698,398 B1 | 4/2010 | Lai |
| 7,707,224 B2 | 4/2010 | Chastagnol et al. |
| 7,712,029 B2 | 5/2010 | Ferreira et al. |
| 7,716,242 B2 | 5/2010 | Pae et al. |
| 7,725,474 B2 | 5/2010 | Tamai et al. |
| 7,725,875 B2 | 5/2010 | Waldrep |
| 7,729,940 B2 | 6/2010 | Harvey et al. |
| 7,730,142 B2 | 6/2010 | Levasseur et al. |
| 7,752,124 B2 | 7/2010 | Green et al. |
| 7,756,826 B2 | 7/2010 | Bots et al. |
| 7,756,987 B2 | 7/2010 | Wang et al. |
| 7,774,745 B2 | 8/2010 | Fildebrandt et al. |
| 7,788,212 B2 | 8/2010 | Beckmann et al. |
| 7,788,222 B2 | 8/2010 | Shah et al. |
| 7,788,632 B2 | 8/2010 | Kuester et al. |
| 7,788,726 B2 | 8/2010 | Teixeira |
| 7,801,758 B2 | 9/2010 | Gracie et al. |
| 7,801,826 B2 | 9/2010 | Labrou et al. |
| 7,822,620 B2 | 10/2010 | Dixon et al. |
| 7,827,523 B2 | 11/2010 | Ahmed et al. |
| 7,844,640 B2 | 11/2010 | Bender et al. |
| 7,849,143 B2 | 12/2010 | Vuong |
| 7,853,468 B2 | 12/2010 | Callahan et al. |
| 7,853,470 B2 | 12/2010 | Sonnleithner et al. |
| 7,853,925 B2 | 12/2010 | Kemmler |
| 7,870,540 B2 | 1/2011 | Zare et al. |
| 7,870,608 B2 | 1/2011 | Shraim et al. |
| 7,873,541 B1 | 1/2011 | Klar et al. |
| 7,877,327 B2 | 1/2011 | Gwiazda et al. |
| 7,877,812 B2 | 1/2011 | Koved et al. |
| 7,885,841 B2 | 2/2011 | King |
| 7,895,260 B2 | 2/2011 | Archer et al. |
| 7,904,487 B2 | 3/2011 | Ghatare |
| 7,917,888 B2 | 3/2011 | Chong et al. |
| 7,917,963 B2 | 3/2011 | Goyal et al. |
| 7,921,152 B2 | 4/2011 | Ashley et al. |
| 7,930,197 B2 | 4/2011 | Ozzie et al. |
| 7,930,753 B2 | 4/2011 | Mellinger et al. |
| 7,953,725 B2 | 5/2011 | Burris et al. |
| 7,954,150 B2 | 5/2011 | Croft et al. |
| 7,958,087 B2 | 6/2011 | Blumenau |
| 7,958,494 B2 | 6/2011 | Chaar et al. |
| 7,962,900 B2 | 6/2011 | Barraclough et al. |
| 7,966,310 B2 | 6/2011 | Sullivan et al. |
| 7,966,599 B1 | 6/2011 | Malasky et al. |
| 7,966,663 B2 | 6/2011 | Strickland et al. |
| 7,975,000 B2 | 7/2011 | Dixon et al. |
| 7,991,559 B2 | 8/2011 | Dzekunov et al. |
| 7,996,372 B2 | 8/2011 | Rubel, Jr. |
| 8,010,612 B2 | 8/2011 | Costea et al. |
| 8,010,720 B2 | 8/2011 | Iwaoka et al. |
| 8,019,881 B2 | 9/2011 | Sandhu et al. |
| 8,020,206 B2 | 9/2011 | Hubbard et al. |
| 8,024,384 B2 | 9/2011 | Prabhakar et al. |
| 8,032,721 B2 | 10/2011 | Murai |
| 8,037,409 B2 | 10/2011 | Jacob et al. |
| 8,041,913 B2 | 10/2011 | Wang |
| 8,069,161 B2 | 11/2011 | Bugir et al. |
| 8,069,471 B2 | 11/2011 | Boren |
| 8,082,539 B1 | 12/2011 | Schelkogonov |
| 8,095,923 B2 | 1/2012 | Harvey et al. |
| 8,099,709 B2 | 1/2012 | Baikov et al. |
| 8,103,962 B2 | 1/2012 | Embley et al. |
| 8,117,441 B2 | 2/2012 | Kurien et al. |
| 8,135,815 B2 | 3/2012 | Mayer |
| 8,146,054 B2 | 3/2012 | Baker et al. |
| 8,146,074 B2 | 3/2012 | Ito et al. |
| 8,150,717 B2 | 4/2012 | Whitmore |
| 8,156,105 B2 | 4/2012 | Altounian et al. |
| 8,156,158 B2 | 4/2012 | Rolls et al. |
| 8,166,406 B1 | 4/2012 | Goldfeder et al. |
| 8,176,061 B2 | 5/2012 | Swanbeck et al. |
| 8,176,177 B2 | 5/2012 | Sussman et al. |
| 8,176,334 B2 | 5/2012 | Vainstein |
| 8,176,470 B2 | 5/2012 | Klumpp et al. |
| 8,180,759 B2 | 5/2012 | Hamzy |
| 8,185,409 B2 | 5/2012 | Putnam et al. |
| 8,196,176 B2 | 6/2012 | Berteau et al. |
| 8,205,093 B2 | 6/2012 | Argott |
| 8,205,140 B2 | 6/2012 | Hafeez et al. |
| 8,214,803 B2 | 7/2012 | Horii et al. |
| 8,234,377 B2 | 7/2012 | Cohn |

(56) References Cited

U.S. PATENT DOCUMENTS

| | | | |
|---|---|---|---|
| 8,239,244 B2 | 8/2012 | Ginsberg et al. |
| 8,250,051 B2 | 8/2012 | Bugir et al. |
| 8,255,468 B2 | 8/2012 | Vitaldevara et al. |
| 8,260,262 B2 | 9/2012 | Ben Ayed |
| 8,266,231 B1 | 9/2012 | Golovin et al. |
| 8,275,632 B2 | 9/2012 | Awaraji et al. |
| 8,275,793 B2 | 9/2012 | Ahmad et al. |
| 8,286,239 B1 | 10/2012 | Sutton |
| 8,312,549 B2 | 11/2012 | Goldberg et al. |
| 8,316,237 B1 | 11/2012 | Felsher et al. |
| 8,332,908 B2 | 12/2012 | Hatakeyama et al. |
| 8,341,405 B2 | 12/2012 | Meijer et al. |
| 8,346,929 B1 | 1/2013 | Lai |
| 8,364,713 B2 | 1/2013 | Pollard |
| 8,370,794 B2 | 2/2013 | Moosmann et al. |
| 8,380,630 B2 | 2/2013 | Felsher |
| 8,380,743 B2 | 2/2013 | Convertino et al. |
| 8,381,180 B2 | 2/2013 | Rostoker |
| 8,386,314 B2 | 2/2013 | Kirkby et al. |
| 8,392,982 B2 | 3/2013 | Harris et al. |
| 8,418,226 B2 | 4/2013 | Gardner |
| 8,423,954 B2 | 4/2013 | Ronen et al. |
| 8,429,179 B1 | 4/2013 | Mirhaji |
| 8,429,597 B2 | 4/2013 | Prigge |
| 8,429,630 B2 | 4/2013 | Nickolov et al. |
| 8,429,758 B2 | 4/2013 | Chen et al. |
| 8,438,644 B2 | 5/2013 | Watters et al. |
| 8,463,247 B2 | 6/2013 | Misiag |
| 8,464,311 B2 | 6/2013 | Ashley et al. |
| 8,468,244 B2 | 6/2013 | Redlich et al. |
| 8,473,324 B2 | 6/2013 | Alvarez et al. |
| 8,474,012 B2 | 6/2013 | Ahmed et al. |
| 8,494,894 B2 | 7/2013 | Jaster et al. |
| 8,504,481 B2 | 8/2013 | Motahari et al. |
| 8,510,199 B1 | 8/2013 | Erlanger |
| 8,516,076 B2 | 8/2013 | Thomas |
| 8,533,746 B2 | 9/2013 | Nolan et al. |
| 8,539,359 B2 | 9/2013 | Rapaport et al. |
| 8,539,437 B2 | 9/2013 | Finlayson et al. |
| 8,560,645 B2 | 10/2013 | Linden et al. |
| 8,560,841 B2 | 10/2013 | Chin et al. |
| 8,560,956 B2 | 10/2013 | Curtis et al. |
| 8,561,153 B2 | 10/2013 | Grason et al. |
| 8,565,729 B2 | 10/2013 | Moseler et al. |
| 8,566,938 B1 | 10/2013 | Prakash et al. |
| 8,571,909 B2 | 10/2013 | Miller et al. |
| 8,572,717 B2 | 10/2013 | Narayanaswamy |
| 8,578,036 B1 | 11/2013 | Holfelder et al. |
| 8,578,166 B2 | 11/2013 | De Monseignat et al. |
| 8,578,481 B2 | 11/2013 | Rowley |
| 8,578,501 B1 | 11/2013 | Ogilvie |
| 8,583,694 B2 | 11/2013 | Siegel et al. |
| 8,583,766 B2 | 11/2013 | Dixon et al. |
| 8,589,183 B2 | 11/2013 | Awaraji et al. |
| 8,601,467 B2 | 12/2013 | Hofhansl et al. |
| 8,601,591 B2 | 12/2013 | Krishnamurthy et al. |
| 8,606,746 B2 | 12/2013 | Yeap et al. |
| 8,612,420 B2 | 12/2013 | Sun et al. |
| 8,612,993 B2 | 12/2013 | Grant et al. |
| 8,615,731 B2 | 12/2013 | Doshi |
| 8,620,952 B2 | 12/2013 | Bennett et al. |
| 8,621,637 B2 | 12/2013 | Al-Harbi et al. |
| 8,626,671 B2 | 1/2014 | Federgreen |
| 8,627,114 B2 | 1/2014 | Resch et al. |
| 8,630,961 B2 | 1/2014 | Beilby et al. |
| 8,640,110 B2 | 1/2014 | Kopp et al. |
| 8,646,072 B1 | 2/2014 | Savant |
| 8,650,399 B2 | 2/2014 | Le Bihan et al. |
| 8,656,456 B2 | 2/2014 | Maxson et al. |
| 8,661,036 B2 | 2/2014 | Turski et al. |
| 8,667,074 B1 | 3/2014 | Farkas |
| 8,667,487 B1 | 3/2014 | Boodman et al. |
| 8,677,472 B1 | 3/2014 | Dotan et al. |
| 8,681,984 B2 | 3/2014 | Lee et al. |
| 8,682,698 B2 | 3/2014 | Cashman et al. |
| 8,683,502 B2 | 3/2014 | Shkedi et al. |
| 8,688,601 B2 | 4/2014 | Jaiswal |
| 8,689,292 B2 | 4/2014 | Williams et al. |
| 8,693,689 B2 | 4/2014 | Belenkiy et al. |
| 8,700,524 B2 | 4/2014 | Williams et al. |
| 8,700,699 B2 | 4/2014 | Shen et al. |
| 8,706,742 B1 | 4/2014 | Ravid et al. |
| 8,707,451 B2 | 4/2014 | Ture et al. |
| 8,712,813 B2 | 4/2014 | King |
| 8,713,098 B1 | 4/2014 | Adya et al. |
| 8,713,638 B2 | 4/2014 | Hu et al. |
| 8,719,366 B2 | 5/2014 | Mathew et al. |
| 8,732,839 B2 | 5/2014 | Hohl |
| 8,744,894 B2 | 6/2014 | Christiansen et al. |
| 8,751,285 B2 | 6/2014 | Deb et al. |
| 8,763,071 B2 | 6/2014 | Sinha et al. |
| 8,763,082 B2 | 6/2014 | Huber et al. |
| 8,763,131 B2 | 6/2014 | Archer et al. |
| 8,767,947 B1 | 7/2014 | Ristock et al. |
| 8,769,242 B2 | 7/2014 | Tkac et al. |
| 8,769,671 B2 | 7/2014 | Shraim et al. |
| 8,788,935 B1 | 7/2014 | Hirsch et al. |
| 8,793,614 B2 | 7/2014 | Wilson et al. |
| 8,793,650 B2 | 7/2014 | Hilerio et al. |
| 8,793,781 B2 | 7/2014 | Grossi et al. |
| 8,793,809 B2 | 7/2014 | Falkenburg et al. |
| 8,799,984 B2 | 8/2014 | Ahn |
| 8,805,707 B2 | 8/2014 | Schumann, Jr. et al. |
| 8,805,806 B2 | 8/2014 | Amarendran et al. |
| 8,805,925 B2 | 8/2014 | Price et al. |
| 8,812,342 B2 | 8/2014 | Barcelo et al. |
| 8,812,752 B1 | 8/2014 | Shih et al. |
| 8,812,766 B2 | 8/2014 | Kranendonk et al. |
| 8,819,253 B2 | 8/2014 | Simeloff et al. |
| 8,819,617 B1 | 8/2014 | Koenig et al. |
| 8,826,446 B1 * | 9/2014 | Liu ............... H04L 67/306 |
| | | 726/26 |
| 8,832,649 B2 | 9/2014 | Bishop et al. |
| 8,832,854 B2 | 9/2014 | Staddon et al. |
| 8,839,232 B2 | 9/2014 | Taylor et al. |
| 8,843,487 B2 | 9/2014 | McGraw et al. |
| 8,856,534 B2 | 10/2014 | Khosravi et al. |
| 8,862,507 B2 | 10/2014 | Sandhu et al. |
| 8,875,232 B2 | 10/2014 | Blom et al. |
| 8,893,078 B2 | 11/2014 | Schaude et al. |
| 8,893,286 B1 | 11/2014 | Oliver |
| 8,893,297 B2 | 11/2014 | Eversoll et al. |
| 8,904,494 B2 | 12/2014 | Kindler et al. |
| 8,914,263 B2 | 12/2014 | Shimada et al. |
| 8,914,299 B2 | 12/2014 | Pesci-Anderson et al. |
| 8,914,342 B2 | 12/2014 | Kalaboukis et al. |
| 8,914,902 B2 | 12/2014 | Moritz et al. |
| 8,918,306 B2 | 12/2014 | Cashman et al. |
| 8,918,392 B1 | 12/2014 | Brooker et al. |
| 8,918,632 B1 | 12/2014 | Sartor |
| 8,930,896 B1 | 1/2015 | Wiggins |
| 8,930,897 B2 | 1/2015 | Nassar |
| 8,935,198 B1 | 1/2015 | Phillips et al. |
| 8,935,266 B2 | 1/2015 | Wu |
| 8,935,342 B2 | 1/2015 | Patel |
| 8,935,804 B1 | 1/2015 | Clark et al. |
| 8,938,221 B2 | 1/2015 | Brazier et al. |
| 8,943,076 B2 | 1/2015 | Stewart et al. |
| 8,943,548 B2 | 1/2015 | Drokov et al. |
| 8,949,137 B2 | 2/2015 | Crapo et al. |
| 8,955,038 B2 | 2/2015 | Nicodemus et al. |
| 8,959,568 B2 | 2/2015 | Hudis et al. |
| 8,959,584 B2 | 2/2015 | Piliouras |
| 8,966,575 B2 | 2/2015 | McQuay et al. |
| 8,966,597 B1 | 2/2015 | Saylor et al. |
| 8,973,108 B1 | 3/2015 | Roth et al. |
| 8,977,234 B2 | 3/2015 | Chava |
| 8,977,643 B2 | 3/2015 | Schindlauer et al. |
| 8,978,158 B2 | 3/2015 | Rajkumar et al. |
| 8,983,972 B2 | 3/2015 | Kriebel et al. |
| 8,984,031 B1 | 3/2015 | Todd |
| 8,990,933 B1 | 3/2015 | Magdalin |
| 8,996,417 B1 | 3/2015 | Channakeshava |
| 8,996,480 B2 | 3/2015 | Agarwala et al. |

(56) References Cited

U.S. PATENT DOCUMENTS

| | | |
|---|---|---|
| 8,997,213 B2 | 3/2015 | Papakipos et al. |
| 9,003,295 B2 | 4/2015 | Baschy |
| 9,003,552 B2 | 4/2015 | Goodwin et al. |
| 9,009,851 B2 | 4/2015 | Droste et al. |
| 9,015,796 B1 | 4/2015 | Fujioka |
| 9,021,469 B2 | 4/2015 | Hilerio et al. |
| 9,026,526 B1 | 5/2015 | Bau et al. |
| 9,030,987 B2 | 5/2015 | Bianchetti et al. |
| 9,032,067 B2 | 5/2015 | Prasad et al. |
| 9,043,217 B2 | 5/2015 | Cashman et al. |
| 9,043,480 B2 | 5/2015 | Barton et al. |
| 9,047,463 B2 | 6/2015 | Porras |
| 9,047,582 B2 | 6/2015 | Hutchinson et al. |
| 9,047,639 B1 | 6/2015 | Ouintiliani et al. |
| 9,049,314 B2 | 6/2015 | Pugh et al. |
| 9,055,071 B1 | 6/2015 | Gates et al. |
| 9,058,590 B2 | 6/2015 | Criddle et al. |
| 9,064,033 B2 | 6/2015 | Jin et al. |
| 9,069,940 B2 | 6/2015 | Hars |
| 9,076,231 B1 | 7/2015 | Hill et al. |
| 9,077,736 B2 | 7/2015 | Werth et al. |
| 9,081,952 B2 | 7/2015 | Sagi et al. |
| 9,092,796 B2 | 7/2015 | Eversoll et al. |
| 9,094,434 B2 | 7/2015 | Williams et al. |
| 9,098,515 B2 | 8/2015 | Richter et al. |
| 9,100,778 B2 | 8/2015 | Stogaitis et al. |
| 9,106,691 B1 | 8/2015 | Burger et al. |
| 9,106,710 B1 | 8/2015 | Feimster |
| 9,111,105 B2 | 8/2015 | Barton et al. |
| 9,111,295 B2 | 8/2015 | Tietzen et al. |
| 9,123,339 B1 | 9/2015 | Shaw et al. |
| 9,129,311 B2 | 9/2015 | Schoen et al. |
| 9,135,261 B2 | 9/2015 | Maunder et al. |
| 9,135,444 B2 | 9/2015 | Carter et al. |
| 9,141,823 B2 | 9/2015 | Dawson |
| 9,152,820 B1 | 10/2015 | Pauley, Jr. et al. |
| 9,154,514 B1 | 10/2015 | Prakash |
| 9,154,556 B1 | 10/2015 | Dotan et al. |
| 9,158,655 B2 | 10/2015 | Wadhwani et al. |
| 9,170,996 B2 | 10/2015 | Lovric et al. |
| 9,172,706 B2 | 10/2015 | Krishnamurthy et al. |
| 9,177,293 B1 | 11/2015 | Gagnon et al. |
| 9,178,901 B2 | 11/2015 | Xue et al. |
| 9,183,100 B2 | 11/2015 | Gventer et al. |
| 9,189,642 B2 | 11/2015 | Perlman |
| 9,201,572 B2 | 12/2015 | Lyon et al. |
| 9,201,770 B1 | 12/2015 | Duerk |
| 9,202,085 B2 | 12/2015 | Mawdsley et al. |
| 9,215,076 B1 | 12/2015 | Roth et al. |
| 9,215,252 B2 | 12/2015 | Smith et al. |
| 9,218,596 B2 | 12/2015 | Ronca et al. |
| 9,224,009 B1 | 12/2015 | Liu et al. |
| 9,230,036 B2 | 1/2016 | Davis |
| 9,231,935 B1 | 1/2016 | Bridge et al. |
| 9,232,040 B2 | 1/2016 | Barash et al. |
| 9,235,476 B2 | 1/2016 | McHugh et al. |
| 9,240,987 B2 | 1/2016 | Barrett-Bowen et al. |
| 9,241,259 B2 | 1/2016 | Daniela et al. |
| 9,245,126 B2 | 1/2016 | Christodorescu et al. |
| 9,245,266 B2 | 1/2016 | Hardt |
| 9,253,609 B2 | 2/2016 | Hosier, Jr. |
| 9,264,443 B2 | 2/2016 | Weisman |
| 9,280,581 B1 | 3/2016 | Grimes et al. |
| 9,286,282 B2 | 3/2016 | Ling, III et al. |
| 9,288,118 B1 | 3/2016 | Pattan |
| 9,288,556 B2 | 3/2016 | Kim et al. |
| 9,317,697 B2 | 4/2016 | Maier et al. |
| 9,317,715 B2 | 4/2016 | Schuette et al. |
| 9,325,731 B2 | 4/2016 | McGeehan |
| 9,336,324 B2 | 5/2016 | Lomme et al. |
| 9,336,332 B2 | 5/2016 | Davis et al. |
| 9,336,400 B2 | 5/2016 | Milman et al. |
| 9,338,188 B1 | 5/2016 | Ahn |
| 9,342,706 B2 | 5/2016 | Chawla et al. |
| 9,344,297 B2 | 5/2016 | Shah et al. |
| 9,344,424 B2 | 5/2016 | Tenenboym et al. |
| 9,344,484 B2 | 5/2016 | Ferris |
| 9,348,802 B2 | 5/2016 | Massand |
| 9,348,862 B2 | 5/2016 | Kawecki, III |
| 9,349,016 B1 | 5/2016 | Brisebois et al. |
| 9,350,718 B2 | 5/2016 | Sondhi et al. |
| 9,355,157 B2 | 5/2016 | Mohammed et al. |
| 9,356,961 B1 | 5/2016 | Todd et al. |
| 9,369,488 B2 | 6/2016 | Woods et al. |
| 9,384,199 B2 | 7/2016 | Thereska et al. |
| 9,384,357 B2 * | 7/2016 | Patil .................. G06F 21/60 |
| 9,386,104 B2 | 7/2016 | Adams et al. |
| 9,396,332 B2 | 7/2016 | Abrams et al. |
| 9,401,900 B2 | 7/2016 | Levasseur et al. |
| 9,411,967 B2 | 8/2016 | Parecki et al. |
| 9,411,982 B1 | 8/2016 | Dippenaar et al. |
| 9,417,859 B2 | 8/2016 | Gounares |
| 9,424,021 B2 | 8/2016 | Zamir |
| 9,426,177 B2 | 8/2016 | Wang et al. |
| 9,450,940 B2 | 9/2016 | Belov et al. |
| 9,460,136 B1 | 10/2016 | Todd et al. |
| 9,460,171 B2 | 10/2016 | Marrelli et al. |
| 9,460,307 B2 | 10/2016 | Breslau et al. |
| 9,462,009 B1 | 10/2016 | Kolman et al. |
| 9,465,702 B2 | 10/2016 | Gventer et al. |
| 9,465,800 B2 | 10/2016 | Lacey |
| 9,473,446 B2 | 10/2016 | Vijay et al. |
| 9,473,535 B2 | 10/2016 | Sartor |
| 9,477,523 B1 | 10/2016 | Warman et al. |
| 9,477,660 B2 | 10/2016 | Scott et al. |
| 9,477,942 B2 | 10/2016 | Adachi et al. |
| 9,483,659 B2 | 11/2016 | Bao et al. |
| 9,489,366 B2 | 11/2016 | Scott et al. |
| 9,501,523 B2 | 11/2016 | Hyatt et al. |
| 9,507,960 B2 | 11/2016 | Bell et al. |
| 9,509,674 B1 | 11/2016 | Nasserbakht et al. |
| 9,509,702 B2 | 11/2016 | Grigg et al. |
| 9,521,166 B2 | 12/2016 | Wilson |
| 9,524,500 B2 | 12/2016 | Dave et al. |
| 9,529,989 B2 | 12/2016 | Kling et al. |
| 9,536,108 B2 | 1/2017 | Powell et al. |
| 9,537,546 B2 | 1/2017 | Cordeiro et al. |
| 9,542,568 B2 | 1/2017 | Francis et al. |
| 9,549,047 B1 | 1/2017 | Fredinburg et al. |
| 9,552,395 B2 | 1/2017 | Bayer et al. |
| 9,552,470 B2 | 1/2017 | Turgeman et al. |
| 9,553,918 B1 | 1/2017 | Manion et al. |
| 9,558,497 B2 | 1/2017 | Carvalho |
| 9,569,752 B2 | 2/2017 | Deering et al. |
| 9,571,509 B1 | 2/2017 | Satish et al. |
| 9,571,526 B2 | 2/2017 | Sartor |
| 9,571,559 B2 | 2/2017 | Raleigh et al. |
| 9,571,991 B1 | 2/2017 | Brizendine et al. |
| 9,576,289 B2 | 2/2017 | Henderson et al. |
| 9,578,173 B2 | 2/2017 | Sanghavi et al. |
| 9,582,681 B2 | 2/2017 | Mishra |
| 9,584,964 B2 | 2/2017 | Pelkey |
| 9,589,110 B2 | 3/2017 | Carey et al. |
| 9,600,181 B2 | 3/2017 | Patel et al. |
| 9,602,529 B2 | 3/2017 | Jones et al. |
| 9,606,971 B2 | 3/2017 | Seolas et al. |
| 9,607,041 B2 | 3/2017 | Himmelstein |
| 9,619,652 B2 | 4/2017 | Slater |
| 9,619,661 B1 | 4/2017 | Finkelstein |
| 9,621,357 B2 | 4/2017 | Williams et al. |
| 9,621,566 B2 | 4/2017 | Gupta et al. |
| 9,626,124 B2 | 4/2017 | Lipinski et al. |
| 9,629,064 B2 | 4/2017 | Graves et al. |
| 9,642,008 B2 | 5/2017 | Wyatt et al. |
| 9,646,095 B1 | 5/2017 | Gottlieb et al. |
| 9,648,036 B2 | 5/2017 | Seiver et al. |
| 9,652,314 B2 | 5/2017 | Mahiddini |
| 9,654,506 B2 | 5/2017 | Barrett |
| 9,654,541 B1 | 5/2017 | Kapczynski et al. |
| 9,665,722 B2 | 5/2017 | Nagasundaram et al. |
| 9,665,733 B1 | 5/2017 | Sills et al. |
| 9,665,883 B2 | 5/2017 | Roullier et al. |
| 9,672,053 B2 | 6/2017 | Tang et al. |
| 9,672,355 B2 | 6/2017 | Titonis et al. |

(56) References Cited

U.S. PATENT DOCUMENTS

| | | |
|---|---|---|
| 9,678,794 B1 | 6/2017 | Barrett et al. |
| 9,691,090 B1 | 6/2017 | Barday |
| 9,704,103 B2 | 7/2017 | Suskind et al. |
| 9,705,840 B2 | 7/2017 | Pujare et al. |
| 9,705,880 B2 | 7/2017 | Siris |
| 9,721,078 B2 | 8/2017 | Cornick et al. |
| 9,721,108 B2 | 8/2017 | Krishnamurthy et al. |
| 9,727,751 B2 | 8/2017 | Oliver et al. |
| 9,729,583 B1 | 8/2017 | Barday |
| 9,734,255 B2 | 8/2017 | Jiang |
| 9,740,985 B2 | 8/2017 | Byron et al. |
| 9,740,987 B2 | 8/2017 | Dolan |
| 9,749,408 B2 | 8/2017 | Subramani et al. |
| 9,760,620 B2 | 9/2017 | Nachnani et al. |
| 9,760,635 B2 | 9/2017 | Bliss et al. |
| 9,760,697 B1 | 9/2017 | Walker |
| 9,760,849 B2 | 9/2017 | Vinnakota et al. |
| 9,762,553 B2 | 9/2017 | Ford et al. |
| 9,767,202 B2 | 9/2017 | Darby et al. |
| 9,767,309 B1 | 9/2017 | Patel et al. |
| 9,769,124 B2 | 9/2017 | Yan |
| 9,785,795 B2 | 10/2017 | Grondin et al. |
| 9,798,749 B2 | 10/2017 | Saner |
| 9,798,826 B2 | 10/2017 | Wilson et al. |
| 9,798,896 B2 | 10/2017 | Jakobsson |
| 9,800,605 B2 | 10/2017 | Baikalov et al. |
| 9,800,606 B1 | 10/2017 | Yumer |
| 9,804,649 B2 | 10/2017 | Cohen et al. |
| 9,804,928 B2 | 10/2017 | Davis et al. |
| 9,805,381 B2 | 10/2017 | Frank et al. |
| 9,811,532 B2 | 11/2017 | Parkison et al. |
| 9,817,850 B2 | 11/2017 | Dubbels et al. |
| 9,817,978 B2 | 11/2017 | Marsh et al. |
| 9,825,928 B2 | 11/2017 | Lelcuk et al. |
| 9,832,633 B2 | 11/2017 | Gerber, Jr. et al. |
| 9,836,598 B2 | 12/2017 | Iyer et al. |
| 9,838,407 B1 | 12/2017 | Oprea et al. |
| 9,838,839 B2 | 12/2017 | Vudali et al. |
| 9,842,042 B2 | 12/2017 | Chhatwal et al. |
| 9,842,349 B2 | 12/2017 | Sawczuk et al. |
| 9,848,005 B2 | 12/2017 | Ardeli et al. |
| 9,848,061 B1 | 12/2017 | Jain et al. |
| 9,852,150 B2 | 12/2017 | Sharpe et al. |
| 9,853,959 B1 | 12/2017 | Kapczynski et al. |
| 9,860,226 B2 | 1/2018 | Thormaehlen |
| 9,864,735 B1 | 1/2018 | Lamprecht |
| 9,877,138 B1 | 1/2018 | Franklin |
| 9,882,935 B2 | 1/2018 | Barday |
| 9,887,965 B2 | 2/2018 | Kay et al. |
| 9,892,441 B2 | 2/2018 | Barday |
| 9,892,442 B2 | 2/2018 | Barday |
| 9,892,443 B2 | 2/2018 | Barday |
| 9,892,444 B2 | 2/2018 | Barday |
| 9,894,076 B2 | 2/2018 | Li et al. |
| 9,898,613 B1 | 2/2018 | Swerdlow et al. |
| 9,898,769 B2 | 2/2018 | Barday |
| 9,912,625 B2 | 3/2018 | Mutha et al. |
| 9,912,810 B2 | 3/2018 | Segre et al. |
| 9,916,703 B2 | 3/2018 | Levinson et al. |
| 9,922,124 B2 | 3/2018 | Rathod |
| 9,923,927 B1 | 3/2018 | McClintock et al. |
| 9,928,379 B1 | 3/2018 | Hoffer |
| 9,934,493 B2 | 4/2018 | Castinado et al. |
| 9,934,544 B1 | 4/2018 | Whitfield et al. |
| 9,936,127 B2 | 4/2018 | Todasco |
| 9,942,244 B2 | 4/2018 | Lahoz et al. |
| 9,942,276 B2 | 4/2018 | Sartor |
| 9,946,897 B2 | 4/2018 | Lovin |
| 9,948,663 B1 | 4/2018 | Wang et al. |
| 9,953,189 B2 | 4/2018 | Cook et al. |
| 9,959,551 B1 | 5/2018 | Schermerhorn et al. |
| 9,959,582 B2 | 5/2018 | Sukman et al. |
| 9,961,070 B2 | 5/2018 | Tang |
| 9,973,518 B2 | 5/2018 | Lee et al. |
| 9,973,585 B2 | 5/2018 | Ruback et al. |
| 9,977,904 B2 | 5/2018 | Khan et al. |
| 9,983,936 B2 | 5/2018 | Dornemann et al. |
| 9,984,252 B2 | 5/2018 | Pollard |
| 9,990,499 B2 | 6/2018 | Chan et al. |
| 9,992,213 B2 | 6/2018 | Sinnema |
| 10,001,975 B2 | 6/2018 | Bharthulwar |
| 10,002,064 B2 | 6/2018 | Muske |
| 10,007,895 B2 | 6/2018 | Vanasco |
| 10,013,577 B1 | 7/2018 | Beaumont et al. |
| 10,015,164 B2 | 7/2018 | Hamburg et al. |
| 10,019,339 B2 | 7/2018 | Von Hanxleden et al. |
| 10,019,588 B2 | 7/2018 | Garcia et al. |
| 10,019,591 B1 | 7/2018 | Beguin |
| 10,019,741 B2 | 7/2018 | Hesselink |
| 10,021,143 B2 | 7/2018 | Cabrera et al. |
| 10,025,804 B2 | 7/2018 | Vranyes et al. |
| 10,028,226 B2 | 7/2018 | Ayyagari et al. |
| 10,032,172 B2 | 7/2018 | Barday |
| 10,044,761 B2 | 8/2018 | Ducatel et al. |
| 10,055,426 B2 | 8/2018 | Arasan et al. |
| 10,061,847 B2 | 8/2018 | Mohammed et al. |
| 10,069,914 B1 | 9/2018 | Smith |
| 10,073,924 B2 | 9/2018 | Karp et al. |
| 10,075,451 B1 | 9/2018 | Hall et al. |
| 10,091,214 B2 | 10/2018 | Godlewski et al. |
| 10,091,312 B1 | 10/2018 | Khanwalkar et al. |
| 10,102,533 B2 | 10/2018 | Barday |
| 10,108,409 B2 | 10/2018 | Pirzadeh et al. |
| 10,122,663 B2 | 11/2018 | Hu et al. |
| 10,122,760 B2 | 11/2018 | Terrill et al. |
| 10,127,403 B2 | 11/2018 | Kong et al. |
| 10,129,211 B2 | 11/2018 | Heath |
| 10,140,666 B1 | 11/2018 | Wang et al. |
| 10,142,113 B2 | 11/2018 | Zaidi et al. |
| 10,158,676 B2 | 12/2018 | Barday |
| 10,165,011 B2 | 12/2018 | Barday |
| 10,169,762 B2 | 1/2019 | Ogawa |
| 10,176,503 B2 | 1/2019 | Barday et al. |
| 10,181,043 B1 | 1/2019 | Pauley, Jr. et al. |
| 10,181,051 B2 | 1/2019 | Barday et al. |
| 10,187,363 B2 | 1/2019 | Smirnoff et al. |
| 10,204,154 B2 | 2/2019 | Barday et al. |
| 10,212,134 B2 | 2/2019 | Rai |
| 10,212,175 B2 | 2/2019 | Seul et al. |
| 10,223,533 B2 | 3/2019 | Dawson |
| 10,250,594 B2 | 4/2019 | Chathoth et al. |
| 10,255,602 B2 | 4/2019 | Wang |
| 10,257,127 B2 | 4/2019 | Dotan-Cohen et al. |
| 10,257,181 B1 | 4/2019 | Sherif et al. |
| 10,268,838 B2 | 4/2019 | Yadgiri et al. |
| 10,275,614 B2 | 4/2019 | Barday et al. |
| 10,282,370 B1 | 5/2019 | Barday et al. |
| 10,284,604 B2 | 5/2019 | Barday et al. |
| 10,289,857 B1 | 5/2019 | Brinskelle |
| 10,289,866 B2 | 5/2019 | Barday et al. |
| 10,289,867 B2 | 5/2019 | Barday et al. |
| 10,289,870 B2 | 5/2019 | Barday et al. |
| 10,304,442 B1 | 5/2019 | Rudden et al. |
| 10,310,723 B2 | 6/2019 | Rathod |
| 10,311,042 B1 | 6/2019 | Kumar |
| 10,311,475 B2 | 6/2019 | Yuasa |
| 10,311,492 B2 | 6/2019 | Gelfenbeyn et al. |
| 10,318,761 B2 | 6/2019 | Barday et al. |
| 10,324,960 B1 | 6/2019 | Skvortsov et al. |
| 10,326,768 B2 | 6/2019 | Verweyst et al. |
| 10,333,975 B2 | 6/2019 | Soman et al. |
| 10,346,186 B2 | 7/2019 | Kalyanpur |
| 10,346,635 B2 | 7/2019 | Kumar et al. |
| 10,346,638 B2 | 7/2019 | Barday et al. |
| 10,348,726 B2 | 7/2019 | Caluwaert |
| 10,348,775 B2 | 7/2019 | Barday |
| 10,353,673 B2 | 7/2019 | Barday et al. |
| 10,361,857 B2 | 7/2019 | Woo |
| 10,373,119 B2 | 8/2019 | Driscoll et al. |
| 10,373,409 B2 | 8/2019 | White et al. |
| 10,375,115 B2 | 8/2019 | Mallya |
| 10,387,559 B1 | 8/2019 | Wendt et al. |
| 10,387,657 B2 | 8/2019 | Belfiore, Jr. et al. |
| 10,387,952 B1 | 8/2019 | Sandhu et al. |

(56) References Cited

U.S. PATENT DOCUMENTS

| | | |
|---|---|---|
| 10,395,201 B2 | 8/2019 | Vescio |
| 10,402,545 B2 | 9/2019 | Gorfein et al. |
| 10,404,729 B2 | 9/2019 | Turgeman |
| 10,417,401 B2 | 9/2019 | Votaw et al. |
| 10,423,985 B1 | 9/2019 | Dutta et al. |
| 10,425,492 B2 | 9/2019 | Comstock et al. |
| 10,430,608 B2 | 10/2019 | Peri et al. |
| 10,437,412 B2 | 10/2019 | Barday et al. |
| 10,437,860 B2 | 10/2019 | Barday et al. |
| 10,438,016 B2 | 10/2019 | Barday et al. |
| 10,440,062 B2 | 10/2019 | Barday et al. |
| 10,445,508 B2 | 10/2019 | Sher-Jan et al. |
| 10,445,526 B2 | 10/2019 | Barday et al. |
| 10,452,864 B2 | 10/2019 | Barday et al. |
| 10,452,866 B2 | 10/2019 | Barday et al. |
| 10,453,092 B1 | 10/2019 | Wang et al. |
| 10,454,934 B2 | 10/2019 | Parimi et al. |
| 10,481,763 B2 | 11/2019 | Bartkiewicz et al. |
| 10,503,926 B2 | 12/2019 | Barday et al. |
| 10,510,031 B2 | 12/2019 | Barday et al. |
| 10,521,623 B2 | 12/2019 | Rodriguez et al. |
| 10,534,851 B1 | 1/2020 | Chan et al. |
| 10,535,081 B2 | 1/2020 | Ferreira et al. |
| 10,536,475 B1 | 1/2020 | McCorkle, Jr. et al. |
| 10,546,135 B1 | 1/2020 | Kassoumeh et al. |
| 10,552,462 B1 | 2/2020 | Hart |
| 10,558,821 B2 | 2/2020 | Barday et al. |
| 10,564,815 B2 | 2/2020 | Soon-Shiong |
| 10,564,935 B2 | 2/2020 | Barday et al. |
| 10,564,936 B2 | 2/2020 | Barday et al. |
| 10,565,161 B2 | 2/2020 | Barday et al. |
| 10,565,236 B1 | 2/2020 | Barday et al. |
| 10,567,439 B2 | 2/2020 | Barday |
| 10,567,517 B2 | 2/2020 | Weinig et al. |
| 10,572,684 B2 | 2/2020 | Lafever et al. |
| 10,572,686 B2 | 2/2020 | Barday et al. |
| 10,574,705 B2 | 2/2020 | Barday et al. |
| 10,592,648 B2 | 3/2020 | Barday et al. |
| 10,606,916 B2 | 3/2020 | Brannon et al. |
| 10,613,971 B1 | 4/2020 | Vasikarla |
| 10,628,553 B1 | 4/2020 | Murrish et al. |
| 10,650,408 B1 | 5/2020 | Andersen et al. |
| 10,659,566 B1 | 5/2020 | Luah et al. |
| 10,671,749 B2 | 6/2020 | Felice-Steele et al. |
| 10,671,760 B2 | 6/2020 | Esmailzadeh et al. |
| 10,678,945 B2 | 6/2020 | Barday et al. |
| 10,685,140 B2 | 6/2020 | Barday et al. |
| 10,706,176 B2 | 7/2020 | Brannon et al. |
| 10,706,226 B2 | 7/2020 | Byun et al. |
| 10,713,387 B2 | 7/2020 | Brannon et al. |
| 10,726,153 B2 | 7/2020 | Nerurkar et al. |
| 10,726,158 B2 | 7/2020 | Brannon et al. |
| 10,732,865 B2 | 8/2020 | Jain et al. |
| 10,740,487 B2 | 8/2020 | Barday et al. |
| 10,747,893 B2 | 8/2020 | Kiriyama et al. |
| 10,747,897 B2 | 8/2020 | Cook |
| 10,749,870 B2 | 8/2020 | Brouillette et al. |
| 10,762,236 B2 | 9/2020 | Brannon et al. |
| 10,769,302 B2 | 9/2020 | Barday et al. |
| 10,776,510 B2 | 9/2020 | Antonelli et al. |
| 10,776,518 B2 | 9/2020 | Barday et al. |
| 10,785,173 B2 | 9/2020 | Willett et al. |
| 10,791,150 B2 | 9/2020 | Barday et al. |
| 10,796,020 B2 | 10/2020 | Barday et al. |
| 10,796,260 B2 | 10/2020 | Brannon et al. |
| 10,834,590 B2 | 11/2020 | Turgeman et al. |
| 10,846,433 B2 | 11/2020 | Brannon et al. |
| 10,860,742 B2 | 12/2020 | Joseph et al. |
| 10,860,979 B2 | 12/2020 | Geffen et al. |
| 10,878,127 B2 | 12/2020 | Brannon et al. |
| 10,885,485 B2 | 1/2021 | Brannon et al. |
| 10,896,394 B2 | 1/2021 | Brannon et al. |
| 10,909,488 B2 | 2/2021 | Hecht et al. |
| 10,957,326 B2 | 3/2021 | Bhaya et al. |
| 10,963,571 B2 | 3/2021 | Bar Joseph et al. |
| 10,972,509 B2 | 4/2021 | Barday et al. |
| 10,984,458 B1 | 4/2021 | Gutierrez |
| 11,012,475 B2 | 5/2021 | Patnala et al. |
| 11,068,318 B2 | 7/2021 | Kuesel et al. |
| 11,093,950 B2 | 8/2021 | Hersh et al. |
| 2002/0077941 A1 | 6/2002 | Halligan et al. |
| 2002/0103854 A1 | 8/2002 | Okita |
| 2002/0129216 A1 | 9/2002 | Collins |
| 2002/0161594 A1 | 10/2002 | Bryan et al. |
| 2002/0161733 A1 | 10/2002 | Grainger |
| 2003/0041250 A1 | 2/2003 | Proudler |
| 2003/0065641 A1 | 4/2003 | Chaloux |
| 2003/0093680 A1 | 5/2003 | Astley et al. |
| 2003/0097451 A1 | 5/2003 | Bjorksten et al. |
| 2003/0097661 A1 | 5/2003 | Li et al. |
| 2003/0115142 A1 | 6/2003 | Brickell et al. |
| 2003/0130893 A1 | 7/2003 | Farmer |
| 2003/0131001 A1 | 7/2003 | Matsuo |
| 2003/0131093 A1 | 7/2003 | Aschen et al. |
| 2003/0167216 A1 | 9/2003 | Brown et al. |
| 2003/0212604 A1 | 11/2003 | Cullen |
| 2004/0025053 A1 | 2/2004 | Hayward |
| 2004/0088235 A1 | 5/2004 | Ziekle et al. |
| 2004/0098366 A1 | 5/2004 | Sinclair et al. |
| 2004/0098493 A1 | 5/2004 | Rees |
| 2004/0111359 A1 | 6/2004 | Hudock |
| 2004/0186912 A1 | 9/2004 | Harlow et al. |
| 2004/0193907 A1 | 9/2004 | Patanella |
| 2005/0022198 A1 | 1/2005 | Olapurath et al. |
| 2005/0033616 A1 | 2/2005 | Vavul et al. |
| 2005/0076294 A1 | 4/2005 | Dehamer et al. |
| 2005/0114343 A1 | 5/2005 | Wesinger, Jr. et al. |
| 2005/0144066 A1 | 6/2005 | Cope et al. |
| 2005/0197884 A1 | 9/2005 | Mullen, Jr. |
| 2005/0198177 A1 | 9/2005 | Black |
| 2005/0198646 A1 | 9/2005 | Kortela |
| 2005/0246292 A1 | 11/2005 | Sarcanin |
| 2005/0278538 A1 | 12/2005 | Fowler |
| 2006/0015263 A1* | 1/2006 | Stupp ............... G16H 50/30 702/19 |
| 2006/0031078 A1 | 2/2006 | Pizzinger et al. |
| 2006/0035204 A1 | 2/2006 | Lamarche et al. |
| 2006/0075122 A1 | 4/2006 | Lindskog et al. |
| 2006/0149730 A1 | 7/2006 | Curtis |
| 2006/0156052 A1 | 7/2006 | Bodnar et al. |
| 2006/0206375 A1 | 9/2006 | Scott et al. |
| 2006/0224422 A1 | 10/2006 | Cohen |
| 2006/0253597 A1 | 11/2006 | Mujica |
| 2006/0259416 A1 | 11/2006 | Johnson |
| 2007/0011058 A1 | 1/2007 | Dev |
| 2007/0027715 A1 | 2/2007 | Gropper et al. |
| 2007/0061393 A1 | 3/2007 | Moore |
| 2007/0130101 A1 | 6/2007 | Anderson et al. |
| 2007/0130323 A1 | 6/2007 | Landsman et al. |
| 2007/0157311 A1 | 7/2007 | Meier et al. |
| 2007/0173355 A1 | 7/2007 | Klein |
| 2007/0179793 A1 | 8/2007 | Bagchi et al. |
| 2007/0180490 A1 | 8/2007 | Renzi et al. |
| 2007/0192438 A1 | 8/2007 | Goei |
| 2007/0266420 A1* | 11/2007 | Hawkins ............... G06F 21/577 726/1 |
| 2007/0283171 A1 | 12/2007 | Breslin et al. |
| 2008/0015927 A1 | 1/2008 | Ramirez |
| 2008/0028065 A1 | 1/2008 | Caso et al. |
| 2008/0028435 A1* | 1/2008 | Strickland ............. G06Q 10/10 726/1 |
| 2008/0047016 A1 | 2/2008 | Spoonamore |
| 2008/0120699 A1 | 5/2008 | Spear |
| 2008/0195436 A1 | 8/2008 | Whyte |
| 2008/0235177 A1 | 9/2008 | Kim et al. |
| 2008/0270203 A1 | 10/2008 | Holmes et al. |
| 2008/0281649 A1 | 11/2008 | Morris |
| 2008/0282320 A1 | 11/2008 | Denovo et al. |
| 2008/0288271 A1 | 11/2008 | Faust |
| 2008/0288299 A1 | 11/2008 | Schultz |
| 2009/0012896 A1 | 1/2009 | Arnold |
| 2009/0022301 A1 | 1/2009 | Mudaliar |
| 2009/0037975 A1 | 2/2009 | Ishikawa et al. |
| 2009/0138276 A1 | 5/2009 | Hayashida et al. |

(56) References Cited

U.S. PATENT DOCUMENTS

| | | |
|---|---|---|
| 2009/0140035 A1 | 6/2009 | Miller |
| 2009/0144702 A1 | 6/2009 | Atkin et al. |
| 2009/0158249 A1 | 6/2009 | Tomkins et al. |
| 2009/0172705 A1 | 7/2009 | Cheong |
| 2009/0182818 A1 | 7/2009 | Krywaniuk |
| 2009/0187764 A1 | 7/2009 | Astakhov et al. |
| 2009/0204452 A1 | 8/2009 | Iskandar et al. |
| 2009/0204820 A1 | 8/2009 | Brandenburg et al. |
| 2009/0210347 A1 | 8/2009 | Sarcanin |
| 2009/0216610 A1 | 8/2009 | Chorny |
| 2009/0249076 A1 | 10/2009 | Reed et al. |
| 2009/0303237 A1 | 12/2009 | Liu et al. |
| 2010/0077484 A1 | 3/2010 | Paretti et al. |
| 2010/0082533 A1 | 4/2010 | Nakamura et al. |
| 2010/0094650 A1 | 4/2010 | Tran et al. |
| 2010/0100398 A1 | 4/2010 | Auker et al. |
| 2010/0121773 A1 | 5/2010 | Currier et al. |
| 2010/0192201 A1 | 7/2010 | Shimoni et al. |
| 2010/0205057 A1 | 8/2010 | Hook et al. |
| 2010/0223349 A1 | 9/2010 | Thorson |
| 2010/0228786 A1 | 9/2010 | Török |
| 2010/0234987 A1 | 9/2010 | Benschop et al. |
| 2010/0235297 A1 | 9/2010 | Mamorsky |
| 2010/0235915 A1 | 9/2010 | Memon et al. |
| 2010/0268628 A1 | 10/2010 | Pitkow et al. |
| 2010/0268932 A1 | 10/2010 | Bhattacharjee |
| 2010/0281313 A1 | 11/2010 | White et al. |
| 2010/0287114 A1 | 11/2010 | Bartko et al. |
| 2010/0333012 A1 | 12/2010 | Adachi et al. |
| 2011/0006996 A1 | 1/2011 | Smith et al. |
| 2011/0010202 A1 | 1/2011 | Neale |
| 2011/0082794 A1 | 4/2011 | Blechman |
| 2011/0137696 A1 | 6/2011 | Meyer et al. |
| 2011/0145154 A1 | 6/2011 | Rivers et al. |
| 2011/0191664 A1 | 8/2011 | Sheleheda et al. |
| 2011/0208850 A1 | 8/2011 | Sheleheda et al. |
| 2011/0209067 A1 | 8/2011 | Bogess et al. |
| 2011/0231896 A1 | 9/2011 | Tovar |
| 2011/0238573 A1 | 9/2011 | Varadarajan |
| 2011/0252456 A1 | 10/2011 | Hatakeyama |
| 2012/0084151 A1 | 4/2012 | Kozak et al. |
| 2012/0084349 A1 | 4/2012 | Lee et al. |
| 2012/0102543 A1 | 4/2012 | Kohli et al. |
| 2012/0110674 A1 | 5/2012 | Belani et al. |
| 2012/0116923 A1 | 5/2012 | Irving et al. |
| 2012/0131438 A1 | 5/2012 | Li et al. |
| 2012/0143650 A1 | 6/2012 | Crowley et al. |
| 2012/0144499 A1 | 6/2012 | Tan et al. |
| 2012/0226621 A1 | 9/2012 | Petran et al. |
| 2012/0239557 A1 | 9/2012 | Weinflash et al. |
| 2012/0254320 A1 | 10/2012 | Dove et al. |
| 2012/0259752 A1 | 10/2012 | Agee |
| 2012/0323700 A1 | 12/2012 | Aleksandrovich et al. |
| 2012/0330769 A1 | 12/2012 | Arceo |
| 2012/0330869 A1 | 12/2012 | Durham |
| 2013/0004933 A1 | 1/2013 | Bhaskaran |
| 2013/0018954 A1 | 1/2013 | Cheng |
| 2013/0085801 A1 | 4/2013 | Sharpe et al. |
| 2013/0103485 A1 | 4/2013 | Postrel |
| 2013/0111323 A1 | 5/2013 | Taghaddos et al. |
| 2013/0124257 A1 | 5/2013 | Schubert |
| 2013/0159351 A1 | 6/2013 | Hamann et al. |
| 2013/0171968 A1 | 7/2013 | Wang |
| 2013/0179982 A1 | 7/2013 | Bridges et al. |
| 2013/0185806 A1 | 7/2013 | Hatakeyama |
| 2013/0218829 A1 | 8/2013 | Martinez |
| 2013/0219459 A1 | 8/2013 | Bradley |
| 2013/0254649 A1 | 9/2013 | O'Neill |
| 2013/0254699 A1 | 9/2013 | Bashir et al. |
| 2013/0262328 A1 | 10/2013 | Federgreen |
| 2013/0282466 A1 | 10/2013 | Hampton |
| 2013/0290169 A1 | 10/2013 | Bathula et al. |
| 2013/0298071 A1 | 11/2013 | Wine |
| 2013/0311224 A1 | 11/2013 | Heroux et al. |
| 2013/0318207 A1 | 11/2013 | Dotter |
| 2013/0326112 A1 | 12/2013 | Park et al. |
| 2013/0332362 A1 | 12/2013 | Ciurea |
| 2013/0340086 A1 | 12/2013 | Blom |
| 2014/0006355 A1 | 1/2014 | Kirihata |
| 2014/0006616 A1 | 1/2014 | Aad et al. |
| 2014/0012833 A1 | 1/2014 | Humprecht |
| 2014/0019561 A1 | 1/2014 | Belity et al. |
| 2014/0032259 A1 | 1/2014 | Lafever et al. |
| 2014/0032265 A1 | 1/2014 | Paprocki |
| 2014/0040134 A1 | 2/2014 | Ciurea |
| 2014/0040161 A1 | 2/2014 | Berlin |
| 2014/0040979 A1 | 2/2014 | Barton et al. |
| 2014/0047551 A1 | 2/2014 | Nagasundaram et al. |
| 2014/0052463 A1 | 2/2014 | Cashman et al. |
| 2014/0074645 A1 | 3/2014 | Ingram |
| 2014/0089027 A1 | 3/2014 | Brown |
| 2014/0089039 A1 | 3/2014 | McClellan |
| 2014/0108173 A1 | 4/2014 | Cooper et al. |
| 2014/0142988 A1 | 5/2014 | Grosso et al. |
| 2014/0143011 A1 | 5/2014 | Mudugu et al. |
| 2014/0164476 A1 | 6/2014 | Thomson |
| 2014/0188956 A1 | 7/2014 | Subba et al. |
| 2014/0196143 A1 | 7/2014 | Fliderman et al. |
| 2014/0208418 A1 | 7/2014 | Libin |
| 2014/0222468 A1 | 8/2014 | Araya et al. |
| 2014/0244309 A1 | 8/2014 | Francois |
| 2014/0244325 A1 | 8/2014 | Cartwright |
| 2014/0244375 A1 | 8/2014 | Kim |
| 2014/0244399 A1 | 8/2014 | Orduna et al. |
| 2014/0257917 A1 | 9/2014 | Spencer et al. |
| 2014/0258093 A1 | 9/2014 | Gardiner et al. |
| 2014/0278663 A1 | 9/2014 | Samuel et al. |
| 2014/0278730 A1 | 9/2014 | Muhart et al. |
| 2014/0283027 A1 | 9/2014 | Orona et al. |
| 2014/0283106 A1 | 9/2014 | Stahura et al. |
| 2014/0288971 A1 | 9/2014 | Whibbs, III |
| 2014/0289681 A1 | 9/2014 | Wielgosz |
| 2014/0289862 A1 | 9/2014 | Gorfein et al. |
| 2014/0317171 A1 | 10/2014 | Fox et al. |
| 2014/0324480 A1 | 10/2014 | Dufel et al. |
| 2014/0337041 A1 | 11/2014 | Madden et al. |
| 2014/0337466 A1 | 11/2014 | Li et al. |
| 2014/0344015 A1 | 11/2014 | Puértolas-Montañés et al. |
| 2015/0012363 A1 | 1/2015 | Grant et al. |
| 2015/0019530 A1 | 1/2015 | Felch |
| 2015/0026056 A1 | 1/2015 | Calman et al. |
| 2015/0026260 A1 | 1/2015 | Worthley |
| 2015/0033112 A1 | 1/2015 | Norwood et al. |
| 2015/0066577 A1 | 3/2015 | Christiansen et al. |
| 2015/0095352 A1* | 4/2015 | Lacey .................. G06F 21/316 707/752 |
| 2015/0106264 A1 | 4/2015 | Johnson |
| 2015/0106867 A1 | 4/2015 | Liang |
| 2015/0106948 A1 | 4/2015 | Holman et al. |
| 2015/0106949 A1 | 4/2015 | Holman et al. |
| 2015/0121462 A1 | 4/2015 | Courage et al. |
| 2015/0143258 A1 | 5/2015 | Carolan et al. |
| 2015/0149362 A1 | 5/2015 | Baum et al. |
| 2015/0154520 A1 | 6/2015 | Federgreen et al. |
| 2015/0169318 A1 | 6/2015 | Nash |
| 2015/0172296 A1 | 6/2015 | Fujioka |
| 2015/0178740 A1 | 6/2015 | Borawski et al. |
| 2015/0199534 A1 | 7/2015 | Francis et al. |
| 2015/0199541 A1 | 7/2015 | Koch et al. |
| 2015/0199702 A1 | 7/2015 | Singh |
| 2015/0229664 A1 | 8/2015 | Hawthorn et al. |
| 2015/0235049 A1 | 8/2015 | Cohen et al. |
| 2015/0235050 A1 | 8/2015 | Wouhaybi et al. |
| 2015/0235283 A1 | 8/2015 | Nishikawa |
| 2015/0242778 A1 | 8/2015 | Wilcox et al. |
| 2015/0242858 A1 | 8/2015 | Smith et al. |
| 2015/0254597 A1 | 9/2015 | Jahagirdar |
| 2015/0261887 A1 | 9/2015 | Joukov |
| 2015/0262189 A1 | 9/2015 | Vergeer |
| 2015/0264417 A1 | 9/2015 | Spitz et al. |
| 2015/0269384 A1 | 9/2015 | Holman et al. |
| 2015/0309813 A1 | 10/2015 | Patel |
| 2015/0310227 A1 | 10/2015 | Ishida et al. |
| 2015/0310575 A1 | 10/2015 | Shelton |

(56) References Cited

U.S. PATENT DOCUMENTS

| | | |
|---|---|---|
| 2015/0348200 A1 | 12/2015 | Fair et al. |
| 2015/0356362 A1 | 12/2015 | Demos |
| 2015/0379430 A1 | 12/2015 | Dirac et al. |
| 2016/0012465 A1 | 1/2016 | Sharp |
| 2016/0026394 A1 | 1/2016 | Goto |
| 2016/0034918 A1 | 2/2016 | Bjelajac et al. |
| 2016/0048700 A1 | 2/2016 | Stransky-Heilkron |
| 2016/0050213 A1 | 2/2016 | Storr |
| 2016/0063523 A1 | 3/2016 | Nistor et al. |
| 2016/0063567 A1 | 3/2016 | Srivastava |
| 2016/0071112 A1 | 3/2016 | Unser |
| 2016/0099963 A1 | 4/2016 | Mahaffey et al. |
| 2016/0103963 A1 | 4/2016 | Mishra |
| 2016/0125550 A1 | 5/2016 | Joao et al. |
| 2016/0125749 A1 | 5/2016 | Delacroix et al. |
| 2016/0125751 A1 | 5/2016 | Barker et al. |
| 2016/0140466 A1 | 5/2016 | Sidebottom et al. |
| 2016/0143570 A1 | 5/2016 | Valacich et al. |
| 2016/0148143 A1 | 5/2016 | Anderson et al. |
| 2016/0162269 A1 | 6/2016 | Pogorelik et al. |
| 2016/0164915 A1 | 6/2016 | Cook |
| 2016/0180386 A1 | 6/2016 | Konig |
| 2016/0188450 A1 | 6/2016 | Appusamy et al. |
| 2016/0189156 A1 | 6/2016 | Kim et al. |
| 2016/0196189 A1 | 7/2016 | Miyagi et al. |
| 2016/0225000 A1 | 8/2016 | Glasgow |
| 2016/0232465 A1 | 8/2016 | Kurtz et al. |
| 2016/0232534 A1 | 8/2016 | Lacey et al. |
| 2016/0234319 A1 | 8/2016 | Griffin |
| 2016/0255139 A1 | 9/2016 | Rathod |
| 2016/0261631 A1 | 9/2016 | Vissamsetty et al. |
| 2016/0262163 A1 | 9/2016 | Gonzalez Garrido et al. |
| 2016/0292621 A1 | 10/2016 | Ciccone et al. |
| 2016/0321582 A1 | 11/2016 | Broudou et al. |
| 2016/0321748 A1 | 11/2016 | Mahatma et al. |
| 2016/0330237 A1 | 11/2016 | Edlabadkar |
| 2016/0342811 A1 | 11/2016 | Whitcomb et al. |
| 2016/0364736 A1 | 12/2016 | Maugans, III |
| 2016/0370954 A1 | 12/2016 | Burningham et al. |
| 2016/0378762 A1 | 12/2016 | Rohter |
| 2016/0381064 A1 | 12/2016 | Chan et al. |
| 2016/0381560 A1* | 12/2016 | Margaliot ............ G06Q 20/322 726/4 |
| 2017/0004055 A1 | 1/2017 | Horan et al. |
| 2017/0032395 A1 | 2/2017 | Kaufman et al. |
| 2017/0032408 A1 | 2/2017 | Kumar et al. |
| 2017/0034101 A1 | 2/2017 | Kumar et al. |
| 2017/0041324 A1 | 2/2017 | Ionutescu et al. |
| 2017/0046399 A1 | 2/2017 | Sankaranarasimhan et al. |
| 2017/0046753 A1 | 2/2017 | Deupree, IV |
| 2017/0068785 A1 | 3/2017 | Experton et al. |
| 2017/0093917 A1 | 3/2017 | Chandra et al. |
| 2017/0115864 A1 | 4/2017 | Thomas et al. |
| 2017/0124570 A1 | 5/2017 | Nidamanuri et al. |
| 2017/0140174 A1 | 5/2017 | Lacey et al. |
| 2017/0140467 A1 | 5/2017 | Neag et al. |
| 2017/0142158 A1 | 5/2017 | Laoutaris et al. |
| 2017/0142177 A1 | 5/2017 | Hu |
| 2017/0154188 A1 | 6/2017 | Meier et al. |
| 2017/0161520 A1 | 6/2017 | Lockhart, III et al. |
| 2017/0171235 A1 | 6/2017 | Mulchandani et al. |
| 2017/0171325 A1 | 6/2017 | Perez |
| 2017/0177324 A1 | 6/2017 | Frank et al. |
| 2017/0180378 A1 | 6/2017 | Tyler et al. |
| 2017/0180505 A1* | 6/2017 | Shaw .................... H04L 67/306 |
| 2017/0193624 A1 | 7/2017 | Tsai |
| 2017/0201518 A1 | 7/2017 | Holmqvist et al. |
| 2017/0206707 A1 | 7/2017 | Guay et al. |
| 2017/0208084 A1 | 7/2017 | Steelman et al. |
| 2017/0220685 A1 | 8/2017 | Yan et al. |
| 2017/0220964 A1 | 8/2017 | Datta Ray |
| 2017/0249710 A1 | 8/2017 | Guillama et al. |
| 2017/0269791 A1 | 9/2017 | Meyerzon et al. |
| 2017/0270318 A1 | 9/2017 | Ritchie |
| 2017/0278004 A1 | 9/2017 | McElhinney et al. |
| 2017/0278117 A1 | 9/2017 | Wallace et al. |
| 2017/0286719 A1 | 10/2017 | Krishnamurthy et al. |
| 2017/0287031 A1 | 10/2017 | Barday |
| 2017/0289199 A1 | 10/2017 | Barday |
| 2017/0308875 A1 | 10/2017 | O'Regan et al. |
| 2017/0316400 A1 | 11/2017 | Venkatakrishnan et al. |
| 2017/0330197 A1 | 11/2017 | DiMaggio et al. |
| 2017/0353404 A1 | 12/2017 | Hodge |
| 2018/0032757 A1 | 2/2018 | Michael |
| 2018/0039975 A1 | 2/2018 | Hefetz |
| 2018/0041498 A1 | 2/2018 | Kikuchi |
| 2018/0046753 A1 | 2/2018 | Shelton |
| 2018/0046939 A1 | 2/2018 | Meron et al. |
| 2018/0063174 A1 | 3/2018 | Grill et al. |
| 2018/0063190 A1 | 3/2018 | Wright et al. |
| 2018/0082368 A1 | 3/2018 | Weinflash et al. |
| 2018/0083843 A1 | 3/2018 | Sambandam |
| 2018/0091476 A1 | 3/2018 | Jakobsson et al. |
| 2018/0131574 A1 | 5/2018 | Jacobs et al. |
| 2018/0131658 A1 | 5/2018 | Bhagwan et al. |
| 2018/0165637 A1 | 6/2018 | Romero et al. |
| 2018/0198614 A1 | 7/2018 | Neumann |
| 2018/0219917 A1 | 8/2018 | Chiang |
| 2018/0239500 A1 | 8/2018 | Allen et al. |
| 2018/0248914 A1 | 8/2018 | Sartor |
| 2018/0285887 A1 | 10/2018 | Maung |
| 2018/0301222 A1 | 10/2018 | Dew, Sr. et al. |
| 2018/0307859 A1 | 10/2018 | Lafever et al. |
| 2018/0349583 A1 | 12/2018 | Turgeman et al. |
| 2018/0351888 A1 | 12/2018 | Howard |
| 2018/0352003 A1 | 12/2018 | Winn et al. |
| 2018/0357243 A1 | 12/2018 | Yoon |
| 2018/0365720 A1 | 12/2018 | Goldman et al. |
| 2018/0374030 A1 | 12/2018 | Barday et al. |
| 2018/0375814 A1 | 12/2018 | Hart |
| 2019/0005210 A1 | 1/2019 | Wiederspohn et al. |
| 2019/0012672 A1 | 1/2019 | Francesco |
| 2019/0019184 A1 | 1/2019 | Lacey et al. |
| 2019/0050547 A1 | 2/2019 | Welsh et al. |
| 2019/0087570 A1 | 3/2019 | Sloane |
| 2019/0096020 A1 | 3/2019 | Barday et al. |
| 2019/0108353 A1 | 4/2019 | Sadeh et al. |
| 2019/0130132 A1 | 5/2019 | Barbas et al. |
| 2019/0138496 A1 | 5/2019 | Yamaguchi |
| 2019/0148003 A1 | 5/2019 | Van Hoe |
| 2019/0156053 A1 | 5/2019 | Vogel et al. |
| 2019/0156058 A1 | 5/2019 | Van Dyne et al. |
| 2019/0171801 A1 | 6/2019 | Barday et al. |
| 2019/0179652 A1 | 6/2019 | Hesener et al. |
| 2019/0180051 A1 | 6/2019 | Barday et al. |
| 2019/0182294 A1 | 6/2019 | Rieke et al. |
| 2019/0188402 A1 | 6/2019 | Wang et al. |
| 2019/0266201 A1 | 8/2019 | Barday et al. |
| 2019/0266350 A1 | 8/2019 | Barday et al. |
| 2019/0268343 A1 | 8/2019 | Barday et al. |
| 2019/0268344 A1 | 8/2019 | Barday et al. |
| 2019/0272492 A1 | 9/2019 | Elledge et al. |
| 2019/0294818 A1 | 9/2019 | Barday et al. |
| 2019/0332802 A1 | 10/2019 | Barday et al. |
| 2019/0332807 A1 | 10/2019 | Lafever et al. |
| 2019/0333118 A1 | 10/2019 | Crimmins et al. |
| 2019/0362169 A1 | 11/2019 | Lin et al. |
| 2019/0362268 A1 | 11/2019 | Fogarty et al. |
| 2019/0378073 A1 | 12/2019 | Lopez et al. |
| 2019/0384934 A1 | 12/2019 | Kim |
| 2019/0392170 A1 | 12/2019 | Barday et al. |
| 2019/0392171 A1 | 12/2019 | Barday et al. |
| 2020/0020454 A1 | 1/2020 | McGarvey et al. |
| 2020/0051117 A1 | 2/2020 | Mitchell |
| 2020/0074471 A1 | 3/2020 | Adjaoute |
| 2020/0082270 A1 | 3/2020 | Gu et al. |
| 2020/0090197 A1 | 3/2020 | Rodriguez et al. |
| 2020/0092179 A1 | 3/2020 | Chieu et al. |
| 2020/0110589 A1 | 4/2020 | Bequet et al. |
| 2020/0137097 A1 | 4/2020 | Zimmermann et al. |
| 2020/0143797 A1 | 5/2020 | Manoharan et al. |
| 2020/0183655 A1 | 6/2020 | Barday et al. |
| 2020/0186355 A1 | 6/2020 | Davies |
| 2020/0193018 A1 | 6/2020 | Van Dyke |

(56) References Cited

U.S. PATENT DOCUMENTS

| | | |
|---|---|---|
| 2020/0193022 A1 | 6/2020 | Lunsford et al. |
| 2020/0210558 A1 | 7/2020 | Barday et al. |
| 2020/0210620 A1 | 7/2020 | Haletky |
| 2020/0220901 A1 | 7/2020 | Barday et al. |
| 2020/0226196 A1 | 7/2020 | Brannon et al. |
| 2020/0242719 A1 | 7/2020 | Lee |
| 2020/0250342 A1 | 8/2020 | Miller et al. |
| 2020/0252817 A1 | 8/2020 | Brouillette et al. |
| 2020/0272764 A1 | 8/2020 | Brannon et al. |
| 2020/0293679 A1 | 9/2020 | Handy Bosma et al. |
| 2020/0296171 A1 | 9/2020 | Mocanu et al. |
| 2020/0302089 A1 | 9/2020 | Barday et al. |
| 2020/0311310 A1 | 10/2020 | Barday et al. |
| 2020/0344243 A1 | 10/2020 | Brannon et al. |
| 2020/0356695 A1 | 11/2020 | Brannon et al. |
| 2020/0364369 A1 | 11/2020 | Brannon et al. |
| 2020/0372178 A1 | 11/2020 | Barday et al. |
| 2020/0401380 A1 | 12/2020 | Jacobs et al. |
| 2020/0410117 A1 | 12/2020 | Barday et al. |
| 2020/0410131 A1 | 12/2020 | Barday et al. |
| 2020/0410132 A1 | 12/2020 | Brannon et al. |
| 2021/0012341 A1 | 1/2021 | Garg et al. |
| 2021/0125089 A1 | 4/2021 | Nickl et al. |

FOREIGN PATENT DOCUMENTS

| | | |
|---|---|---|
| EP | 1394698 | 3/2004 |
| EP | 2031540 | 3/2009 |
| KR | 20130062500 | 6/2013 |
| WO | 2001033430 | 5/2001 |
| WO | 2005008411 | 1/2005 |
| WO | 2007002412 | 1/2007 |
| WO | 2012174659 | 12/2012 |
| WO | 2015116905 | 8/2015 |

OTHER PUBLICATIONS

Srivastava, Agrima, et al, Measuring Privacy Leaks in Online Social Networks, International Conference on Advances in Computing, Communications and Informatics (ICACCI), 2013.

Stern, Joanna, "iPhone Privacy Is Broken . . . and Apps Are to Blame", The Wall Street Journal, wsj.com, May 31, 2019.

Strodl, et al, "Personal & SOHO Archiving," Vienna University of Technology, Vienna, Austria, JCDL '08, Jun. 16-20, 2008, Pittsburgh, Pennsylvania, USA, pp. 115-123 (Year: 2008).

Sukumar et al, "Review on Modern Data Preprocessing Techniques in Web Usage Mining (WUM)," IEEE, 2016, pp. 54-69 (Year: 2016).

Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.

Tanasa et al, "Advanced Data Preprocessing for Intersites Web Usage Mining," IEEE, Mar. 2004, pp. 59-65 (Year: 2004).

The Cookie Collective, Optanon Cookie Policy Generator, The Cookie Collective, Year 2016, http://web.archive.org/web/20160324062743/https:/optanon.com/.

Thuraisingham, "Security Issues for the Semantic Web," Proceedings 27th Annual International Computer Software and Applications Conference, COMPSAC 2003, Dallas, TX, USA, 2003, pp. 633-638 (Year: 2003).

TRUSTe Announces General Availability of Assessment Manager for Enterprises to Streamline Data Privacy Management with Automation, PRNewswire, Mar. 4, 2015.

Tsai et al, "Determinants of Intangible Assets Value: The Data Mining Approach," Knowledge Based System, pp. 67-77 http://www.elsevier.com/locate/knosys (Year 2012).

Tuomas Aura et al., Scanning Electronic Documents for Personally Identifiable Information, ACM, Oct. 30, 2006, retrieved online on Jun. 13, 2019, pp. 41-49. Retrieved from the Internet: URL: http://delivery.acm.org/10.1145/1180000/1179608/p41-aura.pdf? (Year: 2006).

Wang et al, "Revealing Key Non-Financial Factors for Online Credit-Scoring in E-Financing," 2013, IEEE, pp. 1-6 (Year: 2013).

Wang et al, "Secure and Efficient Access to Outsourced Data," ACM, pp. 55-65 (Year: 2009).

Weaver et al, "Understanding Information Preview in Mobile Email Processing", ACM, pp. 303-312, 2011 (Year: 2011).

Written Opinion of the International Searching Authority, dated Jun. 6, 2017, from corresponding International Application No. PCT/US2017/025611.

Written Opinion of the International Searching Authority, dated Aug. 15, 2017, from corresponding International Application No. PCT/US2017/036919.

Written Opinion of the International Searching Authority, dated Aug. 21, 2017, from corresponding International Application No. PCT/US2017/036914.

Written Opinion of the International Searching Authority, dated Aug. 29, 2017, from corresponding International Application No. PCT/US2017/036898.

Written Opinion of the International Searching Authority, dated Aug. 8, 2017, from corresponding International Application No. PCT/US2017/036889.

Written Opinion of the International Searching Authority, dated Aug. 8, 2017, from corresponding International Application No. PCT/US2017/036890.

Written Opinion of the International Searching Authority, dated Aug. 8, 2017, from corresponding International Application No. PCT/US2017/036893.

Written Opinion of the International Searching Authority, dated Aug. 8, 2017, from corresponding International Application No. PCT/US2017/036901.

Written Opinion of the International Searching Authority, dated Aug. 8, 2017, from corresponding International Application No. PCT/US2017/036913.

Written Opinion of the International Searching Authority, dated Aug. 8, 2017, from corresponding International Application No. PCT/US2017/036920.

Written Opinion of the International Searching Authority, dated Dec. 14, 2018, from corresponding International Application No. PCT/US2018/045296.

Written Opinion of the International Searching Authority, dated Jan. 14, 2019, from corresponding International Application No. PCT/US2018/046949.

Written Opinion of the International Searching Authority, dated Jan. 7, 2019, from corresponding International Application No. PCT/US2018/055772.

Written Opinion of the International Searching Authority, dated Jun. 21, 2017, from corresponding International Application No. PCT/US2017/025600.

Written Opinion of the International Searching Authority, dated Jun. 6, 2017, from corresponding International Application No. PCT/US2017/025605.

Written Opinion of the International Searching Authority, dated Mar. 14, 2019, from corresponding International Application No. PCT/US2018/055736.

Written Opinion of the International Searching Authority, dated Mar. 4, 2019, from corresponding International Application No. PCT/US2018/055773.

Written Opinion of the International Searching Authority, dated Mar. 4, 2019, from corresponding International Application No. PCT/US2018/055774.

Written Opinion of the International Searching Authority, dated Nov. 19, 2018, from corresponding International Application No. PCT/US2018/046939.

Written Opinion of the International Searching Authority, dated Oct. 11, 2018, from corresponding International Application No. PCT/US2018/043975.

Written Opinion of the International Searching Authority, dated Oct. 11, 2018, from corresponding International Application No. PCT/US2018/043976.

Written Opinion of the International Searching Authority, dated Oct. 11, 2018, from corresponding International Application No. PCT/US2018/043977.

(56) References Cited

OTHER PUBLICATIONS

Written Opinion of the International Searching Authority, dated Oct. 11, 2018, from corresponding International Application No. PCT/US2018/044026.
Written Opinion of the International Searching Authority, dated Oct. 11, 2018, from corresponding International Application No. PCT/US2018/045240.
Written Opinion of the International Searching Authority, dated Oct. 12, 2017, from corresponding International Application No. PCT/US2017/036888.
Written Opinion of the International Searching Authority, dated Oct. 12, 2018, from corresponding International Application No. PCT/US2018/044046.
Written Opinion of the International Searching Authority, dated Oct. 16, 2018, from corresponding International Application No. PCT/US2018/045243.
Written Opinion of the International Searching Authority, dated Oct. 18, 2018, from corresponding International Application No. PCT/US2018/045249.
Written Opinion of the International Searching Authority, dated Oct. 20, 2017, from corresponding International Application No. PCT/US2017/036917.
Written Opinion of the International Searching Authority, dated Oct. 3, 2017, from corresponding International Application No. PCT/US2017/036912.
Written Opinion of the International Searching Authority, dated Sep. 1, 2017, from corresponding International Application No. PCT/US2017/036896.
Written Opinion of the International Searching Authority, dated Sep. 12, 2018, from corresponding International Application No. PCT/US2018/037504.
Wu et al, "Data Mining with Big Data," IEEE, Jan. 2014, pp. 97-107, vol. 26, No. 1, (Year: 2014).
www.truste.com (1), 200150207, Internet Archive Wayback Machine, www.archive.org,2_7_2015.
Xu, et al, "GatorShare: A File System Framework for High-Throughput Data Management," ACM, pp. 776-786 (Year: 2010).
Invitation to Pay Additional Search Fees, dated Aug. 10, 2017, from corresponding International Application No. PCT/US2017/036917.
Invitation to Pay Additional Search Fees, dated Aug. 24, 2017, from corresponding International Application No. PCT/US2017/036888.
Invitation to Pay Additional Search Fees, dated Jan. 18, 2019, from corresponding International Application No. PCT/US2018/055736.
Invitation to Pay Additional Search Fees, dated Jan. 7, 2019, from corresponding International Application No. PCT/US2018/055773.
Invitation to Pay Additional Search Fees, dated Jan. 8, 2019, from corresponding International Application No. PCT/US2018/055774.
Invitation to Pay Additional Search Fees, dated Oct. 23, 2018, from corresponding International Application No. PCT/US2018/045296.
Islam, et al, "Mixture Model Based Label Association Techniques for Web Accessibility," ACM, pp. 67-76 (Year: 2010).
Joel Reardon et al., Secure Data Deletion from Persistent Media, ACM, Nov. 4, 2013, retrieved online on Jun. 13, 2019, pp. 271-283. Retrieved from the Internet: URL: http://delivery.acm.org/10.1145/2520000/2516699/p271-reardon.pdf? (Year: 2013).
Joonbakhsh et al, "Mining and Extraction of Personal Software Process measures through IDE Interaction logs," ACM/IEEE, 2018, retrieved online on Dec. 2, 2019, pp. 78-81. Retrieved from the Internet: URL: http://delivery.acm.org/10.114513200000/3196462/p78-joonbakhsh.pdf?(Year: 2018).
Jun et al, "Scalable Multi-Access Flash Store for Big Data Analytics," ACM, pp. 55-64 (Year: 2014).
Kirkham, et al, "A Personal Data Store for an Internet of Subjects," IEEE, pp. 92-97 (Year: 2011).
Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.
Krol, Kat, et al, Control versus Effort in Privacy Warnings for Webforms, ACM, Oct. 24, 2016, pp. 13-23.
Lamb et al, "Role-Based Access Control for Data Service Integration", ACM, pp. 3-11 (Year: 2006).
Leadbetter, et al, "Where Big Data Meets Linked Data: Applying Standard Data Models to Environmental Data Streams," IEEE, pp. 2929-2937 (Year: 2016).
Lebeau, Franck, et al, "Model-Based Vulnerability Testing for Web Applications," 2013 IEEE Sixth International Conference on Software Testing, Verification and Validation Workshops, pp. 445-452, IEEE, 2013 (Year: 2013).
Li, Ninghui, et al, t-Closeness: Privacy Beyond k-Anonymity and I-Diversity, IEEE, 2014, p. 106-115.
Liu et al, "Cross-Geography Scientific Data Transferring Trends and Behavior," ACM, pp. 267-278 (Year: 2018).
Liu, Kun, et al, A Framework for Computing the Privacy Scores of Users in Online Social Networks, ACM Transactions on Knowledge Discovery from Data, vol. 5, No. 1, Article 6, Dec. 2010, 30 pages.
Lizar et al, "Usable Consents: Tracking and Managing Use of Personal Data with a Consent Transaction Receipt," Proceedings of the 2014 ACM International Joint Conference on Pervasive and Ubiquitous Computing: Adjunct Publication, 2014, pp. 647-652 (Year: 2014).
Maret et al, "Multimedia Information Interchange: Web Forms Meet Data Servers", IEEE, pp. 499-505 (Year: 1999).
McGarth et al, "Digital Library Technology for Locating and Accessing Scientific Data", ACM, pp. 188-194 (Year: 1999).
Mesbah et al, "Crawling Ajax-Based Web Applications Through Dynamic Analysis of User Interface State Changes," ACM Transactions on the Web (TWEB) vol. 6, No. 1, Article 3, Mar. 2012, pp. 1-30 (Year: 2012).
Moiso et al, "Towards a User-Centric Personal Data Ecosystem the Role of the Bank of Individual's Data," 2012 16th International Conference on Intelligence in Next Generation Networks, Berlin, 2012, pp. 202-209 (Year 2012).
Moscoso-Zea et al, "Datawarehouse Design for Educational Data Mining," IEEE, pp. 1-6 (Year: 2016).
Mudepalli et al, "An efficient data retrieval approach using blowfish encryption on cloud CipherText Retrieval in Cloud computing" IEEE, pp. 267-271 (Year: 2017).
Mundada et al, "Half-Baked Cookies: Hardening Cookie-Based Authentication for the Modem Web," Proceedings of the 11th ACM on Asia Conference on Computer and Communications Security, 2016, pp. 675-685 (Year: 2016).
Newman et al, "High Speed Scientific Data Transfers using Software Defined Networking," ACM, pp. 1-9 (Year 2015).
Newman, "Email Archive Overviews using Subject Indexes", ACM, pp. 652-653, 2002 (Year 2002).
Notice of Filing Date for Petition for Post-Grant Review of related U.S. Pat. No. 9,691,090 dated Apr. 12, 2018.
O'Keefe et al, "Privacy-Preserving Data Linkage Protocols," Proceedings of the 2004 ACM Workshop on Privacy in be Electronic Society, 2004, pp. 94-102 (Year 2004).
Olenski, Steve, For Consumers, Data Is a Matter of Trust, CMO Network, Apr. 18, 2016, https://www.forbes.com/sites/steveolenski/2016/04/18/for-consumers-data-is-a-matter-of-trust/#2e48496278b3.
Pechenizkiy et al, "Process Mining Online Assessment Data," Educational Data Mining, pp. 279-288 (Year 2009).
Petition for Post-Grant Review of related U.S. Pat. No. 9,691,090 dated Mar. 27, 2018.
Petrie et al, "The Relationship between Accessibility and Usability of Websites", ACM, pp. 397-406 (Year: 2007).
Pfeifle, Sam, The Privacy Advisor, IAPP and AvePoint Launch New Free PIA Tool, International Association of Privacy Professionals, Mar. 5, 2014.
Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_towi, Mar. 28, 2014, p. 1-3.
Ping et al, "Wide Area Placement of Data Replicas for Fast and Highly Available Data Access," ACM, pp. 1-8 (Year: 2011).
Popescu-Zeletin, "The Data Access and Transfer Support in a Local Heterogeneous Network (HMINET)", IEEE, pp. 147-152 (Year: 1979).

(56) References Cited

OTHER PUBLICATIONS

Porter, "De-Identified Data and Third Party Data Mining: The Risk of Re-Identification of Personal Information," Shidler JL Com. & Tech. 5, 2008, pp. 1-9 (Year: 2008).
Qing-Jiang et al, "The (P, a, K) Anonymity Model for Privacy Protection of Personal Information in the Social Networks," 2011 6th IEEE Joint International Information Technology and Artificial Intelligence Conference, vol. 2 IEEE, 2011, pp. 420-423 (Year: 2011).
Qiu, et al, "Design and Application of Data Integration Platform Based on Web Services and XML," IEEE, pp. 253-256 (Year: 2016).
Rozepz, "What is Google Privacy Checkup? Everything You Need to Know," Tom's Guide web post, Apr. 26, 2018, pp. 1-11 (Year: 2018).
Salim et al, "Data Retrieval and Security using Lightweight Directory Access Protocol", IEEE, pp. 685-688 (Year: 2009).
Santhisree, et al, "Web Usage Data Clustering Using Dbscan Algorithm and Set Similarities," IEEE, pp. 220-224 (Year: 2010).
Sanzo et al, "Analytical Modeling of Lock-Based Concurrency Control with Arbitrary Transaction Data Access Patterns," ACM, pp. 69-78 (Year: 2010).
Schwartz, Edward J., et al, 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, p. 317-331.
Sedinic et al, "Security Risk Management in Complex Organization," May 29, 2015, IEEE, pp. 1331-1337 (Year: 2015).
Singh, et al, "A Metadata Catalog Service for Data Intensive Applications," ACM, pp. 1-17 (Year: 2003).
Slezak, et al, "Brighthouse: An Analytic Data Warehouse for Ad-hoc Queries," ACM, pp. 1337-1345 (Year: 2008).
Yang et al, "DAC-MACS: Effective Data Access Control for Multiauthority Cloud Storage Systems," IEEE, pp. 1790-1801 (Year: 2013).
Yang et al, "Mining Web Access Sequence with Improved Apriori Algorithm," IEEE, 2017, pp. 780-784 (Year: 2017).
Ye et al, "An Evolution-Based Cache Scheme for Scalable Mobile Data Access," ACM, pp. 1-7 (Year: 2007).
Yin et al, "Multibank Memory Optimization for Parallel Data Access in Multiple Data Arrays", ACM, pp. 1-8 (Year: 2016).
Yiu et al, "Outsourced Similarity Search on Metric Data Assets", IEEE, pp. 338-352 (Year: 2012).
Yu, "Using Data from Social Media Websites to Inspire the Design of Assistive Technology", ACM, pp. 1-2 (Year: 2016).
Yu, et al, "Performance and Fairness Issues in Big Data Transfers," ACM, pp. 9-11 (Year: 2014).
Zannone, et al, "Maintaining Privacy on Derived Objects," ACM, pp. 10-19 (Year 2005).
Zhang et al, "Data Transfer Performance Issues for a Web Services Interface to Synchrotron Experiments", ACM, pp. 59-65 (Year: 2007).
Zhang et al, "Dynamic Topic Modeling for Monitoring Market Competition from Online Text and Image Data", ACM, pp. 1425-1434 (Year: 2015).
Zheng, et al, "Methodologies for Cross-Domain Data Fusion: An Overview," IEEE, pp. 16-34 (Year: 2015).
Zhu, et al, "Dynamic Data Integration Using Web Services," IEEE, pp. 1-8 (Year: 2004).
Office Action, dated Dec. 11, 2019, from corresponding U.S. Appl. No. 16/578,712.
Office Action, dated Dec. 14, 2018, from corresponding U.S. Appl. No. 16/104,393.
Office Action, dated Dec. 15, 2016, from corresponding U.S. Appl. No. 15/256,419.
Office Action, dated Dec. 16, 2019, from corresponding U.S. Appl. No. 16/563,754.
Office Action, dated Dec. 16, 2019, from corresponding U.S. Appl. No. 16/565,265.
Office Action, dated Dec. 16, 2020, from corresponding U.S. Appl. No. 17/020,275.
Office Action, dated Dec. 18, 2020, from corresponding U.S. Appl. No. 17/030,714.
Office Action, dated Dec. 19, 2019, from corresponding U.S. Appl. No. 16/410,866.
Office Action, dated Dec. 2, 2019, from corresponding U.S. Appl. No. 16/560,963.
Office Action, dated Dec. 23, 2019, from corresponding U.S. Appl. No. 16/593,639.
Office Action, dated Dec. 24, 2020, from corresponding U.S. Appl. No. 17/068,454.
Office Action, dated Dec. 3, 2018, from corresponding U.S. Appl. No. 16/055,998.
Office Action, dated Dec. 31, 2018, from corresponding U.S. Appl. No. 16/160,577.
Office Action, dated Dec. 8, 2020, from corresponding U.S. Appl. No. 17/013,758.
Office Action, dated Dec. 8, 2020, from corresponding U.S. Appl. No. 17/068,198.
Office Action, dated Feb. 10, 2021, from corresponding U.S. Appl. No. 16/862,944.
Office Action, dated Feb. 10, 2021, from corresponding U.S. Appl. No. 17/106,469.
Office Action, dated Feb. 15, 2019, from corresponding U.S. Appl. No. 16/220,899.
Office Action, dated Feb. 17, 2021, from corresponding U.S. Appl. No. 16/862,948.
Office Action, dated Feb. 18, 2021, from corresponding U.S. Appl. No. 16/862,952.
Office Action, dated Feb. 2, 2021, from corresponding U.S. Appl. No. 17/101,915.
Office Action, dated Feb. 26, 2019, from corresponding U.S. Appl. No. 16/228,250.
Office Action, dated Feb. 3, 2021, from corresponding U.S. Appl. No. 17/013,757.
Office Action, dated Feb. 5, 2020, from corresponding U.S. Appl. No. 16/586,202.
Office Action, dated Feb. 6, 2020, from corresponding U.S. Appl. No. 16/707,762.
Office Action, dated Feb. 8, 2021, from corresponding U.S. Appl. No. 17/139,650.
Office Action, dated Feb. 9, 2021, from corresponding U.S. Appl. No. 16/808,493.
Office Action, dated Jan. 18, 2019, from corresponding U.S. Appl. No. 16/055,984.
Office Action, dated Jan. 22, 2021, from corresponding U.S. Appl. No. 17/099,270.
Office Action, dated Jan. 24, 2020, from corresponding U.S. Appl. No. 16/505,426.
Office Action, dated Jan. 24, 2020, from corresponding U.S. Appl. No. 16/700,049.
Office Action, dated Jan. 27, 2020, from corresponding U.S. Appl. No. 16/656,895.
Office Action, dated Jan. 28, 2020, from corresponding U.S. Appl. No. 16/712,104.
Office Action, dated Jan. 29, 2021, from corresponding U.S. Appl. No. 17/101,106.
Office Action, dated Jan. 4, 2019, from corresponding U.S. Appl. No. 16/159,566.
Office Action, dated Jan. 4, 2019, from corresponding U.S. Appl. No. 16/159,628.
Office Action, dated Jan. 4, 2021, from corresponding U.S. Appl. No. 17/013,756.
Office Action, dated Jan. 7, 2020, from corresponding U.S. Appl. No. 16/572,182.
Office Action, dated Jul. 18, 2019, from corresponding U.S. Appl. No. 16/410,762.
Office Action, dated Jul. 21, 2017, from corresponding U.S. Appl. No. 15/256,430.
Office Action, dated Jul. 23, 2019, from corresponding U.S. Appl. No. 16/436,616.

(56) References Cited

OTHER PUBLICATIONS

Office Action, dated Jul. 24, 2020, from corresponding U.S. Appl. No. 16/404,491.
Office Action, dated Jul. 27, 2020, from corresponding U.S. Appl. No. 16/595,342.
Office Action, dated Jun. 1, 2020, from corresponding U.S. Appl. No. 16/862,952.
Office Action, dated Jun. 24, 2019, from corresponding U.S. Appl. No. 16/410,336.
Office Action, dated Jun. 27, 2019, from corresponding U.S. Appl. No. 16/404,405.
Office Action, dated Mar. 11, 2019, from corresponding U.S. Appl. No. 16/220,978.
Office Action, dated Mar. 12, 2019, from corresponding U.S. Appl. No. 16/221,153.
Office Action, dated Mar. 15, 2021, from corresponding U.S. Appl. No. 17/149,421.
Office Action, dated Mar. 16, 2020, from corresponding U.S. Appl. No. 16/719,488.
Office Action, dated Sep. 4, 2020, from corresponding U.S. Appl. No. 16/989,086.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Notice of Allowance, dated Apr. 12, 2017, from corresponding U.S. Appl. No. 15/256,419.
Notice of Allowance, dated Apr. 17, 2020, from corresponding U.S. Appl. No. 16/593,639.
Notice of Allowance, dated Apr. 2, 2019, from con-responding U.S. Appl. No. 16/160,577.
Notice of Allowance, dated Apr. 25, 2018, from corresponding U.S. Appl. No. 15/883,041.
Notice of Allowance, dated Apr. 29, 2020, from corresponding U.S. Appl. No. 16/700,049.
Notice of Allowance, dated Apr. 30, 2020, from corresponding U.S. Appl. No. 16/565,265.
Notice of Allowance, dated Apr. 30, 2020, from corresponding U.S. Appl. No. 16/820,346.
Notice of Allowance, dated Apr. 8, 2019, from corresponding U.S. Appl. No. 16/228,250.
Notice of Allowance, dated Apr. 8, 2020, from corresponding U.S. Appl. No. 16/791,348.
Notice of Allowance, dated Apr. 9, 2020, from corresponding U.S. Appl. No. 16/791,075.
Notice of Allowance, dated Aug. 10, 2020, from corresponding U.S. Appl. No. 16/671,444.
Notice of Allowance, dated Aug. 10, 2020, from corresponding U.S. Appl. No. 16/788,633.
Notice of Allowance, dated Aug. 12, 2020, from corresponding U.S. Appl. No. 16/719,488.
Notice of Allowance, dated Aug. 14, 2018, from corresponding U.S. Appl. No. 15/989,416.
Notice of Allowance, dated Aug. 18, 2017, from corresponding U.S. Appl. No. 15/619,455.
Notice of Allowance, dated Aug. 20, 2019, from corresponding U.S. Appl. No. 16/241,710.
Notice of Allowance, dated Aug. 24, 2018, from corresponding U.S. Appl. No. 15/619,479.
Notice of Allowance, dated Aug. 26, 2019, from corresponding U.S. Appl. No. 16/443,374.
Notice of Allowance, dated Aug. 26, 2020, from corresponding U.S. Appl. No. 16/808,503.
Notice of Allowance, dated Aug. 28, 2019, from corresponding U.S. Appl. No. 16/278,120.
Notice of Allowance, dated Aug. 30, 2018, from corresponding U.S. Appl. No. 15/996,208.
Notice of Allowance, dated Aug. 7, 2020, from corresponding U.S. Appl. No. 16/901,973.
Notice of Allowance, dated Aug. 9, 2018, from corresponding U.S. Appl. No. 15/882,989.
Notice of Allowance, dated Dec. 10, 2018, from corresponding U.S. Appl. No. 16/105,602.
Notice of Allowance, dated Dec. 11, 2019, from corresponding U.S. Appl. No. 16/278,122.
Notice of Allowance, dated Dec. 11, 2019, from corresponding U.S. Appl. No. 16/593,634.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.
Notice of Allowance, dated Dec. 12, 2017, from corresponding U.S. Appl. No. 15/619,382.
Notice of Allowance, dated Dec. 13, 2019, from corresponding U.S. Appl. No. 16/512,033.
Notice of Allowance, dated Dec. 15, 2020, from corresponding U.S. Appl. No. 16/989,086.
Notice of Allowance, dated Dec. 16, 2019, from corresponding U.S. Appl. No. 16/505,461.
Notice of Allowance, dated Dec. 17, 2020, from corresponding U.S. Appl. No. 17/034,772.
Notice of Allowance, dated Dec. 18, 2019, from corresponding U.S. Appl. No. 16/659,437.
Notice of Allowance, dated Dec. 23, 2019, from corresponding U.S. Appl. No. 16/656,835.
Notice of Allowance, dated Dec. 23, 2020, from corresponding U.S. Appl. No. 17/068,557.
Notice of Allowance, dated Dec. 3, 2019, from corresponding U.S. Appl. No. 16/563,749.
Notice of Allowance, dated Dec. 31, 2018, from corresponding U.S. Appl. No. 16/159,634.
Notice of Allowance, dated Dec. 31, 2019, from corresponding U.S. Appl. No. 16/404,399.
Notice of Allowance, dated Dec. 4, 2019, from corresponding U.S. Appl. No. 16/594,670.
Notice of Allowance, dated Dec. 5, 2017, from corresponding U.S. Appl. No. 15/633,703.
Notice of Allowance, dated Dec. 6, 2017, from corresponding U.S. Appl. No. 15/619,451.
Notice of Allowance, dated Dec. 6, 2017, from corresponding U.S. Appl. No. 15/619,459.
Notice of Allowance, dated Dec. 7, 2020, from corresponding U.S. Appl. No. 16/817,136.
Notice of Allowance, dated Dec. 9, 2019, from corresponding U.S. Appl. No. 16/565,261.
Bieker, et al, "Privacy-Preserving Authentication Solutions—Best Practices for Implementation and EU Regulatory Perspectives," Oct. 29, 2014, IEEE, pp. 1-10 (Year: 2014).
Final Office Action, dated Apr. 27, 2021, from corresponding U.S. Appl. No. 17/068,454.
Final Office Action, dated Mar. 26, 2021, from corresponding U.S. Appl. No. 17/020,275.
Notice of Allowance, dated Apr. 19, 2021, from corresponding U.S. Appl. No. 17/164,029.
Notice of Allowance, dated Apr. 2, 2021, from corresponding U.S. Appl. No. 17/162,006.
Notice of Allowance, dated Apr. 22, 2021, from corresponding U.S. Appl. No. 17/163,701.
Notice of Allowance, dated Apr. 28, 2021, from corresponding U.S. Appl. No. 17/135,445.
Notice of Allowance, dated Apr. 28, 2021, from corresponding U.S. Appl. No. 17/181,828.
Notice of Allowance, dated Apr. 30, 2021, from corresponding U.S. Appl. No. 16/410,762.
Notice of Allowance, dated Mar. 19, 2021, from corresponding U.S. Appl. No. 17/013,757.
Notice of Allowance, dated Mar. 31, 2021, from corresponding U.S. Appl. No. 17/013,758.

(56) References Cited

OTHER PUBLICATIONS

Notice of Allowance, dated Mar. 31, 2021, from corresponding U.S. Appl. No. 17/162,205.
Office Action, dated Apr. 1, 2021, from corresponding U.S. Appl. No. 17/119,080.
Office Action, dated Apr. 15, 2021, from corresponding U.S. Appl. No. 17/161,159.
Office Action, dated Apr. 2, 2021, from corresponding U.S. Appl. No. 17/151,334.
Office Action, dated Apr. 28, 2021, from corresponding U.S. Appl. No. 16/808,497.
Office Action, dated Mar. 30, 2021, from corresponding U.S. Appl. No. 17/151,399.
Reardon et al., User-Level Secure Deletion on Log-Structured File Systems, ACM, 2012, retrieved online on Apr. 22, 2021, pp. 1-11. Retrieved from the Internet: URL: http://citeseerx.ist.psu.edu/viewdoc/download; isessionid=450713515DC7F19F8ED09AE961D4B60E. (Year: 2012).
Soceanu, et al, "Managing the Privacy and Security of eHealth Data," May 29, 2015, IEEE, pp. 1-8 (Year: 2015).
Zheng, et al, "Toward Assured Data Deletion in Cloud Storage," IEEE, vol. 34, No. 3, pp. 101-107 May/Jun. 2020 (Year: 2020).
Office Action, dated Mar. 17, 2020, from corresponding U.S. Appl. No. 161565,395.
Office Action, dated Mar. 17, 2020, from corresponding U.S. Appl. No. 16/719,071.
Office Action, dated Mar. 20, 2020, from corresponding U.S. Appl. No. 16/778,709.
Office Action, dated Mar. 23, 2020, from corresponding U.S. Appl. No. 16/671,444.
Office Action, dated Mar. 25, 2019, from corresponding U.S. Appl. No. 16/278,121.
Office Action, dated Mar. 25, 2020, from corresponding U.S. Appl. No. 16/701,043.
Office Action, dated Mar. 25, 2020, from corresponding U.S. Appl. No. 16/791,006.
Office Action, dated Mar. 27, 2019, from corresponding U.S. Appl. No. 16/278,120.
Office Action, dated Mar. 30, 2018, from corresponding U.S. Appl. No. 15/894,890.
Office Action, dated Mar. 30, 2018, from corresponding U.S. Appl. No. 15/896,790.
Office Action, dated Mar. 4, 2019, from corresponding U.S. Appl. No. 16/237,083.
Office Action, dated May 14, 2020, from corresponding U.S. Appl. No. 16/808,497.
Office Action, dated May 14, 2020, from corresponding U.S. Appl. No. 16/808,503.
Office Action, dated May 15, 2020, from corresponding U.S. Appl. No. 16/808,493.
Office Action, dated May 16, 2018, from corresponding U.S. Appl. No. 15/882,989.
Office Action, dated May 17, 2019, from corresponding U.S. Appl. No. 16/277,539.
Office Action, dated May 2, 2018, from corresponding U.S. Appl. No. 15/894,809.
Office Action, dated May 2, 2019, from corresponding U.S. Appl. No. 16/104,628.
Office Action, dated May 29, 2020, from corresponding U.S. Appl. No. 16/862,944.
Office Action, dated May 29, 2020, from corresponding U.S. Appl. No. 16/862,948.
Office Action, dated May 29, 2020, from corresponding U.S. Appl. No. 16/863,226.
Office Action, dated May 5, 2020, from corresponding U.S. Appl. No. 16/410,336.
Office Action, dated Nov. 1, 2017, from corresponding U.S. Appl. No. 15/169,658.
Office Action, dated Nov. 12, 2020, from corresponding U.S. Appl. No. 17/034,355.
Office Action, dated Nov. 12, 2020, from corresponding U.S. Appl. No. 17/034,772.
Office Action, dated Nov. 15, 2018, from corresponding U.S. Appl. No. 16/059,911.
Office Action, dated Nov. 15, 2019, from corresponding U.S. Appl. No. 16/552,758.
Office Action, dated Nov. 18, 2019, from corresponding U.S. Appl. No. 16/560,885.
Office Action, dated Nov. 18, 2019, from corresponding U.S. Appl. No. 16/560,889.
Office Action, dated Nov. 18, 2019, from corresponding U.S. Appl. No. 16/572,347.
Office Action, dated Nov. 19, 2019, from corresponding U.S. Appl. No. 16/595,342.
Office Action, dated Nov. 20, 2019, from corresponding U.S. Appl. No. 16/595,327.
Office Action, dated Nov. 23, 2018, from corresponding U.S. Appl. No. 16/042,673.
Office Action, dated Nov. 24, 2020, from corresponding U.S. Appl. No. 16/925,628.
Office Action, dated Oct. 10, 2018, from corresponding U.S. Appl. No. 16/041,563.
Office Action, dated Oct. 10, 2018, from corresponding U.S. Appl. No. 16/055,083.
Office Action, dated Oct. 10, 2018, from corresponding U.S. Appl. No. 16/055,944.
Office Action, dated Oct. 14, 2020, from corresponding U.S. Appl. No. 16/927,658.
Office Action, dated Oct. 15, 2018, from corresponding U.S. Appl. No. 16/054,780.
Office Action, dated Oct. 16, 2019, from corresponding U.S. Appl. No. 16/557,392.
Office Action, dated Oct. 16, 2020, from corresponding U.S. Appl. No. 16/808,489.
Office Action, dated Oct. 23, 2018, from corresponding U.S. Appl. No. 16/055,961.
Office Action, dated Oct. 26, 2018, from corresponding U.S. Appl. No. 16/041,468.
Office Action, dated Oct. 8, 2019, from corresponding U.S. Appl. No. 16/552,765.
Office Action, dated Sep. 1, 2017, from corresponding U.S. Appl. No. 15/619,459.
Office Action, dated Sep. 11, 2017, from corresponding U.S. Appl. No. 15/619,375.
Office Action, dated Sep. 11, 2017, from corresponding U.S. Appl. No. 15/619,478.
Office Action, dated Sep. 16, 2019, from corresponding U.S. Appl. No. 16/277,715.
Office Action, dated Sep. 19, 2017, from corresponding U.S. Appl. No. 15/671,073.
Office Action, dated Sep. 22, 2017, from corresponding U.S. Appl. No. 15/619,278.
Final Office Action, dated Apr. 23, 2020, from corresponding U.S. Appl. No. 16/572,347.
Final Office Action, dated Apr. 7, 2020, from corresponding U.S. Appl. No. 16/595,327.
Final Office Action, dated Aug. 10, 2020, from corresponding U.S. Appl. No. 16/791,589.
Final Office Action, dated Aug. 28, 2020, from corresponding U.S. Appl. No. 16/410,336.
Final Office Action, dated Aug. 5, 2020, from corresponding U.S. Appl. No. 16/719,071.
Final Office Action, dated Dec. 7, 2020, from corresponding U.S. Appl. No. 16/862,956.
Final Office Action, dated Dec. 9, 2019, from corresponding U.S. Appl. No. 16/410,336.
Final Office Action, dated Feb. 19, 2020, from corresponding U.S. Appl. No. 16/404,491.
Final Office Action, dated Feb. 3, 2020, from corresponding U.S. Appl. No. 16/557,392.
Final Office Action, dated Feb. 8, 2021, from corresponding U.S. Appl. No. 16/927,658.

(56) References Cited

OTHER PUBLICATIONS

Final Office Action, dated Jan. 17, 2018, from corresponding U.S. Appl. No. 15/619,278.
Final Office Action, dated Jan. 21, 2020, from corresponding U.S. Appl. No. 16/410,762.
Final Office Action, dated Jan. 23, 2018, from corresponding U.S. Appl. No. 15/619,479.
Final Office Action, dated Jan. 23, 2020, from corresponding U.S. Appl. No. 16/505,430.
Final Office Action, dated Mar. 5, 2019, from corresponding U.S. Appl. No. 16/055,961.
Final Office Action, dated Mar. 6, 2020, from corresponding U.S. Appl. No. 16/595,342.
Final Office Action, dated Nov. 29, 2017, from corresponding U.S. Appl. No. 15/619,237.
Final Office Action, dated Sep. 21, 2020, from corresponding U.S. Appl. No. 16/808,493.
Final Office Action, dated Sep. 21, 2020, from corresponding U.S. Appl. No. 16/862,944.
Final Office Action, dated Sep. 22, 2020, from corresponding U.S. Appl. No. 16/808,497.
Final Office Action, dated Sep. 23, 2020, from corresponding U.S. Appl. No. 16/862,948.
Final Office Action, dated Sep. 24, 2020, from corresponding U.S. Appl. No. 16/862,952.
Final Office Action, dated Sep. 25, 2019, from corresponding U.S. Appl. No. 16/278,119.
Final Office Action, dated Sep. 28, 2020, from corresponding U.S. Appl. No. 16/565,395.
Final Office Action, dated Sep. 8, 2020, from corresponding U.S. Appl. No. 16/410,866.
Office Action, dated Apr. 18, 2018, from corresponding U.S. Appl. No. 15/894,819.
Office Action, dated Apr. 20, 2020, from corresponding U.S. Appl. No. 16/812,795.
Office Action, dated Apr. 22, 2019, from corresponding U.S. Appl. No. 16/241,710.
Office Action, dated Apr. 22, 2020, from corresponding U.S. Appl. No. 16/811,793.
Office Action, dated Apr. 28, 2020, from corresponding U.S. Appl. No. 16/798,818.
Office Action, dated Apr. 28, 2020, from corresponding U.S. Appl. No. 16/808,500.
Office Action, dated Apr. 29, 2020, from corresponding U.S. Appl. No. 16/791,337.
Office Action, dated Apr. 5, 2019, from corresponding U.S. Appl. No. 16/278,119.
Office Action, dated Apr. 7, 2020, from corresponding U.S. Appl. No. 16/788,633.
Office Action, dated Apr. 7, 2020, from corresponding U.S. Appl. No. 16/791,589.
Office Action, dated Aug. 13, 2019, from corresponding U.S. Appl. No. 16/505,430.
Office Action, dated Aug. 13, 2019, from corresponding U.S. Appl. No. 16/512,031.
Office Action, dated Aug. 15, 2019, from corresponding U.S. Appl. No. 16/505,461.
Office Action, dated Aug. 19, 2019, from corresponding U.S. Appl. No. 16/278,122.
Office Action, dated Aug. 20, 2020, from corresponding U.S. Appl. No. 16/817,136.
Office Action, dated Aug. 23, 2017, from corresponding U.S. Appl. No. 15/626,052.
Office Action, dated Aug. 24, 2017, from corresponding U.S. Appl. No. 15/169,641.
Office Action, dated Aug. 24, 2017, from corresponding U.S. Appl. No. 15/619,45t.
Office Action, dated Aug. 24, 2020, from corresponding U.S. Appl. No. 16/595,327.
Office Action, dated Aug. 27, 2019, from corresponding U.S. Appl. No. 16/410,296.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Office Action, dated Aug. 6, 2019, from corresponding U.S. Appl. No. 16/404,491.
Office Action, dated Aug. 6, 2020, from corresponding U.S. Appl. No. 16/862,956.
Notice of Allowance, dated Jun. 19, 2019, from corresponding U.S. Appl. No. 16/042,673.
Notice of Allowance, dated Jun. 19, 2019, from corresponding U.S. Appl. No. 16/055,984.
Notice of Allowance, dated Jun. 21, 2019, from corresponding U.S. Appl. No. 16/404,439.
Notice of Allowance, dated Jun. 22, 2020, from corresponding U.S. Appl. No. 16/791,337.
Notice of Allowance, dated Jun. 27, 2018, from corresponding U.S. Appl. No. 15/882,989.
Notice of Allowance, dated Jun. 4, 2019, from corresponding U.S. Appl. No. 16/159,566.
Notice of Allowance, dated Jun. 5, 2019, from corresponding U.S. Appl. No. 16/220,899.
Notice of Allowance, dated Jun. 5, 2019, from corresponding U.S. Appl. No. 16/357,260.
Notice of Allowance, dated Jun. 6, 2018, from corresponding U.S. Appl. No. 15/875,570.
Notice of Allowance, dated Jun. 6, 2019, from corresponding U.S. Appl. No. 16/159,628.
Notice of Allowance, dated Jun. 8, 2020, from corresponding U.S. Appl. No. 16/712,104.
Notice of Allowance, dated Mar. 1, 2018, from corresponding U.S. Appl. No. 15/853,674.
Notice of Allowance, dated Mar. 1, 2019, from corresponding U.S. Appl. No. 16/059,911.
Notice of Allowance, dated Mar. 10, 2021, from corresponding U.S. Appl. No. 16/925,628.
Notice of Allowance, dated Mar. 10, 2021, from corresponding U.S. Appl. No. 17/128,666.
Notice of Allowance, dated Mar. 13, 2019, from corresponding U.S. Appl. No. 16/055,083.
Notice of Allowance, dated Mar. 14, 2019, from corresponding U.S. Appl. No. 16/055,944.
Notice of Allowance, dated Mar. 16, 2020, from corresponding U.S. Appl. No. 16/778,704.
Notice of Allowance, dated Mar. 16, 2021, from corresponding U.S. Appl. No. 17/149,380.
Notice of Allowance, dated Mar. 17, 2020, from corresponding U.S. Appl. No. 16/560,885.
Notice of Allowance, dated Mar. 18, 2020, from corresponding U.S. Appl. No. 16/560,963.
Notice of Allowance, dated Mar. 2, 2018, from corresponding U.S. Appl. No. 15/858,802.
Notice of Allowance, dated Mar. 24, 2020, from corresponding U.S. Appl. No. 16/552,758.
Notice of Allowance, dated Mar. 25, 2019, from corresponding U.S. Appl. No. 16/054,780.
Notice of Allowance, dated Mar. 26, 2020, from corresponding U.S. Appl. No. 16/560,889.
Notice of Allowance, dated Mar. 26, 2020, from corresponding U.S. Appl. No. 16/578,712.
Notice of Allowance, dated Mar. 27, 2019, from corresponding U.S. Appl. No. 16/226,280.
Notice of Allowance, dated Mar. 29, 2019, from corresponding U.S. Appl. No. 16/055,998.
Notice of Allowance, dated Mar. 31, 2020, from corresponding U.S. Appl. No. 16/563,744.
Notice of Allowance, dated May 1, 2020, from corresponding U.S. Appl. No. 16/586,202.

(56) References Cited

OTHER PUBLICATIONS

Notice of Allowance, dated May 11, 2020, from corresponding U.S. Appl. No. 16/186,196.
Notice of Allowance, dated May 19, 2020, from corresponding U.S. Appl. No. 16/505,430.
Notice of Allowance, dated May 19, 2020, from corresponding U.S. Appl. No. 16/808,496.
Notice of Allowance, dated May 20, 2020, from corresponding U.S. Appl. No. 16/107,762.
Notice of Allowance, dated May 21, 2018, from corresponding U.S. Appl. No. 15/896,790.
Notice of Allowance, dated May 27, 2020, from corresponding U.S. Appl. No. 16/820,208.
Notice of Allowance, dated May 28, 2019, from corresponding U.S. Appl. No. 16/277,568.
Notice of Allowance, dated May 28, 2020, from corresponding U.S. Appl. No. 16/199,279.
Notice of Allowance, dated May 5, 2017, from corresponding U.S. Appl. No. 15/254,901.
Notice of Allowance, dated May 5, 2020, from corresponding U.S. Appl. No. 16/563,754.
Notice of Allowance, dated May 7, 2020, from corresponding U.S. Appl. No. 16/505,426.
Notice of Allowance, dated Nov. 14, 2019, from corresponding U.S. Appl. No. 16/436,616.
Notice of Allowance, dated Nov. 2, 2018, from corresponding U.S. Appl. No. 16/054,762.
Notice of Allowance, dated Nov. 23, 2020, from corresponding U.S. Appl. No. 16/791,589.
Notice of Allowance, dated Nov. 24, 2020, from corresponding U.S. Appl. No. 17/027,019.
Notice of Allowance, dated Nov. 25, 2020, from corresponding U.S. Appl. No. 17/019,771.
Notice of Allowance, dated Nov. 26, 2019, from corresponding U.S. Appl. No. 16/563,735.
Notice of Allowance, dated Nov. 27, 2019, from corresponding U.S. Appl. No. 16/570,712.
Notice of Allowance, dated Nov. 27, 2019, from corresponding U.S. Appl. No. 16/577,634.
Notice of Allowance, dated Nov. 3, 2020, from corresponding U.S. Appl. No. 16/719,071.
Notice of Allowance, dated Dec. 9, 2020, from corresponding U.S. Appl. No. 16/404,491.
Notice of Allowance, dated Feb. 10, 2020, from corresponding U.S. Appl. No. 16/552,765.
Notice of Allowance, dated Feb. 11, 2021, from corresponding U.S. Appl. No. 17/086,732.
Notice of Allowance, dated Feb. 12, 2020, from corresponding U.S. Appl. No. 16/572,182.
Notice of Allowance, dated Feb. 13, 2019, from corresponding U.S. Appl. No. 16/041,561.
Notice of Allowance, dated Feb. 14, 2019, from corresponding U.S. Appl. No. 16/226,272.
Notice of Allowance, dated Feb. 19, 2019, from corresponding U.S. Appl. No. 16/159,632.
Notice of Allowance, dated Feb. 19, 2021, from corresponding U.S. Appl. No. 16/832,45t.
Notice of Allowance, dated Feb. 24, 2021, from corresponding U.S. Appl. No. 17/034,355.
Notice of Allowance, dated Feb. 24, 2021, from corresponding U.S. Appl. No. 17/068,198.
Notice of Allowance, dated Feb. 24, 2021, from corresponding U.S. Appl. No. 17/101,106.
Notice of Allowance, dated Feb. 24, 2021, from corresponding U.S. Appl. No. 17/101,251.
Notice of Allowance, dated Feb. 25, 2020, from corresponding U.S. Appl. No. 16/714,355.
Notice of Allowance, dated Feb. 25, 2021, from corresponding U.S. Appl. No. 17/106,469.
Notice of Allowance, dated Feb. 26, 2021, from corresponding U.S. Appl. No. 17/139,650.
Notice of Allowance, dated Feb. 27, 2019, from corresponding U.S. Appl. No. 16/041,468.
Notice of Allowance, dated Feb. 27, 2019, from corresponding U.S. Appl. No. 16/226,290.
Notice of Allowance, dated Feb. 3, 2021, from corresponding U.S. Appl. No. 16/827,039.
Notice of Allowance, dated Feb. 3, 2021, from corresponding U.S. Appl. No. 17/068,558.
Notice of Allowance, dated Jan. 1, 2021, from corresponding U.S. Appl. No. 17/026,727.
Notice of Allowance, dated Jan. 14, 2020, from corresponding U.S. Appl. No. 16/277,715.
Notice of Allowance, dated Jan. 15, 2021, from corresponding U.S. Appl. No. 17/030,714.
Notice of Allowance, dated Jan. 18, 2018, from corresponding U.S. Appl. No. 15/619,478.
Notice of Allowance, dated Jan. 18, 2019 from corresponding U.S. Appl. No. 16/159,635.
Notice of Allowance, dated Jan. 2, 2020, from corresponding U.S. Appl. No. 16/410,296.
Notice of Allowance, dated Jan. 23, 2018, from corresponding U.S. Appl. No. 15/619,251.
Notice of Allowance, dated Jan. 25, 2021, from corresponding U.S. Appl. No. 16/410,336.
Notice of Allowance, dated Jan. 26, 2018, from corresponding U.S. Appl. No. 15/619,469.
Notice of Allowance, dated Jan. 29, 2020, from corresponding U.S. Appl. No. 16/278,119.
Notice of Allowance, dated Jan. 6, 2021, from corresponding U.S. Appl. No. 16/595,327.
Notice of Allowance, dated Jan. 8, 2020, from corresponding U.S. Appl. No. 16/600,879.
Notice of Allowance, dated Jul. 10, 2019, from corresponding U.S. Appl. No. 16/237,083.
Notice of Allowance, dated Jul. 10, 2019, from corresponding U.S. Appl. No. 16/403,358.
Notice of Allowance, dated Jul. 12, 2019, from corresponding U.S. Appl. No. 16/278,121.
Notice of Allowance, dated Jul. 14, 2020, from corresponding U.S. Appl. No. 16/701,043.
Notice of Allowance, dated Jul. 15, 2020, from corresponding U.S. Appl. No. 16/791,006.
Notice of Allowance, dated Jul. 16, 2020, from corresponding U.S. Appl. No. 16/901,979.
Notice of Allowance, dated Jul. 17, 2019, from corresponding U.S. Appl. No. 16/055,961.
Notice of Allowance, dated Jul. 17, 2020, from corresponding U.S. Appl. No. 16/778,709.
Notice of Allowance, dated Jul. 21, 2020, from corresponding U.S. Appl. No. 16/557,392.
Notice of Allowance, dated Jul. 23, 2019, from corresponding U.S. Appl. No. 16/220,978.
Notice of Allowance, dated Jul. 26, 2019, from corresponding U.S. Appl. No. 16/409,673.
Notice of Allowance, dated Jul. 31, 2019, from corresponding U.S. Appl. No. 16/221,153.
Notice of Allowance, dated Jun. 1, 2020, from corresponding U.S. Appl. No. 16/813,321.
Notice of Allowance, dated Jun. 12, 2019, from corresponding U.S. Appl. No. 16/278,123.
Notice of Allowance, dated Jun. 12, 2019, from corresponding U.S. Appl. No. 16/363,454.
Notice of Allowance, dated Jun. 16, 2020, from corresponding U.S. Appl. No. 16/798,818.
Notice of Allowance, dated Jun. 17, 2020, from corresponding U.S. Appl. No. 16/656,895.
Notice of Allowance, dated Jun. 18, 2019, from corresponding U.S. Appl. No. 16/410,566.
Notice of Allowance, dated Jun. 19, 2018, from corresponding U.S. Appl. No. 15/894,890.

(56) References Cited

OTHER PUBLICATIONS

Notice of Allowance, dated Jun. 11, 2021, from corresponding U.S. Appl. No. 16/862,948.
Notice of Allowance, dated Jun. 11, 2021, from corresponding U.S. Appl. No. 16/862,952.
Notice of Allowance, dated Jun. 11, 2021, from corresponding U.S. Appl. No. 17/216,436.
Notice of Allowance, dated Jun. 2, 2021, from corresponding U.S. Appl. No. 17/198,581.
Notice of Allowance, dated Jun. 7, 2021, from corresponding U.S. Appl. No. 17/099,270.
Office Action, dated Jun. 24, 2021, from corresponding U.S. Appl. No. 17/234,205.
Office Action, dated Jun. 7, 2021, from corresponding U.S. Appl. No. 17/200,698.
Office Action, dated Jun. 9, 2021, from corresponding U.S. Appl. No. 17/222,523.
Restriction Requirement, dated Jun. 15, 2021, from corresponding U.S. Appl. No. 17/187,329.
Restriction Requirement, dated Jun. 15, 2021, from corresponding U.S. Appl. No. 17/222,556.
Restriction Requirement, dated Jun. 9, 2021, from corresponding U.S. Appl. No. 17/222,725.
Notice of Allowance, dated Nov. 5, 2019, from corresponding U.S. Appl. No. 16/560,965.
Notice of Allowance, dated Nov. 7, 2017, from corresponding U.S. Appl. No. 15/671,073.
Notice of Allowance, dated Nov. 8, 2018, from corresponding U.S. Appl. No. 16/042,642.
Notice of Allowance, dated Nov. 9, 2020, from corresponding U.S. Appl. No. 16/595,342.
Notice of Allowance, dated Oct. 10, 2019, from corresponding U.S. Appl. No. 16/277,539.
Notice of Allowance, dated Oct. 17, 2018, from corresponding U.S. Appl. No. 15/896,790.
Notice of Allowance, dated Oct. 17, 2018, from corresponding U.S. Appl. No. 16/054,672.
Notice of Allowance, dated Oct. 17, 2019, from corresponding U.S. Appl. No. 16/563,741.
Notice of Allowance, dated Oct. 21, 2019, from corresponding U.S. Appl. No. 16/404,405.
Notice of Allowance, dated Oct. 21, 2020, from corresponding U.S. Appl. No. 16/834,812.
Notice of Allowance, dated Oct. 3, 2019, from corresponding U.S. Appl. No. 16/511,700.
Notice of Allowance, dated Sep. 12, 2019, from corresponding U.S. Appl. No. 16/512,011.
Notice of Allowance, dated Sep. 13, 2018, from corresponding U.S. Appl. No. 15/894,809.
Notice of Allowance, dated Sep. 13, 2018, from corresponding U.S. Appl. No. 15/894,890.
Notice of Allowance, dated Sep. 16, 2020, from corresponding U.S. Appl. No. 16/915,097.
Notice of Allowance, dated Sep. 17, 2020, from corresponding U.S. Appl. No. 16/863,226.
Notice of Allowance, dated Sep. 18, 2018, from corresponding U.S. Appl. No. 151,894,819.
Notice of Allowance, dated Sep. 18, 2018, from corresponding U.S. Appl. No. 16/041,545.
Notice of Allowance, dated Sep. 18, 2020, from corresponding U.S. Appl. No. 16/812,795.
Notice of Allowance, dated Sep. 23, 2020, from corresponding U.S. Appl. No. 16/811,793.
Notice of Allowance, dated Sep. 25, 2020, from corresponding U.S. Appl. No. 16/983,536.
Notice of Allowance, dated Sep. 27, 2017, from corresponding U.S. Appl. No. 15/626,052.
Notice of Allowance, dated Sep. 28, 2018, from corresponding U.S. Appl. No. 16/041,520.
Notice of Allowance, dated Sep. 4, 2018, from corresponding U.S. Appl. No. 15/883,041.
Notice of Allowance, dated Sep. 4, 2020, from corresponding U.S. Appl. No. 16/808,500.
Notice of Allowance, dated Sep. 4, 2020, from corresponding U.S. Appl. No. 16/901,662.
Restriction Requirement, dated Apr. 10, 2019, from corresponding U.S. Appl. No. 16/277,715.
Restriction Requirement, dated Apr. 13, 2020, from corresponding U.S. Appl. No. 16/817,136.
Restriction Requirement, dated Apr. 24, 2019, from corresponding U.S. Appl. No. 16/278,122.
Restriction Requirement, dated Aug. 7, 2019, from corresponding U.S. Appl. No. 16/410,866.
Restriction Requirement, dated Aug. 9, 2019, from corresponding U.S. Appl. No. 16/404,399.
Restriction Requirement, dated Dec. 31, 2018, from corresponding U.S. Appl. No. 15/169,668.
Restriction Requirement, dated Dec. 9, 2019, from corresponding U.S. Appl. No. 16/565,395.
Restriction Requirement, dated Jan. 18, 2017, from corresponding U.S. Appl. No. 15/256,430.
Restriction Requirement, dated Jul. 28, 2017, from corresponding U.S. Appl. No. 15/169,658.
Restriction Requirement, dated May 5, 2020, from corresponding U.S. Appl. No. 16/808,489.
Restriction Requirement, dated Nov. 15, 2019, from corresponding U.S. Appl. No. 16/586,202.
Restriction Requirement, dated Nov. 21, 2016, from corresponding U.S. Appl. No. 15/254,901.
Restriction Requirement, dated Nov. 5, 2019, from corresponding U.S. Appl. No. 16/563,744.
Restriction Requirement, dated Oct. 17, 2018, from corresponding U.S. Appl. No. 16/055,984.
Restriction Requirement, dated Sep. 15, 2020, from corresponding U.S. Appl. No. 16/925,628.
Restriction Requirement, dated Sep. 9, 2019, from corresponding U.S. Appl. No. 16/505,426.
Abdullah et al, "The Mapping Process of Unstructured Data to the Structured Data", ACM, pp. 151-155 (Year: 2013).
Agar, Gunes, et al, The Web Never Forgets, Computer and Communications Security, ACM, Nov. 3, 2014, pp. 674-689.
Advisory Action, dated Jan. 13, 2021, from corresponding U.S. Appl. No. 16/808,493.
Advisory Action, dated Jan. 13, 2021, from corresponding U.S. Appl. No. 16/862,944.
Advisory Action, dated Jan. 13, 2021, from corresponding U.S. Appl. No. 16/862,948.
Advisory Action, dated Jan. 13, 2021, from corresponding U.S. Appl. No. 16/862,952.
Advisory Action, dated Jan. 6, 2021, from corresponding U.S. Appl. No. 16/808,497.
Advisory Action, dated Jun. 19, 2020, from corresponding U.S. Appl. No. 16/595,342.
Gowadia et al, "RDF Metadata for XML Access Control," ACM, pp. 31-48 (Year: 2003).
Grolinger et al, "Data Management in Cloud Environments: NoSQL and NewSQL Data Stores," Journal of Cloud computing: Advances, Systems and Applications, pp. 1-24 (Year: 2013).
Guo, et al, "OPAL: A Passe-partout for Web Forms," ACM, pp. 353-356 (Year: 2012).
Gustarini, et al, "Evaluation of Challenges in Human Subject Studies "In-the-Wild" Using Subjects' Personal Smartphones," ACM, pp. 1447-1456 (Year 2013).
Hacigümüs, Hakan, et al, Executing SQL over Encrypted Data in the Database-Service-Provider Model, ACM, Jun. 4, 2002, pp. 216-227.
Hauch, et al, "Information Intelligence: Metadata for Information Discovery, Access, and Integration," ACM, pp. 793-798 (Year: 2005).
Hernandez, et al, "Data Exchange with Data-Metadata Translations," ACM, pp. 260-273 (Year: 2008).

(56) References Cited

OTHER PUBLICATIONS

Hinde, "A Model to Assess Organisational Information Privacy Maturity Against the Protection of Personal Information Act" Dissertation University of Cape Town 2014, pp. 1-121 (Year 2014).
Hodge, et al, "Managing Virtual Data Marts with Metapointer Tables," pp. 1-7 (Year: 2002).
Horrall et al, "Evaluating Risk: IBM's Country Financial Risk and Treasury Risk Scorecards," Jul. 21, 2014, IBM, vol. 58, issue 4, pp. 2:1-2:9 (Year 2014).
Hu, et al, "Guide to Attribute Based Access Control (ABAC) Definition and Considerations (Draft)," NIST Special Publication 800-162, pp. 1-54 (Year: 2013).
Huner et al, "Towards a Maturity Model for Corporate Data Quality Management", ACM, pp. 231-238, 2009 (Year: 2009).
Hunton & Williams LLP, The Role of Risk Management in Data Protection, Privacy Risk Framework and the Risk-based Approach to Privacy, Centre for Information Policy Leadership, Workshop II, Nov. 23, 2014.
Huo et al, "A Cloud Storage Architecture Model for Data-Intensive Applications," IEEE, pp. 1-4 (Year: 2011).
Iapp, Daily Dashboard, Pia Tool Stocked With New Templates for DPI, Infosec, International Association of Privacy Professionals, Apr. 22, 2014.
Imran et al, "Searching in Cloud Object Storage by Using a Metadata Model", IEEE, 2014, retrieved online on Apr. 1, 2020, pp. 121-128. Retrieved from the Internet: URL: https://ieeeexplore.ieee.org/stamp/stamp.jsp? (Year 2014).
International Search Report, dated Aug. 15, 2017, from corresponding International Application No. PCT/US2017/036919.
International Search Report, dated Aug. 21, 2017, from corresponding International Application No. PCT/US2017/036914.
International Search Report, dated Aug. 29, 2017, from corresponding International Application No. PCT/US2017/036898.
International Search Report, dated Aug. 8, 2017, from corresponding International Application No. PCT/US2017/036889.
International Search Report, dated Aug. 8, 2017, from corresponding International Application No. PCT/US2017/036890.
International Search Report, dated Aug. 8, 2017, from corresponding International Application No. PCT/US2017/036893.
International Search Report, dated Aug. 8, 2017, from corresponding International Application No. PCT/US2017/036901.
International Search Report, dated Aug. 8, 2017, from corresponding International Application No. PCT/US2017/036913.
International Search Report, dated Aug. 8, 2017, from corresponding International Application No. PCT/US2017/036920.
International Search Report, dated Dec. 14, 2018, from corresponding International Application No. PCT/US2018/045296.
International Search Report, dated Jan. 14, 2019, from corresponding International Application No. PCT/US2018/046949.
International Search Report, dated Jan. 7, 2019, from corresponding International Application No. PCT/US2018/055772.
International Search Report, dated Jun. 21, 2017, from corresponding International Application No. PCT/US2017/025600.
International Search Report, dated Jun. 6, 2017, from corresponding International Application No. PCT/US2017/025605.
International Search Report, dated Jun. 6, 2017, from corresponding International Application No. PCT/US2017/025611.
International Search Report, dated Mar. 14, 2019, from corresponding International Application No. PCT/US2018/055736.
International Search Report, dated Mar. 4, 2019, from corresponding International Application No. PCT/US2018/055773.
International Search Report, dated Mar. 4, 2019, from corresponding International Application No. PCT/US2018/055774.
International Search Report, dated Nov. 19, 2018, from corresponding International Application No. PCT/US2018/046939.
International Search Report, dated Oct. 11, 2018, from corresponding International Application No. PCT/US2018/043975.
International Search Report, dated Oct. 11, 2018, from corresponding International Application No. PCT/US2018/043976.
International Search Report, dated Oct. 11, 2018, from corresponding International Application No. PCT/US2018/043977.
International Search Report, dated Oct. 11, 2018, from corresponding International Application No. PCT/US2018/044026.
International Search Report, dated Oct. 11, 2018, from corresponding International Application No. PCT/US2018/045240.
International Search Report, dated Oct. 12, 2017, from corresponding International Application No. PCT/US2017/036888.
International Search Report, dated Oct. 12, 2018, from corresponding International Application No. PCT/US2018/044046.
International Search Report, dated Oct. 16, 2018, from corresponding International Application No. PCT/US2018/045243.
International Search Report, dated Oct. 18, 2018, from corresponding International Application No. PCT/US2018/045249.
International Search Report, dated Oct. 20, 2017, from corresponding International Application No. PCT/US2017/036917.
International Search Report, dated Oct. 3, 2017, from corresponding International Application No. PCT/US2017/036912.
International Search Report, dated Sep. 1, 2017, from corresponding International Application No. PCT/US2017/036896.
International Search Report, dated Sep. 12, 2018, from corresponding International Application No. PCT/US2018/037504.
Invitation to Pay Additional Search Fees, dated Aug. 10, 2017, from corresponding International Application No. PCT/US2017/036912.
Cha, et al, "Process-Oriented Approach for Validating Asset Value for Evaluating Information Security Risk," IEEE, Aug. 31, 2009, pp. 379-385 (Year: 2009).
Cheng, Raymond, et al, "Radiatus: A Shared-Nothing Server-Side Web Architecture," Proceedings of the Seventh ACM Symposium on Cloud Computing, Oct. 5, 2016, pp. 237-250 (Year: 2016).
Final Office Action, dated May 14, 2021, from corresponding U.S. Appl. No. 17/013,756.
Gilda, et al, "Blockchain for Student Data Privacy and Consent," 2018 International Conference on Computer communication and Informatics, Jan. 4-6, 2018, IEEE, pp. 1-5 (Year: 2018).
Huang, et al, "A Study on Information Security Management with Personal Data Protection," IEEE, Dec. 9, 2011, pp. 624-630 (Year: 2011).
Liu, Yandong, et al, "Finding the Right Consumer: Optimizing for Conversion in Display Advertising Campaigns," Proceedings of the Fifth ACM International Conference on Web Search and Data Mining, Feb. 2, 2012, pp. 173-428 (Year: 2012).
Luu, et al, "Combined Local and Holistic Facial Features for Age-Determination," 2010 11th Int. Conf. Control, Automation, Robotics and Vision, Singapore, Dec. 7, 2010, IEEE, pp. 900-904 (Year: 2010).
Nishikawa, Taiji, English Translation of JP 2019154505, Aug. 27, 2019 (Year: 2019).
Notice of Allowance, dated May 13, 2021, from corresponding U.S. Appl. No. 17/101,915.
Notice of Allowance, dated May 26, 2021, from corresponding U.S. Appl. No. 16/808,493.
Notice of Allowance, dated May 26, 2021, from corresponding U.S. Appl. No. 16/865,874.
Notice of Allowance, dated May 26, 2021, from corresponding U.S. Appl. No. 17/199,514.
Notice of Allowance, dated May 27, 2021, from corresponding U.S. Appl. No. 16/927,658.
Notice of Allowance, dated May 27, 2021, from corresponding U.S. Appl. No. 17/198,757.
Notice of Allowance, dated May 28, 2021, from corresponding U.S. Appl. No. 16/862,944.
Notice of Allowance, dated May 7, 2021, from corresponding U.S. Appl. No. 17/194,662.
Office Action, dated May 18, 2021, from corresponding U.S. Appl. No. 17/196,570.
Pretorius, et al, "Attributing Users Based on Web Browser History," 2017 IEEE Conference on Application, Information and Network Security (AINS), 2017, pp. 69-74 (Year 2017).
Radu, et al, "Analyzing Risk Evaluation Frameworks and Risk Assessment Methods," IEEE, Dec. 12, 2020, pp. 1-6 (Year 2020).
Advisory Action, dated Jun. 2, 2020, from corresponding U.S. Appl. No. 16/404,491.

(56) References Cited

OTHER PUBLICATIONS

Advisory Action, dated May 21, 2020, from corresponding U.S. Appl. No. 16/557,392.
Aghasian, Elan, et al, Scoring Users' Privacy Disclosure Across Multiple Online Social Networks,IEEE Access, Multidisciplinary Rapid Review Open Access Journal, Jul. 31, 2017, vol. 5, 2017.
Agosti et al, "Access and Exchange of Hierarchically Structured Resources on the Web with the NESTOR Framework", IEEE, pp. 659-662 (Year: 2009).
Agrawal et al, "Securing Electronic Health Records Without Impeding the Flow of Information," International Journal of Medical Informatics 76, 2007, pp. 471-479 (Year: 2007).q
Ahmad et al, "Task-Oriented Access Model for Secure Data Sharing Over Cloud," ACM, pp. 1-7 (Year: 2015).
Ahmad, et al, "Performance of Resource Management Algorithms for Processable Bulk Data Transfer Tasks in Grid Environments," ACM, pp. 177-188 (Year 2008).
Alaa et al, "Personalized Risk Scoring for Critical Care Prognosis Using Mixtures of Gaussian Processes," Apr. 27, 2017, IEEE, vol. 65, issue 1, pp. 207-217 (Year: 2017).
Antunes et al, "Preserving Digital Data in Heterogeneous Environments", ACM, pp. 345-348, 2009 (Year: 2009).
Ardagna, et al, "A Privacy-Aware Access Control System," Journal of Computer Security, 16:4, pp. 369-397 (Year: 2008).
AVEPOINT, AvePoint Privacy Impact Assessment 1: User Guide, Cumulative Update 2, Revision E, Feb. 2015, AvePoint, Inc.
Ball, et al, "Aspects of the Computer-Based Patient Record," Computers in Healthcare, Springer-Verlag New York Inc., pp. 1-23 (Year: 1992).
Bang et al, "Building an Effective and Efficient Continuous Web Application Security Program," 2016 International Conference on Cyber Security Situational Awareness, Data Analytics and Assessment (CyberSA), London, 2016, pp. 1-4 (Year: 2016).
Barker, "Personalizing Access Control by Generalizing Access Control," ACM, pp. 149-158 (Year: 2010).
Bayardo et al, "Technological Solutions for Protecting Privacy," Computer 36.9 (2003), pp. 115-118, (Year: 2003).
Berezovskiy et al, "A framework for dynamic data source identification and orchestration on the Web", ACM, pp. 1-8 year: 2010).
Bertino et al, "On Specifying Security Policies for Web Documents with an XML-based Language," ACM, pp. 57-65 (Year: 2001).
Bhargav-Spantzel et al., Receipt Management—Transaction History based Trust Establishment, 2007, ACM, p. 82-91.
Bhuvaneswaran et al, "Redundant Parallel Data Transfer Schemes for the Grid Environment", ACM, pp. 18 (Year: 2006).
Binns, et al, "Data Havens, or Privacy Sans Frontières? A Study of International Personal Data Transfers," ACM, pp. 273-274 (Year: 2002).
Brandt et al, "Efficient Metadata Management in Large Distributed Storage Systems," IEEE, pp. 1-9 (Year: 2003).
Byun, Ji-Won, Elisa Bertino, and Ninghui Li. "Purpose based access control of complex data for privacy protection." Proceedings of the tenth ACM symposium on Access control models and technologies. ACM, 2005. (Year: 2005).
Carminati et al, "Enforcing Access Control Over Data Streams," ACM, pp. 21-30 (Year: 2007).
Carpineto et al, "Automatic Assessment of Website Compliance to the European Cookie Law with CooLCheck," Proceedings of the 2016 ACM on Workshop on Privacy in the Electronic Society, 2016, pp. 135-138 (Year: 2016).
Cerpzone, "How to Access Data on Data Archival Storage and Recovery System", https://www.saj.usace.army.mil/Portals/44/docs/Environmental/Lake%20O%20Watershed/15February2017/How%20To%20Access%20Model%20Data%20on%20DASR.pdf?ver=2017-02-16-095535-633, Feb. 16, 2017.
Cha et al, "A Data-Driven Security Risk Assessment Scheme for Personal Data Protection," IEEE, pp. 50510-50517 (Year: 2018).
Chapados et al, "Scoring Models for Insurance Risk Sharing Pool Optimization," 2008, IEEE, pp. 97-105 (Year: 2008).
Choi et al, "Retrieval Effectiveness of Table of Contents and Subject Headings," ACM, pp. 103-104 (Year: 2007).
Chowdhury et al, "A System Architecture for Subject-Centric Data Sharing", ACM, pp. 1-10 (Year: 2018).
Chowdhury et al, "Managing Data Transfers in Computer Clusters with Orchestra," ACM, pp. 98-109 (Year: 2011).
Decision Regarding Institution of Post-Grant Review in Case PGR2018-00056 for U.S. Pat. No. 9,691,090 B1, Oct. 11, 2018.
Dimou et al, "Machine-Interpretable Dataset and Service Descriptions for Heterogeneous Data Access and Retrieval", ACM, pp. 145-152 (Year: 2015).
Dokholyan et al, "Regulatory and Ethical Considerations for Linking Clinical and Administrative Databases," American Heart Journal 157.6 (2009), pp. 971-982 (Year: 2009).
Dunkel et al, "Data Organization and Access for Efficient Data Mining", IEEE, pp. 522-529 (Year: 1999).
Emerson, et al, "A Data Mining Driven Risk Profiling Method for Road Asset Management," ACM, pp. 1267-1275 (Year: 2013).
Enck, William, et al, TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.
Falahrastegar, Marjan, et al, Tracking Personal Identifiers Across the Web, Medical Image Computing and Computer-Assisted Intervention—Miccai 2015, 18th International Conference, Oct. 5, 2015, Munich, Germany.
Final Written Decision Regarding Post-Grant Review in Case PGR2018-00056 for U.S. Pat. No. 9,691,090 B1, dated Oct. 10, 2019.
Francis, Andre, Business Mathematics and Statistics, South-Western Cengage Learning, 2008, Sixth Edition.
Friedman et al, "Data Mining with Differential Privacy," ACM, Jul. 2010, pp. 493-502 (Year: 2010).
Friedman et al, "Informed Consent in the Mozilla Browser: Implementing Value-Sensitive Design," Proceedings of be 35th Annual Hawaii International Conference on System Sciences, 2002, IEEE, pp. 1-10 (Year: 2002).
Frikken, Keith B., et al, Yet Another Privacy Metric for Publishing Micro-data, Miami University, Oct. 27, 2008, p. 117-121.
Fung et al, "Discover Information and Knowledge from Websites using an Integrated Summarization and Visualization Framework", IEEE, pp. 232-235 (Year 2010).
Gajare et al, "Improved Automatic Feature Selection Approach for Health Risk Prediction," Feb. 16, 2018, IEEE, pp. 816-819 (Year 2018).
Ghiglieri, Marco et al.; Personal DLP for Facebook, 2014 IEEE International Conference on Pervasive Computing and Communication Workshops (Percom Workshops); IEEE; Mar. 24, 2014; pp. 629-634.
Golfarelli et al, "Beyond Data Warehousing: What's Next in Business Intelligence?," ACM, pp. 1-6 (Year: 2004).
Goni, Kyriaki, "Deletion Process_Only you can see my history: Investigating Digital Privacy, Digital Oblivion, and Control on Personal Data Through an Interactive Art Installation," ACM, 2016, retrieved online on Oct. 3, 2019, pp. 324-333. Retrieved from the Internet URL: http://delivery.acm.org/10.1145/2920000/291.
Final Office Action, dated Jul. 21, 2021, from corresponding U.S. Appl. No. 17/151,334.
Final Office Action, dated Jul. 7, 2021, from corresponding U.S. Appl. No. 17/149,421.
Hu, et al., "Attribute Considerations for Access Control Systems," NIST Special Publication 800-205, Jun. 2019, pp. 1-42 (Year: 2019).
Notice of Allowance, dated Jul. 19, 2021, from corresponding U.S. Appl. No. 17/306,252.
Office Action, dated Jul. 13, 2021, from corresponding U.S. Appl. No. 17/306,496.
Office Action, dated Jul. 15, 2021, from corresponding U.S. Appl. No. 17/020,275.
Office Action, dated Jul. 19, 2021, from corresponding U.S. Appl. No. 17/316,179.
Office Action, dated Jul. 21, 2021, from corresponding U.S. Appl. No. 16/901,654.

(56) References Cited

OTHER PUBLICATIONS

Barr, "Amazon Rekognition Update—Estimated Age Range for Faces," AWS News Blog, Feb. 10, 2017, pp. 1-5 (Year: 2017).
Bin, et al., "Research on Data Mining Models for the Internet of Things," IEEE, pp. 1-6 (Year: 2010).
Borgida, "Description Logics in Data Management," IEEE Transactions on Knowledge and Data Engineering, vol. 7, No. 5, Oct. 1995, pp. 671-682 (Year: 1995).
Everypixel Team, "A New Age Recognition API Detects the Age of People on Photos," May 20, 2019, pp. 1-5 (Year: 2019).
Final Office Action, dated Aug. 27, 2021, from corresponding U.S. Appl. No. 17/161,159.
Final Office Action, dated Aug. 9, 2021, from corresponding U.S. Appl. No. 17/119,080.
Final Office Action, dated Sep. 17, 2021, from corresponding U.S. Appl. No. 17/200,698.
Golab, et al., "Issues in Data Stream Management," ACM, SIGMOD Record, vol. 32, No. 2, Jun. 2003, pp. 5-14 (Year: 2003).
Halevy, et al., "Schema Mediation in Peer Data Management Systems," IEEE, Proceedings of the 19th International Conference on Data Engineering, 2003, pp. 505-516 (Year: 2003).
International Search Report, dated Sep. 15, 2021, from corresponding International Application No. PCT/US2021/033631.
Jensen, et al., "Temporal Data Management," IEEE Transactions on Knowledge and Data Engineering, vol. 11, No. 1, Jan./Feb. 1999, pp. 36-44 (Year: 1999).
Ma Ziang, et al., "LibRadar: Fast and Accurate Detection of Third-Party Libraries in Android Apps," 2016 IEEE/ACM 38th IEEE International Conference on Software Engineering Companion (Icse-C), ACM, May 14, 2016, pp. 653-656, DOI: http://dx.doi.org/10.1145/2889160.2889178, p. 653, r.col, par. 1-3; figure 3 (Year: 2016).
Mandal, et al., "Automated Age Prediction Using Wrinkles Features of Facial Images and Neural Network," International Journal of Emerging Engineering Research and Technology, vol. 5, Issue 2, Feb. 2017, pp. 12-20 (Year: 2017).
Martin, et al., "Hidden Surveillance by Web Sites: Web Bugs in Contemporary Use," Communications of the ACM, vol. 46, No. 12, Dec. 2003, pp. 258-264. Internet source https://doi.org/10.1145/953460.953509 (Year: 2003).
Notice of Allowance, dated Aug. 12, 2021, from corresponding U.S. Appl. No. 16/881,832.
Notice of Allowance, dated Aug. 31, 2021, from corresponding U.S. Appl. No. 17/326,901.
Notice of Allowance, dated Aug. 4, 2021, from corresponding U.S. Appl. No. 16/895,278.
Notice of Allowance, dated Aug. 9, 2021, from corresponding U.S. Appl. No. 16/881,699.
Notice of Allowance, dated Jul. 26, 2021, from corresponding U.S. Appl. No. 17/151,399.
Notice of Allowance, dated Jul. 26, 2021, from corresponding U.S. Appl. No. 17/207,316.
Notice of Allowance, dated Oct. 1, 2021, from corresponding U.S. Appl. No. 17/340,395.
Notice of Allowance, dated Sep. 1, 2021, from corresponding U.S. Appl. No. 17/196,570.
Notice of Allowance, dated Sep. 1, 2021, from corresponding U.S. Appl. No. 17/222,556.
Notice of Allowance, dated Sep. 14, 2021, from corresponding U.S. Appl. No. 16/808,497.
Notice of Allowance, dated Sep. 23, 2021, from corresponding U.S. Appl. No. 17/068,454.
Notice of Allowance, dated Sep. 24, 2021, from corresponding U.S. Appl. No. 17/334,939.
Notice of Allowance, dated Sep. 27, 2021, from corresponding U.S. Appl. No. 17/222,523.
Notice of Allowance, dated Sep. 29, 2021, from corresponding U.S. Appl. No. 17/316,179.
Notice of Allowance, dated Sep. 9, 2021, from corresponding U.S. Appl. No. 17/334,909.
Office Action, dated Aug. 18, 2021, from corresponding U.S. Appl. No. 17/222,725.
Office Action, dated Aug. 27, 2021, from corresponding U.S. Appl. No. 17/187,329.
Office Action, dated Aug. 27, 2021, from corresponding U.S. Appl. No. 17/334,948.
Office Action, dated Aug. 30, 2021, from corresponding U.S. Appl. No. 16/938,520.
Office Action, dated Sep. 15, 2021, from corresponding U.S. Appl. No. 16/623,157.
Office Action, dated Sep. 24, 2021, from corresponding U.S. Appl. No. 17/342,153.
Restriction Requirement, dated Oct. 6, 2021, from corresponding U.S. Appl. No. 17/340,699.
Stack Overflow, "Is there a way to force a user to scroll to the bottom of a div?," Stack Overflow, pp. 1-11, Nov. 2013. [Online], Available: https://stackoverflow.com/questions/2745935/is-there-a-way-to-force-a-user-to-scroll-to-the-bottom-of-a-div (Year: 2013).
Tanwar, et al., "Live Forensics Analysis: Violations of Business Security Policy," 2014 International Conference on Contemporary Computing and Informatics (IC3I), 2014, pp. 971-976 (Year: 2014).
Written Opinion of the International Searching Authority, dated Sep. 15, 2021, from corresponding International Application No. PCT/US2021/033631.

\* cited by examiner

Verify Your Identity

Name: Joe Lopez

To verify your identity, please answer the following questions.
- Which of the following STREETS have you NEVER lived or used as your address?
  - ○
  - ○
  - ○
  - ○ ALL OF THE ABOVE

- With which of the following PEOPLE are you most closely associated?
  - ○
  - ○
  - ○
  - ○ NONE OF THE ABOVE

- Which of the following CITIES have you PREVIOUSLY OR CURRENTLY used as your address?
  - ○
  - ○
  - ○
  - ○ NONE OF THE ABOVE

ACME CORPORATION

I am a(n): *Select One*
[ Customer ] [ Employee ] [ Other ]

My request involves: *Select One*
[ Requesting Info ] [ Deleting Data ] [ Filing a Complain ]
[ Opting Out ] [ Updating Data ] [ Other ]

First Name*:
Joe

Last Name*:
Lopez

Email Address*: | Telephone:
Jlopez123456789@gmail.com | 1234567890

Addr Line 1: | Addr Line 2:
123 Main St. | Box 502

City:
Madrid

Country of Residence:
Spain

Details of my request:
Send me my Data

[ Submit ]

ACME Privacy
123 Main St.
Capital City, ST, USA 20219

+1 800-123-4578
emailaboutprivacy@ACME.com
Link to Privacy Policy

FIG. 15

ACME CORPORATION

I am a(n): *Select One*
[ Customer ] [ Employee ] [ Other ]

Thank you! A confirmation of your submission has been sent to the following email: Jlopez123456789@gmail.com

Your Request ID is: 5

OK

First Name*:
Joe

Last Name*:
Lopez

Email Address*:
Jlopez123456789@gmail.com

Telephone:
1234567890

Addr Line 1:
123 Main St.

Addr Line 2:
Box 502

City
Madrid

Country of Residence*:
Spain

Details of my request:
Send me my Data

ACME Privacy
123 Main St.
Capital City, ST, USA 20219

+1 800-123-4578
emailaboutprivacy@ACME.com
Link to Privacy Policy

FIG. 16

From: OneTrust Privacy Officer
Sent: Sunday, February 19, 2017 9:27 PM EST
To: Joe Lopez <jlopez123456789@gmail.com>
BCc: Amelia Davis <adavis09876@ACME.com>
Subject: *Your ACME Privacy Request is being processed*

Data Request

Thank you for your submission! Here are the details of your request:

Request ID: 5
Date Submitted: 2/21/2017 10:35AM EST
I am a(n): Customer
My request involves: Opting Out
First Name*: Joe
Last Name*: Lopez
Email Address*: Jlopez123456789@gmail.com
Telephone: XXXXXX986
Addr Line 1: XXXXXXXXXX
Addr Line 2: XXXXXXXXXX
City: XXXXXXXXXX
Count of Residence*: XXXXXXXXXX
Details of my request:
Send me my Data If you have any questions regarding your submission, please contact *Amelia Davis* via email or phone:
adavis09876@ACME.com
+00 123 123 9980

ACME Privacy
123 Main St.
Capital City, ST, USA 20219

+1 800-123-4578
emailaboutprivacy@ACME.com
Link to Privacy Policy

FIG. 17

Data Subject Request Queue

| | ID ▽ | Name | Status ▽ | Purpose | Days Left to Respond | Extension | Date Created | DSR Type | Respondent | |
|---|---|---|---|---|---|---|---|---|---|---|
| ☐ | 012 | Donald Blair | (New) | Retrieve | 30 | NO | 11/02/17 | Employee | Rena Doyle | ∧ |
| ☐ | 012 | Donald Blair | (New) | Retrieve | 30 | NO | 11/02/17 | Employee | Rena Doyle | ∧ |
| ☐ | 012 | Allison Smith | (New) | Retrieve | 30 | NO | 11/02/17 | Employee | Rena Doyle | ∧ |
| ☐ | 012 | Donald Blair | (Complete) | Retrieve | 30 | NO | 11/02/17 | Employee | Rena Doyle | ∧ |

FIG. 18

Data Subject Request Queue

| | ID ▽ | Name | Status ▽ | Purpose | Days Left to Respond | Extension | Date | ...ndent |
|---|---|---|---|---|---|---|---|---|
| ☐ | 012 | Donald Blair | (New) | Retrieve | 30 | NO | | a Doyle |
| ☑ | 012 | Donald Blair | (New) | Retrieve | 30 | NO | | a Doyle |
| ☐ | 012 | Allison Smith | (New) | Retrieve | 30 | NO | 11/02/17 | Employee — Rena Doyle |
| ☐ | 012 | Donald Blair | (Complete) | Retrieve | 30 | NO | 11/02/17 | Employee — Rena Doyle |

Pop-up menu:
- Verify Request
- Assign
- Request Extension
- Reject
- Suspend

Buttons: (New Request) (Edit ∨) (Filter)

Data Subject Request Queue

Enter Name 🔍     ( New Request )   ( Edit )   ( Filter )

| | ID ▽ | Name | Status ▽ | Purpose | Days Left to Respond | Extension | Date Created | DSR Type | Respondent |
|---|---|---|---|---|---|---|---|---|---|
| ☐ | 012 | Tim LePenne | New | Retrieve | 30 | NO | 11/02/17 | Employee | Rena Doyle |
| ☐ | 012 | Donald Blair | In progress | Retrieve | 30 | NO | 11/02/17 | Employee | Rena Doyle |
| ☐ | 012 | Allison Smith | New | Retrieve | 30 | NO | 11/02/17 | Employee | Rena Doyle |
| ☐ | 012 | Franklin Howard | Complete | Retrieve | 30 | NO | 11/02/17 | Employee | Rena Doyle |

FIG. 22

Data Subject Request Queue

| | ID ▽ | Name | Status ▽ | Purpose | Days Left to Respond | Extension | Date | | |
|---|---|---|---|---|---|---|---|---|---|
| ☐ | 012 | Tim LePenne | New | Retrieve | 30 | NO | 1 | ...ndent | ∧ |
| ☑ | 012 | Donald Blair | In progress | Retrieve | 30 | NO | 1 | ...Doyle | ∧ |
| ☐ | 012 | Allison Smith | In progress | Retrieve | 30 | NO | 11/02/17 | Employee — Rena Doyle | ∧ |
| ☐ | 012 | Franklin Howard | Complete | Retrieve | 30 | NO | 11/02/17 | Employee — Rena Doyle | ∧ |

Enter Name  New Request  Edit  Filter

Popup menu:
- Verify Request
- Assign
- Request Extension
- Reject
- Suspend

Data Subject Request Queue

| | ID ▽ | Name | Status ▽ | Purpose | Days Left to Respond | Extension | Date Created | DSR Type | Respondent |
|---|---|---|---|---|---|---|---|---|---|
| ☐ | 012 | Tim LePenne | | | | | | Employee | Rena Doyle |
| ☑ | 012 | Donald Blair | | | | | | Employee | Rena Doyle |
| ☐ | 012 | Allison Smith | | | | | | Employee | Rena Doyle |
| ☐ | 012 | Franklin Howard | | | | | | Employee | Rena Doyle |

Request Assignment ✕

Approver: Jason Sabourin [ Me ] [ Someone Else ]

Respondent: Jason Sabourin

Comment: *Enter text here*

Cancel    Assign

FIG. 25

Data Subject Request Queue

| | ID ▾ | Name | Status ▾ | Purpose | Days Left to Respond | Extension | Date | ...ndent |
|---|---|---|---|---|---|---|---|---|
| ☐ | 012 | Tim LePenne | New | Retrieve | 30 | NO | | |
| ☑ | 012 | Donald Blair | In progress | Retrieve | 30 | NO | 1 | Doyle |
| ☐ | 012 | Allison Smith | In progress | Retrieve | 30 | NO | 11/02/17 | Rena Doyle |
| ☐ | 012 | Franklin Howard | Complete | Retrieve | 30 | NO | 11/02/17 | Rena Doyle |

Verify Request
Assign
Request Extension
Reject
Suspend

FIG. 26

Data Subject Request Queue

| | ID ▼ | Name | Status ▼ | Purpose | Days Left to Respond | Extension | Date Created | DSR Type | Respondent | |
|---|---|---|---|---|---|---|---|---|---|---|
| ☐ | 012 | Tim LePenne | New | Retrieve | 30 | NO | 11/02/17 | Employee | Rena Doyle | > |
| ☑ | 012 | Donald Blair | In progress | Retrieve | 30 | NO | 11/02/17 | Employee | Rena Doyle | > |
| ☐ | 012 | Allison Smith | In progress | Retrieve | 30 | NO | 11/02/17 | Employee | Rena Doyle | > |
| ☐ | 012 | Franklin Howard | | | | | | Employee | Rena Doyle | > |

Reject request ✕

*Enter reason for rejecting request here*

Cancel  Submit

FIG. 27

Data Subject Request Queue

| | ID ⌄ | Name | Status ⌄ | Purpose | Days Left to Respond | Extension | Date Created | DSR Type | Respondent | |
|---|---|---|---|---|---|---|---|---|---|---|
| ☐ | 012 | Tim LePenne | New | Retrieve | 30 | NO | 11/02/17 | Employee | Rena Doyle | > |
| ☑ | 012 | Donald Blair | In progress | Retrieve | 30 | NO | 11/02/17 | Employee | Rena Doyle | > |
| ☐ | 012 | Allison Smith | In progress | Retrieve | 30 | NO | 11/02/17 | Employee | Rena Doyle | > |
| ☐ | 012 | Franklin Howard | | | | | | Employee | Rena Doyle | > |

Reject Request ✕

The request submitted cannot be collected as no data regarding the Data Subject is maintained by mycompany any longer Cancel    Submit

FIG. 28

Data Subject Request Queue

| | ID ▽ | Name | Status ▽ | Purpose | Days Left to Respond | Extension | Date Created | DSR Type | Respondent | |
|---|---|---|---|---|---|---|---|---|---|---|
| ☐ | 012 | Tim LePenne | New | Retrieve | 30 | NO | 11/02/17 | Employee | Rena Doyle | ⋁ |
| ☑ | 012 | Donald Blair | Rejected | Retrieve | 30 | NO | 11/02/17 | Employee | Rena Doyle | ⋁ |
| ☐ | 012 | Allison Smith | In progress | Retrieve | 30 | NO | 11/02/17 | Employee | Rena Doyle | ⋁ |
| ☐ | 012 | Franklin Howard | Complete | Retrieve | 30 | NO | 11/02/17 | Employee | Rena Doyle | ⋁ |

FIG. 29

From: OneTrust Privacy Officer
Sent: Sunday, February 19, 2017 9:27 PM EST
To: Allison Smith <asmith123456789@gmail.com>
Bcc: Amelia Davis <adavis09876@ACME.com>
Subject: *Your ACME Privacy Request is being Completed*

Data Response

Dear Allison,

The request submitted cannot be collected as no data regarding the Data Subject is maintained by *mycompany* any longer Here are the details of your request:

Request ID: 5
Date Submitted: 2/21/2017 10:35AM EST
I am a(n): Employee
My request involves: Restrict
**First Name\*:** Allison
**Last Name\*:** Smith
**Email Address\*:** asmith123456789@gmail.com
Telephone: XXXXXXXXX
Addr Line 1: XXXXXXXXXX
Addr Line 2: XXXXXXXXXX
City: XXXXXXXXXX
**Count of Residence\*:** XXXXXXXXXX
Details of my request:
Restrict my Data If you have any questions regarding your submission, please contact *Amelia Davis* via email or phone:
adavis09876@ACME.com
+00 123 123 9980

ACME Privacy
123 Main St.
Capital City, ST, USA 20219

+1 800-123-4578
emailaboutprivacy@ACME.com
Link to Privacy Policy

FIG. 30

Data Subject Request Queue

| | ID ▽ | Name | Status ▽ | Purpose | Days Left to Respond | Extension | Date | ...ndent |
|---|---|---|---|---|---|---|---|---|
| ☐ | 012 | Tim LePenne | New | Retrieve | 30 | NO | | Doyle |
| ☑ | 012 | Donald Blair | In progress | Retrieve | 2 | NO | | Doyle |
| ☐ | 012 | Allison Smith | In progress | Retrieve | 30 | NO | 11/02/17 | Employee Rena Doyle |
| ☐ | 012 | Franklin Howard | Complete | Retrieve | 30 | NO | 11/02/17 | Employee Rena Doyle |

Popup menu:
- Verify Request
- Assign
- Request Extension
- Reject
- Suspend

FIG. 31

Data Subject Request Queue

| | ID ▽ | Name | Status ▽ | Purpose | Days Left to Respond | Extension | Date Created | DSR Type | Respondent | |
|---|---|---|---|---|---|---|---|---|---|---|
| ☐ | 012 | Donald Blair | New | Retrieve | 30 | NO | 11/02/17 | Employee | Rena Doyle | ⋁ |
| ☑ | 012 | Donald Blair | In progress | Retrieve | 2 | NO | 11/02/17 | Employee | Rena Doyle | ⋁ |
| ☐ | 012 | Allison Smith | In progress | Retrieve | 30 | NO | 11/02/17 | Employee | Rena Doyle | ⋁ |
| ☐ | 012 | Franklin Howard | | | | | | Employee | Rena Doyle | ⋁ |

Reject Request

How many days do you want to Extend?

[ 90 ] Days

Due to the complexity of this request, the response has been delayed

Cancel    Submit

FIG. 32

Data Subject Request Queue

| | ID ▾ | Name | Status ▾ | Purpose | Days Left to Respond | Extension | Date Created | DSR Type | Respondent | |
|---|---|---|---|---|---|---|---|---|---|---|
| ☐ | 012 | Tim LePenne | New | Retrieve | 30 | NO | 11/02/17 | Employee | Rena Doyle | › |
| ☐ | 012 | Donald Blair | New | Retrieve | 92 | YES | 11/02/17 | Employee | Rena Doyle | › |
| ☐ | 012 | Allison Smith | In progress | Retrieve | 30 | NO | 11/02/17 | Employee | Rena Doyle | › |
| ☐ | 012 | Franklin Howard | Complete | Retrieve | 30 | NO | 11/02/17 | Employee | Rena Doyle | › |

FIG. 33

From: OneTrust Privacy Officer
Sent: Sunday, February 19, 2017 9:27 PM EST
To: Allison Smith <asmith123456789@gmail.com>
Bcc: Amelia Davis <adavis09876@ACME.com>
Subject: *Your ACME Privacy Request is being Completed*

CORPORATION

Data Response

Dear Allison,

Due to the complexity of this request, the response has been delayed

If you have any questions regarding your submission, please contact *Amelia Davis* via email or phone:
adavis09876@ACME.com
+00 123 123 9980

ACME Privacy
123 Main St.
Capital City, ST, USA 20219

+1 800-123-4578
emailaboutprivacy@ACME.com
Link to Privacy Policy

FIG. 34

Data Subject Request Queue

| | ID ▼ | Name | Status ▼ | Purpose | Days Left to Respond | Extension | Date Created | DSR Type | Respondent |
|---|---|---|---|---|---|---|---|---|---|
| ☐ | 012 | Tim LePenne | New | Retrieve | 30 | NO | 11/02/17 | Employee | Rena Doyle |
| ☐ | 012 | Donald Blair | In progress | Retrieve | 30 | NO | 11/02/17 | Employee | Rena Doyle |
| ☐ | 012 | Allison Smith | Rejected | Retrieve | 30 | NO | 11/02/17 | Employee | Rena Doyle |
| ☐ | 012 | Franklin Howard | Complete | Retrieve | 30 | NO | 11/02/17 | Employee | Rena Doyle |

FIG. 35

Data Subject Request Details (In Progress)

Request Queue › Response-05

< Back to Queue　　　　　　　　　　　　　　　　　　　　　　　Edit

Assignee: Jason Sabourin

Date Opened: 11/02/17

Extended: No

Deadline: 3/25

Request Type: Data Retrieval

Request Count: 1

Tags: + Add New

Donald Blair

Request ID: 05
e-mail address: dblair@gmail.com
Address: 123 Main St
Apt 18
Atlanta, Ga 30320

Country: USA
Phone number: 323-420-4039
Subject Type: Customer

Inbox　　Comments　　Attachments

Today
○　From: Donald Blair
　　03/09/17　09:33 AM EST

From: OneTrust
　　03/09/17　09:33 AM EST
　　CC: Jason Sabourin, Brett Curtis

Monday
　　From: OneTrust
　　03/09/17　09:33 AM EST
　　CC: Jason Sabourin, Brett Curtis

FIG. 36

Data Subject Request Details

Request Queue > Response-05

Assignee: Jason Sabourin

Date Opened: 11/02/17

Extended: No

Deadline: 3/25

Request Type: Data Retrieval

Request Count: 1

Tags: + Add New

Donald Blair

Request ID: 05
e-mail address: dblair@gmail.com
Address: 123 Main St
Apt 18
Atlanta, Ga 30320

Country: USA
Phone number: 323-420-4039
Subject Type: Customer

Edit

Inbox | Comments | Attachments

Unverified Request

In order to respond to this request it must be verified

Verify Now

Data Subject Request Details (In progress)

Request Queue > Response-05

Assignee:
Jason Sabourin

Date Opened:
11/02/17

Extended:
No

Deadline:
3/25

Request Type:
Data Retrieval

Request Count:
1

Tags:
+ Add New

Donald Blair

| | | | |
|---|---|---|---|
| Request ID: | 05 | Country: | USA |
| e-mail address: | dblair@gmail.com | Phone number: | 323-420-4039 |
| Address: | 123 Main St | Subject Type: | Customer |
| | Apt 18 | | |
| | Atlanta, Ga 30320 | | |

Inbox | Comments | Attachments

Today

From: Donald Blair
03/09/17 09:33 AM EST

Cras mattis consectetur purus sit amet fermentum. Cras justo odio, dapibus ac facilisis in, egestas eget quam. Nullam quis risus eget urna mollis ornare vel eu leo. Maecenas faucibus mollis interdum. Curabitur blandit tempus porttitor.

Draft to Donald Blair
CC: *Enter CC Here*

Cras mattis consectetur purus sit amet fermentum. Cras justo odio, dapibus ac facilisis in, egestas eget quam. Nullam quis risus eget urna mollis ornare vel eu leo. Maecenas faucibus mollis interdum. Curabitur blandit tempus porttitor.

Save | Send as Complete

From: OneTrust
03/09/17 09:33 AM EST

CC: Jason Sabourin, Brett Curtis

Edit

FIG. 39

Data Subject Request Details

Request Queue > Response-05

Assignee: Jason Sabourin (Complete) (Edit)

Donald Blair

Request ID: 05
e-mail address: dblair@gmail.com
Address: 123 Main St
Apt 18
Atlanta, Ga 30320

Country: USA
Phone number: 323-420-4039
Subject Type: Customer

Date Opened:
11/02/17

Extended:
No

Deadline:
3/25

Request Type:
Data Retrieval

Request Count:
1

Tags:
+ Add New

Inbox | Comments | Attachments

Today

From:OneTrust (Replied as Complete)
03/09/17 09:33 AM EST
CC:Jason Sabourin, Brett Curtis

From:Donald Blair
03/09/17 09:33 AM EST

Monday

From:OneTrust
03/09/17 09:33 AM EST
CC:Jason Sabourin, Brett Curtis

< Back to Queue

FIG. 40

OneTrust
Privacy Management Software

Request ID

☐ I'm not a robot

Welcome to OneTrust

Features:
- Unlimited usage and respondents
- Centralized record keeping and reporting
- Readiness & PIA Templates
- Data Mapping Automation
- Website Scanning & Cookie Compliance
- Ability to tailor questionnaire templates for use cases including: GDPR, DPIA, Privacy Threshold assessment (PTA), Vendor Risk Assessments, Information Security Assessments, and more Questions? Contact Us support@onetrust.com

FIG. 42

From: OneTrust Privacy Officer
Sent: Sunday, February 19, 2017 9:27 PM EST
To: Joe Lopez <jlopez123456789@gmail.com>
Bcc: Amelia Davis <adavis09876@ACME.com>
Subject: *Your ACME Privacy Request is being Completed*

Auth Token

TOKEN: ABSH!&&@12131JEJE

ACME Privacy
123 Main St.
Capital City, ST, USA 20219

+1 800-123-4578
emailaboutprivacy@ACME.com
Link to Privacy Policy

OneTrust
Privacy Management Software

Request ID

5

Email Token

ABSH!&&@12131JEJE

Log In

Welcome to OneTrust

Features:
- Unlimited usage and respondents
- Centralized record keeping and reporting
- Readiness & PIA Templates
- Data Mapping Automation
- Website Scanning & Cookie Compliance
- Ability to tailor questionnaire templates for use cases including: GDPR, DPIA, Privacy Threshold assessment (PTA), Vendor Risk Assessments, Information Security Assessments, and more Questions? Contact Us support@onetrust.com

FIG. 44

From: Generitech Privacy officer
Sent: Monday, February 20, 2017 9:27 PM EST
To: Alison Smith <asmith.123456789@gmail.com>
Bcc: Amelia Davis <adavis09876@generitech.com>
Subject: Your Generitech Privacy Request is completed

OneTrust
Privacy Management Software

Data Subject Request Assignment

Dear Joe,

The following data subject request has been filed, and you have been identified as someone who knows how to fulfill the request. Please click the link below, in order to fulfill the request Click here to access the request

[ Access Request ]

If you have questions regarding your submission, please contact Amelia Davis via email or phone:

adavis09876@ACME.com
+00 123 123 9980

Generitech Privacy
123 Main St.
Capital City, ST, USA 20219

+1 800-123-4578
emailaboutprivacy@generitech.com
Link to Privacy Policy

DATA PROCESSING SYSTEMS FOR FULFILLING DATA SUBJECT ACCESS REQUESTS AND RELATED METHODS

CROSS-REFERENCE TO RELATED APPLICATIONS

This application is a continuation of U.S. patent application Ser. No. 17/019,771, filed Sep. 14, 2020, which is a continuation of U.S. patent application Ser. No. 16/786,196, filed Feb. 10, 2020, now U.S. Pat. No. 10,776,515, issued Sep. 15, 2020, which is a continuation of U.S. patent application Ser. No. 16/512,011, filed Jul. 15, 2019, now U.S. Pat. No. 10,558,821, issued Feb. 11, 2020, which is a continuation of U.S. patent application Ser. No. 16/226,290, filed Dec. 19, 2018, now U.S. Pat. No. 10,354,089, issued Jul. 16, 2019, which is a continuation of U.S. patent application Ser. No. 16/054,672, filed Aug. 3, 2018, now U.S. Pat. No. 10,169,609, issued Jan. 1, 2019, which claims priority from U.S. Provisional Patent Application Ser. No. 62/547,530, filed Aug. 18, 2017, and which is also a continuation-in-part of U.S. patent application Ser. No. 15/996,208, filed Jun. 1, 2018, now U.S. Pat. No. 10,181,051, issued Jan. 15, 2019, which claims priority from U.S. Provisional Patent Application Ser. No. 62/537,839, filed Jul. 27, 2017, and is also a continuation-in-part of U.S. patent application Ser. No. 15/853,674, filed Dec. 22, 2017, now U.S. Pat. No. 10,019,597, issued Jul. 10, 2018, which claims priority from U.S. Provisional Patent Application Ser. No. 62/541,613, filed Aug. 4, 2017, and is also a continuation-in-part of U.S. patent application Ser. No. 15/619,455, filed Jun. 10, 2017, now U.S. Pat. No. 9,851,966, issued Dec. 26, 2017, which is a continuation-in-part of U.S. patent application Ser. No. 15/254,901, filed Sep. 1, 2016, now U.S. Pat. No. 9,729,583, issued Aug. 8, 2017, which claims priority from: (1) U.S. Provisional Patent Application Ser. No. 62/360,123, filed Jul. 8, 2016; (2) U.S. Provisional Patent Application Ser. No. 62/353,802, filed Jun. 23, 2016; and (3) U.S. Provisional Patent Application Ser. No. 62/348,695, filed Jun. 10, 2016. The disclosures of all of the above patent applications are hereby incorporated herein by reference in their entirety.

BACKGROUND

Over the past years, privacy and security policies, and related operations have become increasingly important. Breaches in security, leading to the unauthorized access of personal data (which may include sensitive personal data) have become more frequent among companies and other organizations of all sizes. Such personal data may include, but is not limited to, personally identifiable information (PII), which may be information that directly (or indirectly) identifies an individual or entity. Examples of PII include names, addresses, dates of birth, social security numbers, and biometric identifiers such as a person's fingerprints or picture. Other personal data may include, for example, customers' Internet browsing habits, purchase history, or even their preferences (e.g., likes and dislikes, as provided or obtained through social media).

Many organizations that obtain, use, and transfer personal data, including sensitive personal data, have begun to address these privacy and security issues. To manage personal data, many companies have attempted to implement operational policies and processes that comply with legal and industry requirements. However, there is an increasing need for improved systems and methods to manage personal data in a manner that complies with such policies.

SUMMARY

It should be appreciated that this Summary is provided to introduce a selection of concepts in a simplified form that are further described below in the Detailed Description. This Summary is not intended to be used to limit the scope of the claimed subject matter.

A computer-implemented method for responding to a data subject access request is provided. According to one aspect, one or more computer processors receive a data subject access request from a requestor, the request having one or more pieces of personal data. The computer processor identifies the requestor based at least in part the personal data. The computer processor identifies the source of the request based at least in part on the requestor or source data associated with the data subject access request. In response to identifying the requestor and the source of the data subject access request the computer processor determines whether the data subject access request is subject to one or more response fulfillment constraints associated with the requestor or the source by determining Whether the requestor is a malicious requestor or whether the source is a malicious source. In response to determining that the data subject access request is subject to one or more response fulfillment constraints, the computer processor denies the data subject access request, or requests one or more processing fees prior to fulfilling the request. In response to determining that the data subject access request is not subject to one or more response fulfillment constraints, the computer processor fulfills the data subject access request.

According to another aspect, a computer-implemented method for responding to a data subject access request includes receive a data subject access request from a requestor, the request having one or more request parameters from a requestor at a source. In response to receiving the data subject access request, one or more computer processors retrieve fulfillment constraint data associated with the data subject access request from a repository server corresponding to a number of data subject access requests from a number of requestors and a number of sources. The computer processor determines whether the requestor is a malicious requestor or whether the source is a malicious source based on the fulfillment constraint data and the request parameters. In response to determining that the requestor is a malicious requestor or that the source is a malicious source, the computer processor determines whether the data subject access request is subject to one or more fulfillment constraints. If so, the computer processor denies the data subject access request or requests one or more processing fees prior to fulfilling the request.

According to yet another aspect, a computer-implemented method for responding to a data subject access request includes one or more computer processors receiving a data subject access request with one or more pieces of personal data associated with a requestor. The computer processor identifies the requestor based at least in part on the request parameters. In response to identifying the requestor, the computer processor retrieves fulfillment constraint data associated with the requestor. The computer processor determines whether the requestor is potentially malicious based on the fulfillment constraint data. In response to determining that the requestor is potentially malicious, the computer processor determines whether the data subject access request is subject to one or more fulfillment constraints. If so, the computer processor denies the data subject access request or requests one or more processing fees prior to fulfilling the request. If not, the computer processor fulfills the data subject access request.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

Various embodiments of a data subject access request fulfillment system are described below. In the course of this description, reference will be made to the accompanying drawings, which are not necessarily drawn to scale, and wherein:

FIGS. 1-6 depict various exemplary screen displays and user interfaces that a user of various embodiments of the system may encounter.

FIGS. 9-49 are computer screen shots that demonstrate the operation of various embodiments.

DETAILED DESCRIPTION

Figure 6:
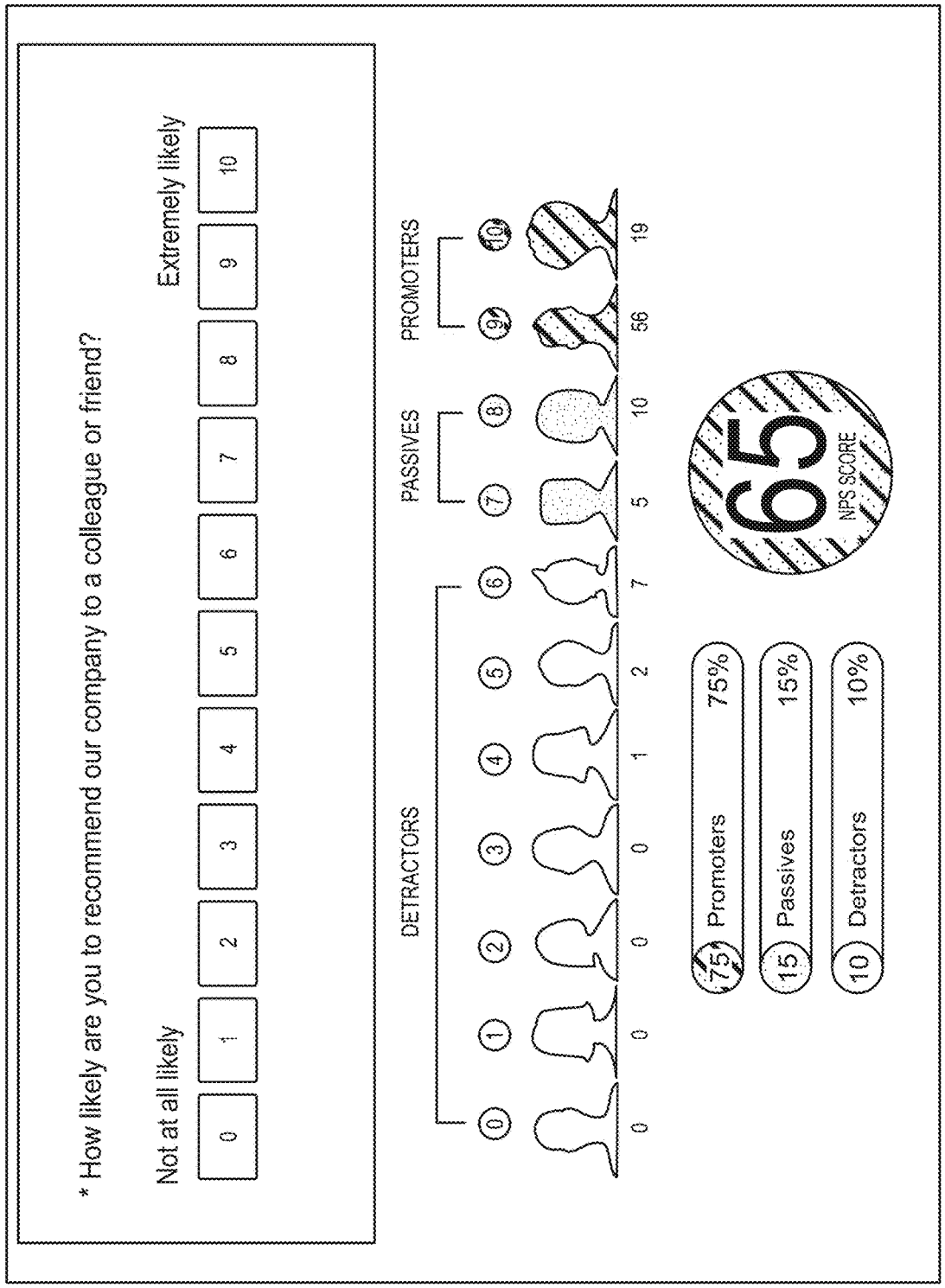

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In various embodiments, an organization, corporation, etc. may be required to provide information requested by an individual for whom the organization stores personal data. As a particular example, an organization may be required to provide an individual with a listing of, for example: (1) any personal data that the organization is processing for an individual, (2) an explanation of the categories of data being processed and the purpose of such processing; (3) categories of third parties to whom the data may be disclosed; (4) etc. In particular embodiments, when processing a data subject access request (e.g., a request for such information), a data subject access request fulfillment system may be configured to verify an identity of the requestor (e.g., a data subject) prior to processing the request.

In various embodiments, a data subject access request fulfillment system may be implemented in the context of any suitable privacy management system that is configured to ensure compliance with one or more legal or industry standards related to the collection and/or storage of private information (e.g., such as personal data). In various embodiments, a particular organization, sub-group, or other entity may initiate a privacy campaign or other activity (e.g., processing activity) as part of its business activities. In such embodiments, the privacy campaign may include any undertaking by a particular organization (e.g., such as a project or other activity) that includes the collection, entry, and/or storage (e.g., in computer memory) of any personal data associated with one or more individuals (e.g., data subjects). In particular embodiments, a privacy campaign may include any project undertaken by an organization that includes the use of personal data, or any other activity that could have an impact on the privacy of one or more individuals.

In any embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein. In particular embodiments, such personal data may include one or more cookies (e.g., where the individual is directly identifiable or may be identifiable based at least in part on information stored in the one or more cookies).

Various privacy and security policies (e.g., such as the European Union's General Data Protection Regulation, and other such policies) may provide data subjects (e.g., individuals, organizations, or other entities) with certain rights related to the data subject's personal data that is collected, stored, or otherwise processed by an organization. These rights may include, for example: (1) a right to obtain confirmation of whether a particular organization is processing their personal data; (2) a right to obtain information about the purpose of the processing (e.g., one or more reasons for which the personal data was collected); (3) a right to obtain information about one or more categories of data being processed (e.g., what type of personal data is being collected, stored, etc.); (4) a right to obtain information about one or more categories of recipients with whom their personal data may be shared (e.g., both internally within the organization or externally); (5) a right to obtain information about a time period for which their personal data will be stored (e.g., or one or more criteria used to determine that time period); (6) a right to obtain a copy of any personal data being processed (e.g., a right to receive a copy of their personal data in a commonly used, machine-readable format); (7) a right to request erasure (e.g., the right to be forgotten), rectification (e.g., correction or deletion of inaccurate data), or restriction of processing of their personal data; and (8) any other suitable rights related to the collection, storage, and/or processing of their personal data (e.g., which may be provided by law, policy, industry or organizational practice, etc.).

As may be understood in light of this disclosure, a particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, a particular organization may store personal data in a plurality of different locations which may include one or more known and/or unknown locations. As such, complying with particular privacy and security policies related to personal data (e.g., such as responding to one or more requests by data subjects related to their personal data) may be particularly difficult (e.g., in terms of cost, time, etc.). In particular embodiments, the data subject access request fulfillment system may utilize one or more data model generation and population techniques to create a centralized data map with which the system can identify personal data stored, collected, or processed for a particular data subject, a reason for the processing, and any other information related to the processing.

In particular embodiments, the data subject access request fulfillment system is configured to: (1) receive a data subject access request from a data subject, the data subject access request comprising one or more requests related to the one or more rights described above (e.g., a request for a copy of the data subject's personal data, a request regarding how long personal data associated with the data subject is being stored by the system, etc.); (2) process the request; and (3) fulfill the request based at least in part on one or more request parameters.

Figure 1:
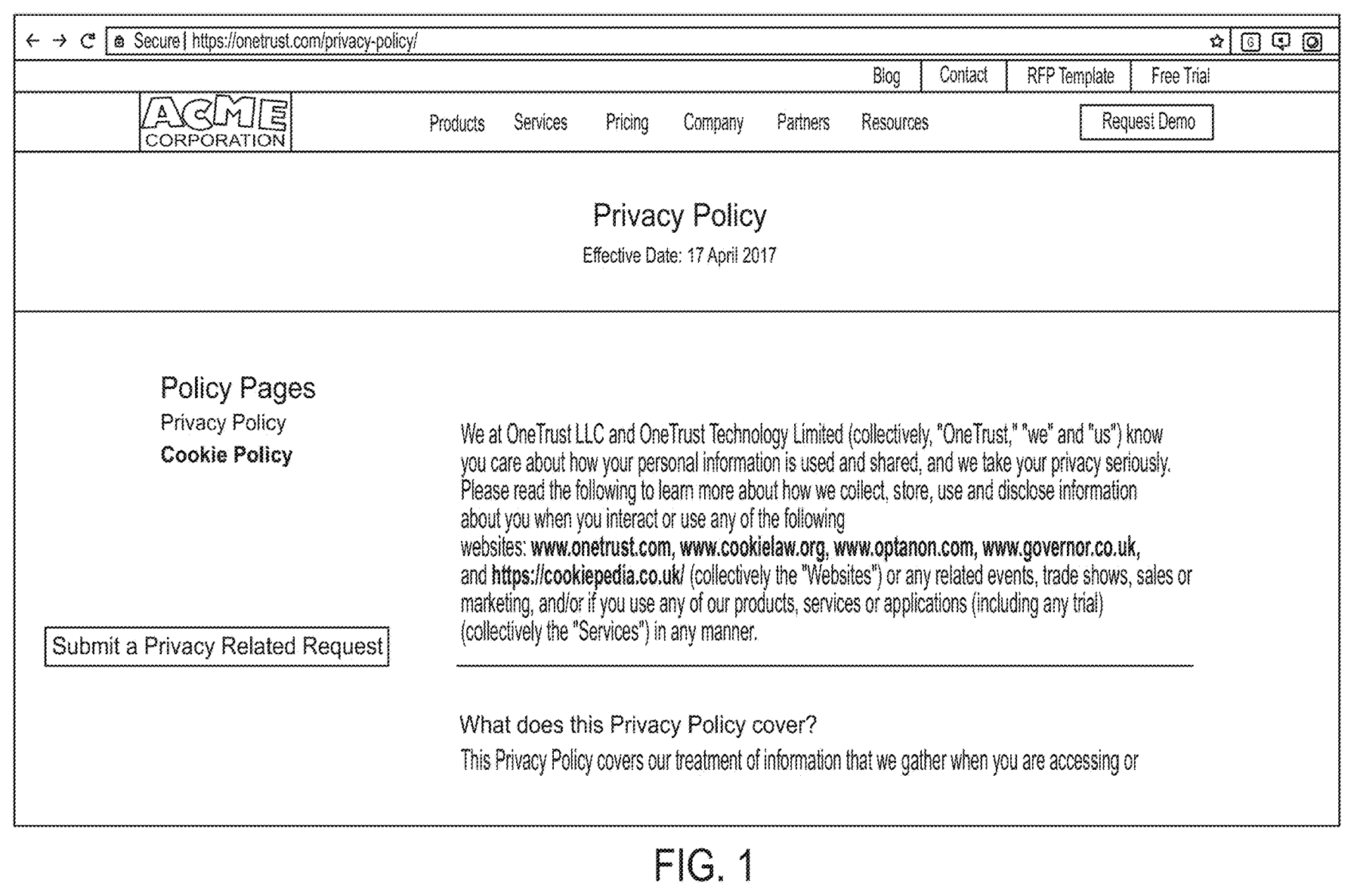
Figure 2:
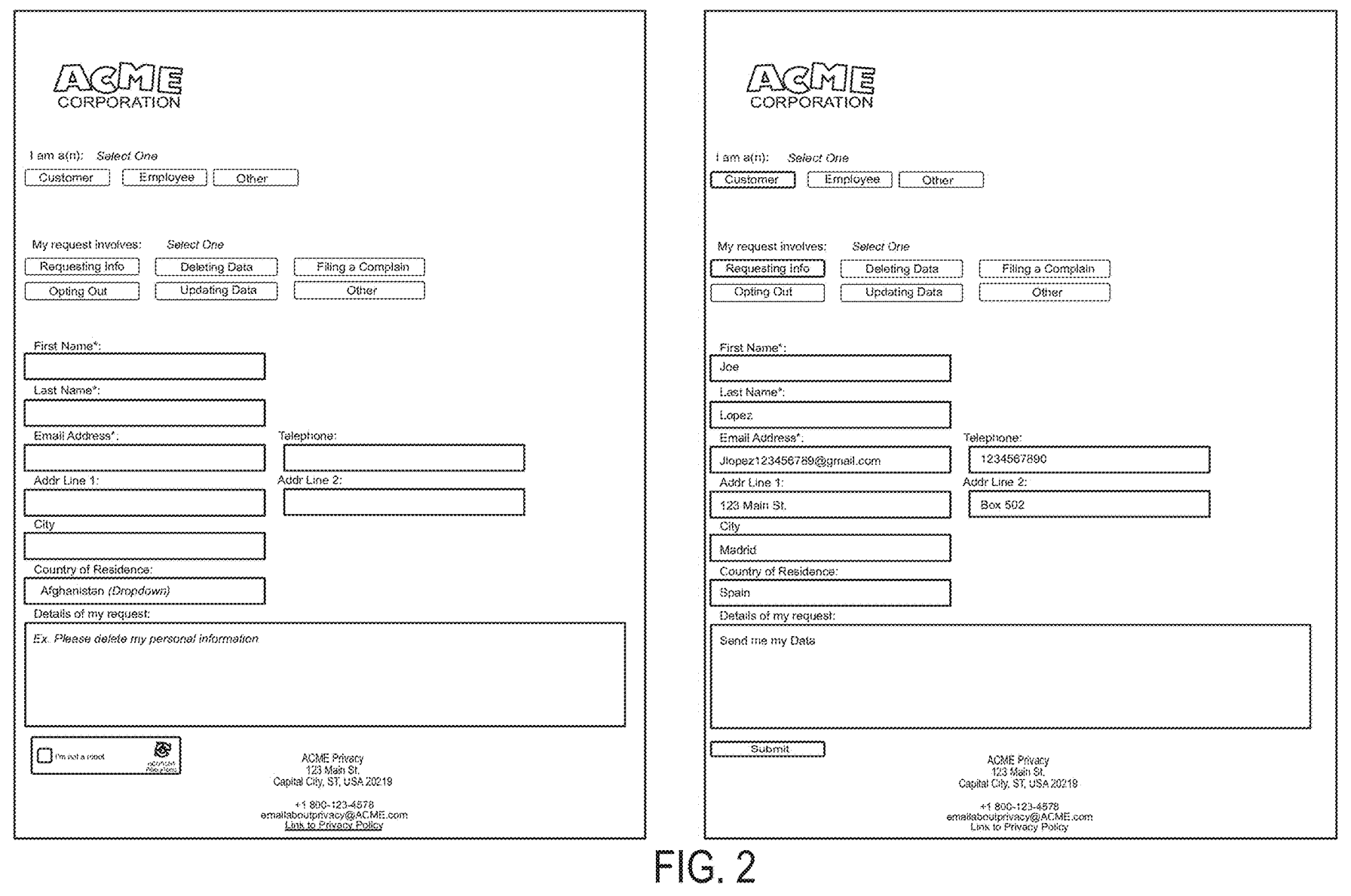

FIGS. 1-2 depict exemplary screen displays that a user may view when submitting a data subject access request (e.g., exemplary user interfaces for submitting a data subject access request). As shown in FIG. 1, a website associated with a particular organization may include a user-selectable indicia for submitting a privacy-related request. A user desiring to make such a request may select the indicia in order to initiate the data subject access request process.

FIG. 2 depicts an exemplary data subject access request form in both an unfilled and filled out state. As shown in this figure, the system may prompt a user to provide information such as, for example: (1) what type of requestor the user is (e.g., employee, customer, etc.); (2) what the request involves (e.g., requesting info, opting out, deleting data, updating data, etc.); (3) first name; (4) last name; (5) email address; (6) telephone number; (7) home address; (8) one or more other pieces of identifying information; and/or (9) one or more details associated with the request. As will be discussed more fully below, the system may be configured to utilize one or more pieces of information provided by the data subject when processing and fulfilling the data subject access request.

Various embodiments of a data subject access request fulfillment system are described more fully below.

Automatic Identity Validation Systems

In particular embodiments, when processing a data subject access request, the system may be configured to verify an identity of the data subject prior to processing the request (e.g., or as part of the processing step). In various embodiments, confirming the identity of the data subject may, for example, limit a risk that a third-party or other entity may gain unlawful or unconsented to access to the requestor's personal data. The system may, for example, limit processing and fulfillment of requests relating to a particular data subject to requests that are originated by (e.g., received from) the particular data subject. When processing a data subject access request, the system may be configured to use all reasonable measures to verify the identity of the data subject who requests access (e.g., in particular in the context of online services and online identifiers). In particular embodiments, the system is configured to substantially automatically validate an identity of a data subject when processing the data subject access request.

For example, in particular embodiments, the system may be configured to substantially automatically (e.g., automatically) authenticate and/or validate an identity of a data subject using any suitable technique. These techniques may include, for example: (1) one or more credit-based and/or public- or private-information-based verification techniques; (2) one or more company verification techniques (e.g., in the case of a business-to-business data subject access request); (3) one or more techniques involving integration with a company's employee authentication system; (4) one or more techniques involving a company's (e.g., organization's) consumer portal authentication process; (5) etc. Various exemplary techniques for authenticating a data subject are discussed more fully below.

In particular embodiments, when authenticating a data subject (e.g., validating the data subject's identity), the system may be configured to execute particular identity confirmation steps, for example, by interfacing with one or more external systems (e.g., one or more third-party data aggregation systems). For example, the system, when validating a data subject's identity, may begin by verifying that a person with the data subject's name, address, social security number, or other identifying characteristic (e.g., which may have been provided by the data subject as part of the data subject access request) actually exists. In various embodiments, the system is configured to interface with (e.g., transmit a search request to) one or more credit reporting agencies (e.g., Experian, Equifax, TransUnion, etc.) to confirm that a person with one or more characteristics provided by the data subject exists. The system may, for example, interface with such credit reporting agencies via a suitable plugin (e.g., software plugin). Additionally, there might be a verification on behalf of a trusted third-party system (e.g., the controller).

In still other embodiments, the system may be configured to utilize one or more other third-party systems (e.g., such as LexisNexis, IDology, RSA, etc.), which may, for example, compile utility and phone bill data, property deeds, rental agreement data, and other public records for various individuals. The system may be configured to interface with one or more such third-party systems to confirm that a person with one or more characteristics provided by the data subject exists.

After the step of confirming the existence of a person with the one or more characteristics provided by the data subject, the system may be configured to confirm that the person making the data subject access request is, in fact, the data subject. The system may, for example, verify that the requestor is the data subject by prompting the requestor to answer one or more knowledge-based authentication questions (e.g., out-of-wallet questions). In particular embodiments, the system is configured to utilize one or more third-party services as a source of such questions (e.g., any of the suitable third-party sources discussed immediately above). The system may use third-party data from the one or more third-party sources to generate one or more questions. These one or more questions may include questions that a data subject should know an answer to without knowing the question ahead of time (e.g., one or more previous addresses, a parent or spouse name and/or maiden name, etc.).

FIG. 3 depicts an exemplary identity verification questionnaire. As may be understood from this figure, an identity verification questionnaire may include one or more questions whose responses include data that the system may derive from one or more credit agencies or other third-party data aggregation services (e.g., such as previous street addresses, close associates, previous cities lived in, etc.). In particular embodiments, the system is configured to provide these one or more questions to the data subject in response to receiving the data subject access request. In other embodiments, the system is configured to prompt the data subject to provide responses to the one or more questions at a later time (e.g., during processing of the request). In particular other embodiments, the system is configured to substantially automatically compare one or more pieces of information provided as part of the data subject access request to one or more pieces of data received from a third-party data aggregation service in order to substantially automatically verify the requestor's identity.

In still other embodiments, the system may be configured to prompt a requestor to provide one or more additional pieces of information in order to validate the requestor's identity. This information may include, for example: (1) at least a portion of the requestor's social security number (e.g., last four digits); (2) a name and/or place of birth of the requestor's father; (3) a name, maiden name, and/or place of birth of the requestor's mother; and/or (4) any other information which may be useful for confirming the requestor's identity (e.g., such as information available on the requestor's birth certificate). In other embodiments, the system may be configured to prompt the requestor to provide authorization for the company to check the requestor's social security or other private records (e.g., credit check authorization, etc.) to obtain information that the system may use to confirm the requestor's identity. In other embodiments, the system may prompt the user to provide one or more images (e.g., using a suitable mobile computing device) of an identifying document (e.g., a birth certificate, social security card, driver's license, etc.).

The system may, in response to a user providing one or more responses that matches information that the system receives from one or more third-party data aggregators or through any other suitable background, credit, or other search, substantially automatically authenticate the requestor as the data subject. The system may then continue processing the data subject's request, and ultimately fulfill their request.

In particular embodiments, such as embodiments in which the requestor includes a business (e.g., as in a business to business data subject access request), the system may be configured to authenticate the requesting business using one or more company verification techniques. These one or more company validation techniques may include, for example, validating a vendor contract (e.g., between the requesting business and the company receiving the data subject access request); receiving a matching token, code, or other unique identifier provided by the company receiving the data subject access request to the requesting business; receiving a matching file in possession of both the requesting business and the company receiving the data subject access request; receiving a signed contract, certificate (e.g., digital or physical), or other document memorializing an association between the requesting business and the company receiving the data subject access request; and/or any other suitable method of validating that a particular request is actually made on behalf of the requesting business (e.g., by requesting the requesting business to provide one or more pieces of information, one or more files, one or more documents, etc. that may only be accessible to the requesting business).

In other embodiments, the system may be configured to authenticate a request via integration with a company's employee or customer (e.g., consumer) authentication process. For example, in response to receiving a data subject access request that indicates that the data subject is an employee of the company receiving the data subject access request, the system may be configured to prompt the employee to login to the company's employee authentication system (e.g., Okta, Azure, AD, etc.) In this way, the system may be configured to authenticate the requestor based at least in part on the requestor successfully logging into the authentication system using the data subject's credentials. Similarly, in response to receiving a data subject access request that indicates that the data subject is a customer of the company receiving the data subject access request, the system may be configured to prompt the customer to login to an account associated with the company (e.g., via a consumer portal authentication process). In a particular example, this may include, for example, an Apple ID (for data subject access requests received by Apple). In this way, the system may be configured to authenticate the requestor based at least in part on the requestor successfully logging into the authentication system using the data subject's credentials. In some embodiments, the system may be configured to require the requestor to login using two-factor authentication or other suitable existing employee or consumer authentication process.

Data Subject Request Fulfillment Constraints

In various embodiments, a particular organization may not be required to respond to a data subject access request that originates from (e.g., is received from) a malicious requestor or source. A malicious requestor or source may include, for example: a requestor (e.g., an individual) that submits excessive or redundant data subject access requests; a requestor who is a disgruntled employee that was previously and not currently employed by the company receiving the data subject access request that is submitting such requests to tie up the company's resources unnecessarily; a group of requestors such as researchers, professors, students, NGOs, etc. that submit a plurality of requests for reasons other than those reasons provided by policy, law, etc.; a competitor of the company receiving the data subject access request that is submitting such requests to tie up the company's resources unnecessarily; a group of requestors originating from a particular geographic region (e.g., a country) that may submit excessive data subject access requests to disrupt the company's operations or tie up the company's resources unnecessarily for economic or other reasons; a group of requestors associated with a particular political organization that may submit excessive data subject access requests to expend the company's resources for economic or retaliatory reasons; a group of requestors associated with a particular protesting organization (e.g., a group protesting the company, the company's employees, or the any entities affiliated with the company for any reason) that may submit excessive data subject access requests to expend the company's resources; a terrorist or other organization that may spam requests to disrupt the company's operation and response to valid requests; and/or any other request that may fall outside the scope of valid requests made for reasons proscribed by public policy, company policy, or law.

In particular embodiments, the system is configured to maintain a "blacklist" of such malicious requestors. As will be described in detail below, this virtual blacklist may include fulfillment constraint data that may be cross-referenced upon receipt of a data subject access request to determine if the data subject access request is subject to one or more response fulfillment constraints. If the data subject access request is subject to one or more response fulfillment constraints, then the system may take action on the request according to one or more limitations.

Figure 50:
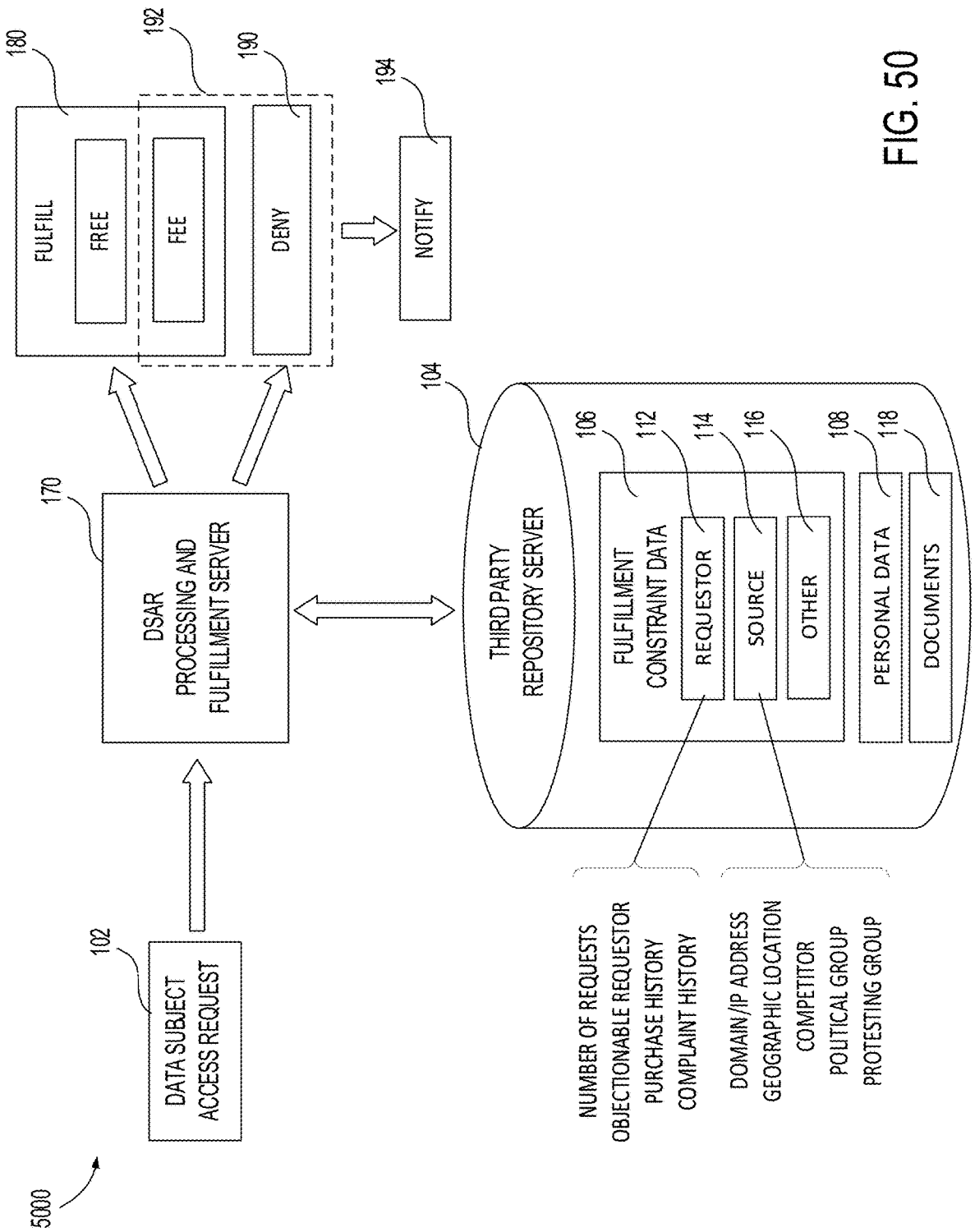
FIG. 50 depicts a data subject access request response and fulfillment constraint determination system according to particular embodiments.
Figure 51:
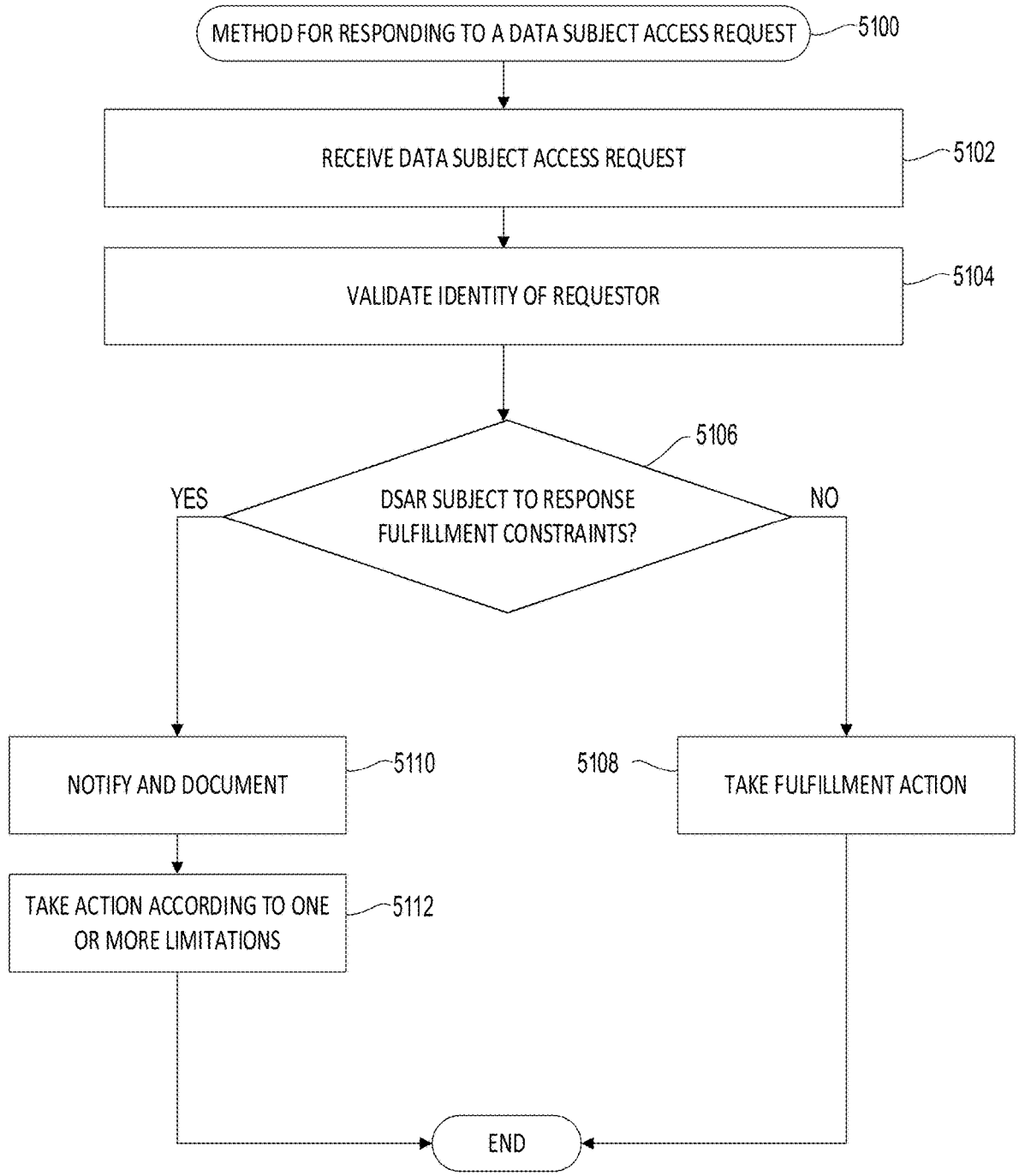
FIG. 51 depicts a flow chart showing an example of a computer-implemented data processing method for responding to a data subject access request according to particular embodiments.
Figure 52:
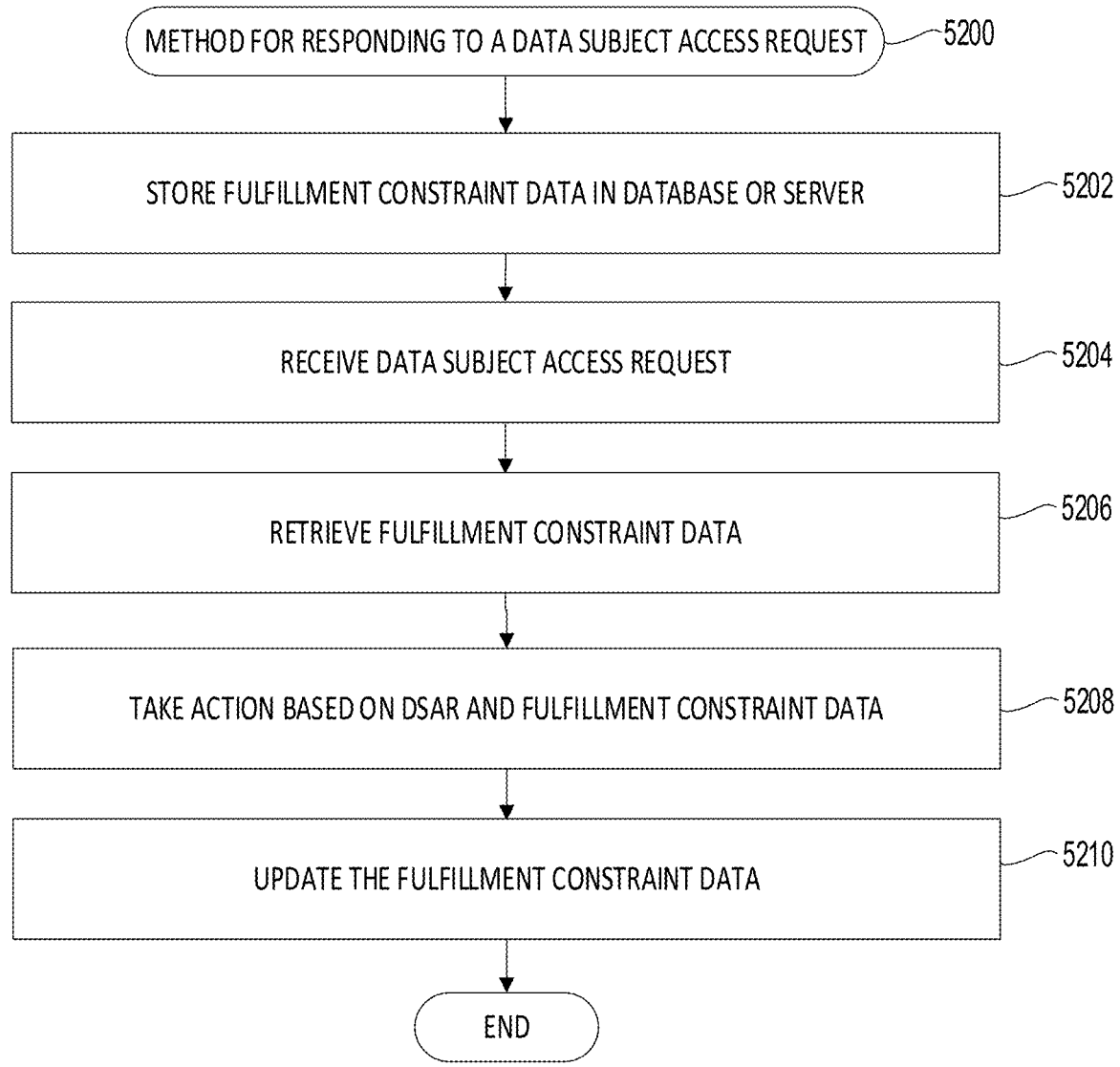
FIG. 52 depicts a flow chart showing an example of a computer-implemented data processing method for responding to a data subject access request while maintaining fulfillment constraint data according to particular embodiments.

Looking now at FIGS. 50-52, illustrative examples for processing data subject access requests will be described with respect to the utilization of one or more response fulfillment constraints. FIG. 50 shows a visualization of a data subject access request response and fulfillment constraint determination system 5000 according to various embodiments. For clarity purposes, an overview of the system 5000 will be provided prior to a detailed discussion of the various actions and components of the system 5000 and corresponding process.

According to various embodiments, a Data Subject Access Request (DSAR) 102 is submitted by a requestor and received at a DSAR Processing and Fulfillment Server 170. The DSAR 102 may be submitted and authenticated in the manner described above. The DSAR Processing and Fulfillment Server 170 may utilize one or more databases 140 and/or one or more third party servers 160 (discussed in greater detail below with respect to the example system architecture and FIG. 7 below) to determine whether any Fulfillment Constraint Data 106 exists corresponding to the Requestor 112 of the DSAR 102, the Source 114 of the DSAR 102, or Other Fulfillment Constraint Data Criteria 116 related to the DSAR 102. According to particular embodiments, the one or more databases 140 and/or one or more third party servers 160 may include a Third Party Repository Server 104 that serves as a central repository for storing and accessing both Personal Data 108 that is the target of the DSAR 102 and Fulfillment Constraint Data 106 that may be used to impose one or more limitations on any fulfillment of the DSAR 102. By utilizing a Third Party Repository Server 104, the system may analyze global data (e.g., all data collected for a plurality of companies that utilize the data subject access request fulfillment system) to generate the Fulfillment Constraint Data 106.

After verifying the existence of any Fulfillment Constraint Data 106, the DSAR Processing and Fulfillment Server 170 takes action, either by a Fulfillment Action 180 or a Deny Action 190. The action taken by the DSAR Processing and Fulfillment Server 170 may be subject to One or More Limitations 192 (indicated in FIG. 50 by the box outlined with broken lines) depending on the outcome of the search for Fulfillment Constraint Data 106. Specifically, the One or More Limitations 192 may include fulfilling the DSAR 102 conditional upon payment of a processing fee, or denying or rejecting the DSAR 102. Action taken by the DSAR Processing and Fulfillment Server 170 that is subject to One or More Limitations 192 results in a notification action 194 in which the requestor associated with the DSAR 102 is notified as to the One or More Limitations 192 and the reasoning behind the One or More Limitations 192.

Looking at the system 5000 now in greater detail, the DSAR 102 may be submitted using the exemplary data subject access request form shown and described above with respect to FIGS. 1 and 2. The system may prompt the user to provide information such as, for example: (1) what type of requestor the user is (e.g., employee, customer, etc.); (2) what the request involves (e.g., requesting info, opting out, deleting data, updating data, etc.); (3) first name; (4) last name; (5) email address; (6) telephone number; (7) home address; (8) one or more other pieces of identifying information; and/or (9) one or more details associated with the request. According to various embodiments, the requestor may additionally be prompted to provide information regarding the number of DSARs 102 previously submitted and corresponding dates, as well as any additional employment or organizational affiliation information that could subject the DSAR 102 to one or more response fulfillment constraints. While the system may not rely solely on the information provided by the requestor in determining whether one or more response fulfillment constraints apply to the DSAR 102, time and resources may be saved if the information input by the requestor triggers a response fulfillment constraint without necessitating a search for Fulfillment Constraint Data 106.

According to various embodiments, the system is configured to track a requestor and a source associated with each DSAR 102 and analyze each DSAR 102 to identify requestors and/or sources from which: (1) the company receives a large volume of requests; (2) the company receives a large number of repeat requests; (3) the company receives a request from a requestor or source for which the company does not legally have to respond, or have to respond at no cost. The sources may include, for example: (1) one or more particular IP addresses; (2) one or more particular domains; (3) one or more particular countries; (4) one or more particular institutions; (5) one or more particular geographic regions; (6) one or more political group; and/or (7) one or more protesting group. In response to analyzing the sources of the requests, the system may identify one or more requestors or sources that may be malicious (e.g., are submitting excessive requests). For the purposes of this disclosure, a malicious requestor or source of a DSAR 102 encompasses any DSAR 102 that falls outside of the guidelines and regulations requiring a free response to a DSAR 102.

As an example, the system may be configured to fulfill data subject access requests for the purpose of providing a data subject with information regarding what data the company collects and for what purpose. A typical DSAR 102 may be made so that the data subject can ensure that the company is collecting data for lawful reasons. As such, the system may be configured to identify requestors and other sources of data requests that are made for other reasons (e.g., a malicious reason or one or more reasons that would not obligate the company to respond to the request). These reasons may include, for example, malicious or other reasons. One example includes requests made for research by an academic institution by one or more students or professors. While not malicious in the traditional sense, these requests may be categorized as malicious by the system since they tie up a large amount of company resources and do not require a free response by law. Anticompetitive requests by one or more competitors may be maliciously submitted with the intention to expend company time and resources. Requests by disgruntled former employees may be submitted for nefarious reasons. Requests from a particular country or geographic region may have malicious interests in tying up the resources of the company by submitting excessive or frivolous DSARs 102. Requests from a particular political group may be made with malicious interests in tying up the resources of the company. Similarly, one or more protesting groups or organizations may have the purpose of submitting one or more DSARs 102 to expend time and resources of the company and its employees. It should be appreciated that the disclosure herein encompasses any response fulfillment constraints based on the submission of any DSAR 102 that is not submitted for lawful, legitimate reasons.

In various embodiments, the system is configured to maintain a database of the identified one or more requestors and sources (e.g., in computer memory). In particular embodiments, the database may store a listing of identities, data sources, etc. that have been found (e.g., by the system) to result in one or more response fulfillment constraints that lead to a denial of the request or a fulfillment subject to one or more processing fees. This listing is stored in One or More Databases 140 or reside on One or More Third Party Servers 160 (FIG. 7, discussed below) as Fulfillment Constraint Data 106. As mentioned above, in one particular embodiment, the in One or More Databases 140 or One or More Third Party Servers 160 includes a Third Party Repository Server 104, as shown in FIG. 50.

The Third Party Repository Server 104 acts as a central data-storage repository (e.g., one or more servers, databases, etc.), for the centralized storage of personally identifiable information (PII) and/or Personal Data 108 for one or more particular data subjects. In particular embodiments, the Third Party Repository Server 104 may enable the system to populate one or more data models (e.g., using one or more suitable techniques described herein) substantially on-the-fly (e.g., as the system collects, processes, stores, etc. Personal Data 108 regarding a particular data subject). In this way, in particular embodiments the system is configured to maintain a substantially up-to-date data model for a plurality of data subjects (e.g., each particular data subject for whom the system collects, processes, stores, etc. Personal Data 108). The system may then be configured to substantially automatically respond to one or more data access requests by a data subject (e.g., individual, entity, organization, etc.), for example, using the substantially up-to-date data model.

A particular organization may undertake a plurality of different privacy campaigns, processing activities, etc. that involve the collection and storage of Personal Data 108. In some embodiments, each of the plurality of different processing activities may collect redundant data (e.g., may collect the same Personal Data 108 for a particular individual more than once), and may store data and/or redundant data in one or more particular locations (e.g., on one or more different servers, in one or more different databases, etc.). In this way, a particular organization may store Personal Data 108 in a plurality of different locations which may include one or more known and/or unknown locations. As such, complying with particular privacy and security policies related to Personal Data 108 (e.g., such as responding to one or more requests by data subjects related to their Personal Data 108) may be particularly difficult (e.g., in terms of cost, time, etc.). Accordingly, utilizing and maintaining a Third Party Repository Server 104 for PII may enable the system to more quickly and accurately respond to DSARs 102 and other requests related to collected, stored, and processed Personal Data 108.

In various embodiments, a Third Party Repository Server 104 is configured to facilitate the receipt and centralized storage of Personal Data 108 for each of a plurality of respective data subjects. In particular embodiments, the system may be configured to: (1) receive Personal Data 108 associated with a particular data subject (e.g., a copy of the data, a link to a location of where the data is stored, etc.); and (2) store the Personal Data 108 in a suitable data format (e.g., a data model, a reference table, etc.) for later retrieval.

In particular embodiments, the Third Party Repository Server 104 is configured to: (1) receive an indication that a first party system (e.g., entity) has collected and/or processed a piece of Personal Data 108 for a data subject; (2) determine a location in which the first party system has stored the piece of Personal Data 108; (3) optionally digitally store (e.g., in computer memory) a copy of the piece of Personal Data 108 and associate, in memory, the piece of Personal Data 108 with the data subject; and (4) optionally digitally store an indication of the storage location utilized by the first party system for the piece of Personal Data 108. In particular embodiments, the system is configured to provide a centralized database, for each particular data subject, of any Personal Data 108 processed and/or collected by a particular entity.

Referring again to FIG. 50, whether at a central repository such as the Third Party Repository Server 104, or at One or More Databases 140 or One or More Third Party Servers 160, the system is configured to maintain a listing of Fulfillment Constraint Data 106. This Fulfillment Constraint Data 106 may include, for example, one or more Requestors 112 identified (e.g., by a name, an organization, or other entity) as submitting excessive or other malicious DSARs 102, one or more Sources 114 of malicious DSAR 102 submissions, and/or Other Fulfillment Constraint Data Criteria 116 related to malicious submissions of DSARs 102. An example of Fulfillment Constraint Data 106 related to the identities of one or more Requestors 112 includes the number of requests previously submitted by an individual or organization and any related information, such as the dates and of any previous requests and information regarding the source of the requests (e.g., geographic location, domains and IP addresses). Other examples may include the identities of any objectionable requestors, such as disgruntled employees or individuals with a history of targeting the company with malicious attacks of any sort.

In particular embodiments, the system may, for example, maintain a database (e.g., in computer memory) of former employees that are no longer employed by the company. When comparing the identity of the requesting party with the Requestor 112 identities and corresponding information stored as Fulfillment Constraint Data 106 in the Third Party Repository Server 104, DSAR Processing and Fulfillment Server 170 may determine that being a former employee alone is not enough to subject the DSAR 102 to one or more response fulfillment constraints, specifically imposing one or more limitations such as a fulfillment of the request subject to a processing fee or denial of the request. Rather, the DSAR Processing and Fulfillment Server 170 may impose one or more limitations only if a former employee is further flagged or identified with a malicious history of requests (e.g., excessive requests or requests exceeding a threshold number) or potential for malicious requests. With respect to determining that a requestor possesses a potential for malicious requests, this potential may be stored as a rating or value assigned to the Requestor 112 in the Fulfillment Constraint Data 106 based on historical actions or special circumstances with respect to the requestor's departure from the company. It should be appreciated that any criteria may be used to determine that the Requestor 112 is subject to one or more response fulfillment constraints within the limits of guiding laws and regulations.

According to other embodiments, an example of Fulfillment Constraint Data 106 related to the identities of one or more Requestors 112 includes a customer history associated with the data subjects. The customer history may include one or more spending characteristics of the one or more Requestors 112, as well as any complaint history of the one or more Requestors 112. For example, the spending characteristics or other applicable relationship that a Requestor 112 has with the company may be a factor in determining whether the company fulfills the DSAR 102 at no cost even though not legally obligated to do so, fulfills the DSAR 102 for a processing fee, or denies the DSAR 102. In one embodiment, if a second or subsequent DSAR 102 is received from a Requestor 112 within a threshold period of time (e.g., within a year of the first DSAR 102), then the company may determine that it is worth expending the necessary resources to fulfill the DSAR 102 at no cost, even though not legally required to do so, because the Requestor 112 is a good customer or holds a particular standing or status recognized by the company. In making this determination, the DSAR Processing and Fulfillment Server 170 may determine if the one or more spending characteristics of the Requestor 112 includes an amount spent over a reference time period that exceeds a spending threshold. If so, for example, the DSAR Processing and Fulfillment Server 170 may fulfill the DSAR 102 after requesting one or more processing fees.

Similar to a purchase history, a complaint history may be valuable Fulfillment Constraint Data 106 utilized by the system to determine how or if to respond to the DSAR 102. For example, it may be beneficial to fulfill a second or subsequent DSAR 102 from a Requestor 112 that has never submitted a complaint or bad review of the company during a substantial period of time even though that subsequent DSAR 102 does not legally require a response at no cost. Conversely, it may be determined that the benefits of fulfilling a subsequent DSAR 102 at no cost from a person with an extensive complaint history outweigh the costs of denying or charging a fee for the request. It should be appreciated that any quantity and type of weighting and prioritization of Fulfillment Constraint Data 106 may be utilized in a decision to fulfill, fulfill with limitations, or deny a DSAR 102. Regardless of the precise manner in which the Fulfillment Constraint Data 106 is used by the DSAR Processing and Fulfillment Server 170 in determining the action to take on the DSAR 102, the data used in the determination may be digitally attached to the identity of the Requestor 112 and stored in the Third Party Repository Server 104 (or One or More Databases 140 or One or More Third Party Servers 160) as Fulfillment Constraint Data 106.

An example of Fulfillment Constraint Data 106 related to one or more Sources 114 of malicious DSAR 102 submissions includes a particular domain and/or a particular IP address. If a requestor submits an excessive quantity of DSARs 102 using the same computer, then the DSAR Processing and Fulfillment Server 170 may store the domain or IP address associated with those electronic submission as Fulfillment Constraint Data 106 to identify that domain or IP address as a Source 114 of malicious DSAR 102 submissions. In doing so, future DSARs 102 originating from the domain or IP address stored as Fulfillment Constraint Data 106 will be identified by the DSAR Processing and Fulfillment Server 170 as being malicious or potentially malicious. According to one embodiment, one or more particular domains or IP addresses associated with a competitor of the company are stored as Fulfillment Constraint Data 106 to identify that competitor's domain or IP address as a Source 114 of malicious DSAR 102 submissions. A subsequent search by the DSAR Processing and Fulfillment Server 170 for Fulfillment Constraint Data 106 associated with a DSAR 102 will result in a determination that the DSAR 102 originated from a competitor, which flags the submission as being potentially malicious.

Another example of Fulfillment Constraint Data 106 related to one or more Sources 114 of malicious DSAR 102 submissions includes a geographic location or region from which the DSAR 102 is submitted. For example, if the DSAR 102 originates from a country or specific geographic region commonly affiliated with a terrorist or other organization that may spam requests to disrupt the company's operation and response to valid requests, then that country or geographic region may be stored as Fulfillment Constraint Data 106 that flags DSARs 102 originating from that country or geographic region as being malicious or potentially malicious.

Similarly, Fulfillment Constraint Data 106 may include identifications of political groups or organizations, protesting groups or organizations that commonly protest or object to the operations of the company, religious groups or organizations, or any other group or organization that may have views, beliefs, or causes that are contrary to those of the company. Any DSARs 102 submitted by a Requestor 112 or a Source 114 that may be affiliated with these groups or organizations may be flagged as being malicious or potentially malicious.

Handling of DSARs that are flagged or otherwise identified as being malicious or potentially malicious may be guided by company policy, applicable laws, and/or regulations. According to various embodiments, if the DSAR 102 is subject to one or more response fulfillment constraints, as determined from the presence of applicable Fulfillment Constraint Data 106 associated with the request, then the DSAR Processing and Fulfillment Server 170 acts on the DSAR 102 according to One or More Limitations 192. The One or More Limitations 192 may include a Fulfillment Action 180 or a Deny Action 190. The Fulfillment Action 180 includes fulfilling the DSAR 102 conditional upon payment of a processing fee. The Deny Action 190 includes denying or rejecting the DSAR 102.

If the DSAR Processing and Fulfillment Server 170 acts on the DSAR 102 according to One or More Limitations 192, then a Notification 194 is provided to the requestor. According to various embodiments, the Notification 194 includes a reason for the One or More Limitations 192, such as the presence of one or more response fulfillment constraints. The Notification 194 may further provide the requestor of their right to communicate with a supervisory authority regarding the One or More Limitations 192, and inform the requestor of their right to a judicial remedy without delay. The Notification 194 may include any information mandated by applicable law or regulations, or desired according to company policy.

In addition to providing the Notification 194 to the requestor upon acting on the DSAR 102 according to One or More Limitations 192, the DSAR Processing and Fulfillment Server 170 may store or identify Supporting Documents 118 in the Third Party Repository Server 104. Judicial or other review actions taken by a supervisory authority after the denial of a DSAR 102, or fulfillment requiring a payment of a processing fee, may require documentation that identifies the applicable Fulfillment Constraint Data 106 and supports the associated response fulfillment constraints. In this situation, the Third Party Repository Server 104 provides a central storage location for the Supporting Documents 118. It should be appreciated that the Supporting Documents 118 may include links or locations to the electronic or physical documentation stored in locations outside of the Third Party Repository Server 104 (e.g., One or More Databases 140 or One or More Third Party Servers 160).

FIG. 51 illustrates a routine 5100 for responding to a data subject access request 102. A processor 202 associated with the DSAR Processing and Fulfillment Server 170 may perform this process. The routine 5100 begins at operation 5102, where the DSAR Processing and Fulfillment Server 170 receives a DSAR 102. At operation 5104, the DSAR Processing and Fulfillment Server 170 validates the identity of the Requestor 112 in the manner described above. The DSAR Processing and Fulfillment Server 170 determines at operation 5106 whether the DSAR 102 is subject to response fulfillment constraints. As discussed in detail above, this operation may include searching for Fulfillment Constraint Data 106 in a Third Party Repository Server 104 or other database, server, or combination thereof.

If the DSAR Processing and Fulfillment Server 170 does not find applicable Fulfillment Constraint Data 106, then the routine 5100 proceeds from operation 5106 to operation 5108, where the DSAR Processing and Fulfillment Server 170 takes a Fulfillment Action 180 and processes or fulfills the DSAR 102 and the routine 5100 ends. However, if at operation 5106, the DSAR Processing and Fulfillment Server 170 finds applicable Fulfillment Constraint Data 106, then the routine 5100 proceeds from operation 5106 to operation 5110, where the DSAR Processing and Fulfillment Server 170 provides a Notification 194 to the Requestor 112 and ensures Supporting Documents 118 are properly stored or indexed to support the One or More Limitations 192 imposed on the DSAR 102. At operation 5112, the DSAR Processing and Fulfillment Server 170 takes the appropriate action according to the One or More Limitations 192 and the process 5100 ends. As discussed above, the One or More Limitations 192 may result in the DSAR 102 being fulfilled after payment of a processing fee, or a Deny Action 190.

Turning now to FIG. 52, a routine 5200 for responding to a data subject access request while maintaining fulfillment constraint data will be discussed according to particular embodiments. The routine 5200 begins at operation 5202, where the DSAR Processing and Fulfillment Server 170 stores Fulfillment Constraint Data 106 in One or More Databases 140, One or More Third Party Servers 160, or a Third Party Repository Server 104. The Fulfillment Constraint Data 106 may be associated with a Requestor 112, a Source 114 of a DSAR 102, or any Other Fulfillment Constraint Data Criteria 116 related to the DSAR 102. At operation 5204, the DSAR Processing and Fulfillment Server 170 receives a DSAR 102. At operation 5206, the DSAR Processing and Fulfillment Server 170 retrieves Fulfillment Constraint Data 106 related to the DSAR 102 and takes action based on the DSAR 102 and the Fulfillment Constraint Data 106 at operation 5208. As previously discussed, the action may include fulfilling the request, denying the request, or fulfilling the request after payment of a processing fee. Finally, at operation 5210, the Fulfillment Constraint Data 106 is updated to reflect the current DSAR 102 and associated information related to the Requestor 112 and Source 114, and the routine 5200 ends.

Figure 4:
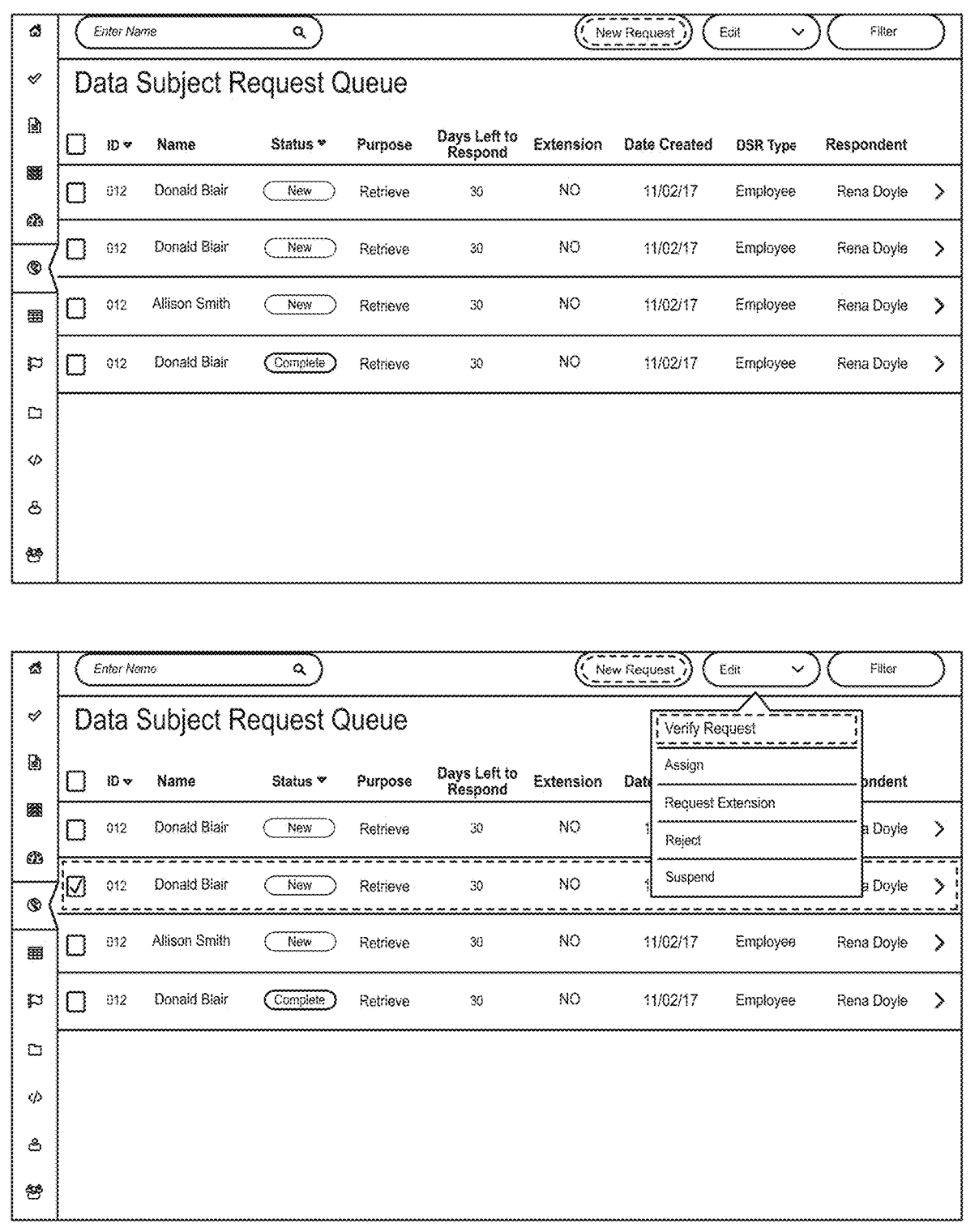
Figure 5:
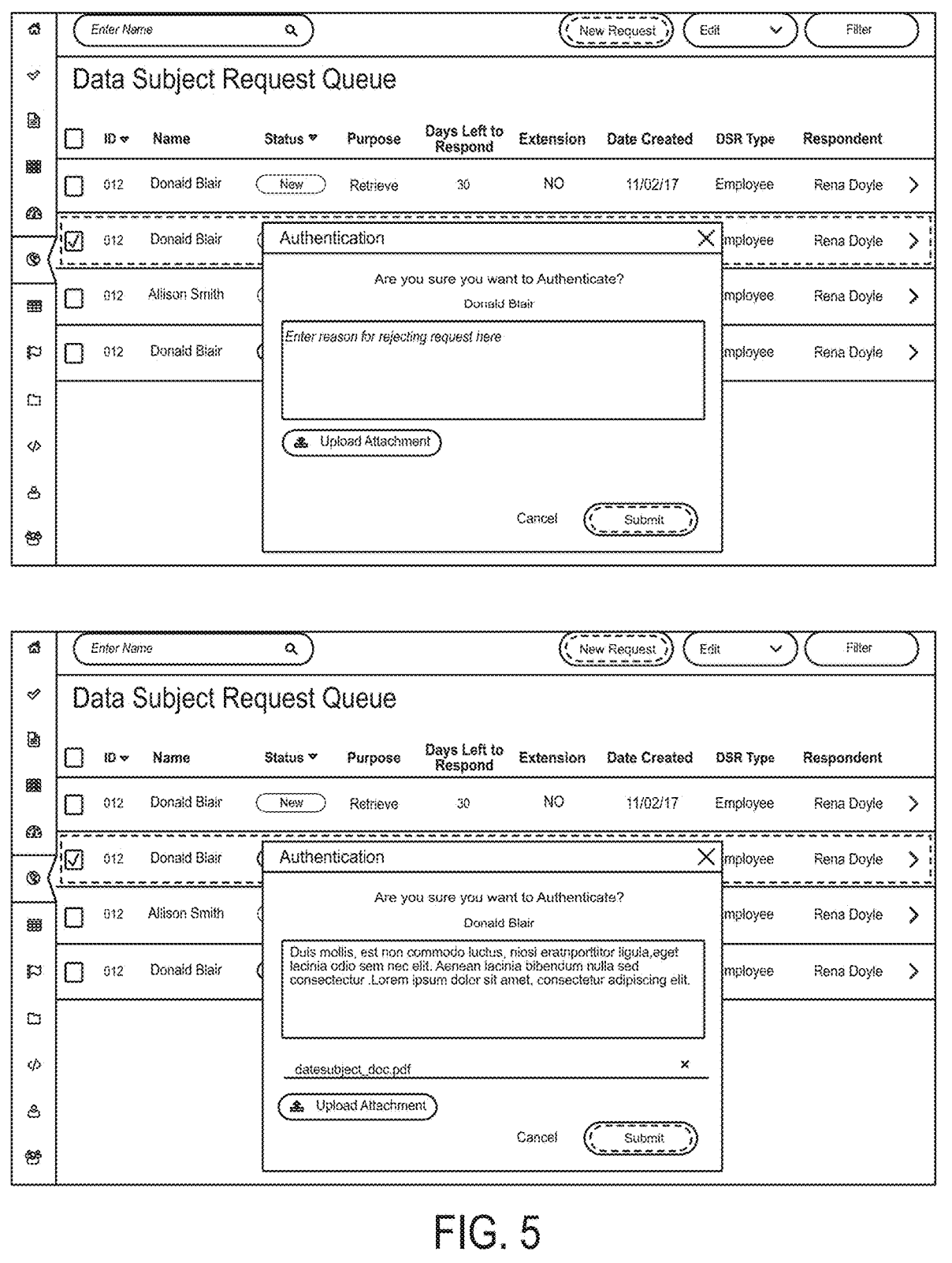

Returning now to FIG. 4, FIG. 4 depicts a queue of pending data subject access requests. As shown in this figure, the first three listed data subject access requests are new and require verification before processing and fulfillment can begin. As shown in this figure, a user (e.g., such as a privacy officer or other privacy controller) may select a particular request, and select an indicia for verifying the request. The user may also optionally select to reject the request. FIG. 5 depicts an authentication window that enables the user to authenticate a particular request. In various embodiments, the user may provide an explanation of why the user is authenticating the request (e.g., because the requestor successfully completed on or more out-of-wallet questions or for any other suitable reason). The user may further submit one or more attachments to support the verification. In this way, the system may be configured to document that the authentication process was performed for each request (e.g., in case there was an issue with improperly fulfilling a request, the company could show that they are following procedures to prevent such improper processing). In other embodiments, the system may enable the user to provide similar support when rejecting a request (e.g., because the requestor was blacklisted, made excessive requests, etc.).

Data Subject Access Request Fulfillment Cost Determination

In various embodiments, as may be understood in light of this disclosure, fulfilling a data subject access request may be particularly costly. In some embodiments, a company may store data regarding a particular data subject in multiple different locations for a plurality of different reasons as part of a plurality of different processing and other business activities. For example, a particular data subject may be both a customer and an employee of a particular company or organization. Accordingly, in some embodiments, fulfilling a data subject access request for a particular data subject may involve a plurality of different information technology (IT) professionals in a plurality of different departments of a particular company or organization. As such, it may be useful to determine a cost of a particular data subject access request (e.g., particularly because, in some cases, a data subject is entitled to a response to their data subject access request as a matter of right at no charge).

In particular embodiments, in response to receiving a data subject access request, the system may be configured to: (1) assign the request to at least one privacy team member; (2) identify one or more IT teams required to fulfill the request (e.g., one or more IT teams associated with one or more business units that may store Personal Data 108 related to the request); (3) delegate one or more subtasks of the request to each of the one or more IT teams; (4) receive one or more time logs from each individual involved in the processing and fulfillment of the data subject access request; (5) calculate an effective rate of each individual's time (e.g., based at least in part on the individual's salary, bonus, benefits, chair cost, etc.); (6) calculate an effective cost of fulfilling the data subject access request based at least in part on the one or more time logs and effective rate of each of the individual's time; and (7) apply an adjustment to the calculated effective cost that accounts for one or more external factors (e.g., overhead, etc.) in order to calculate a cost of fulfilling the data subject access request.

In particular embodiments, the system is configured to substantially automatically track an amount of time spent by each individual involved in the processing and fulfillment of the data subject access request. The system may, for example, automatically track an amount of time between each individual opening and closing a ticket assigned to them as part of their role in processing or fulfilling the data subject access request. In other embodiments, the system may determine the time spent based on an amount of time provided by each respective individual (e.g., the individual may track their own time and submit it to the system).

In various embodiments, the system is configured to measure a cost of each particular data subject access request received, and analyze one or more trends in costs of, for example: (1) data subject access requests over time; (2) related data subject access requests; (3) etc. For example, the system may be configured to track and analyze cost and time-to-process trends for one or more social groups, one or more political groups, one or more class action groups, etc. In particular, the system may be configured to identify a particular group from which the system receives particularly costly data subject access request (e.g., former and/or current employees, members of a particular social group, members of a particular political group, etc.).

In particular embodiments, the system may be configured to utilize data subject access request cost data when processing, assigning, and/or fulfilling future data subject access requests (e.g., from a particular identified group, individual, etc.). For example, the system may be configured to prioritize requests that are expected to be less costly and time-consuming (e.g., based on past cost data) over requests identified as being likely more expensive. Alternatively, the system may prioritize more costly and time-consuming requests over less costly ones in the interest of ensuring that the system is able to respond to each request in a reasonable amount of time (e.g., within a time required by law, such as a thirty-day period, or any other suitable time period). Moreover, the cost data associated with processing, assigning, and/or fulfilling data subject access requests may be a factor utilized by the DSAR Processing and Fulfillment Server 170 in determining whether to deny a DSAR 102 or request a processing fee prior to fulfilling a DSAR 102 after determining that the DSAR 102 is subject to one or more response fulfillment constraints, as discussed above.

Customer Satisfaction Integration with Data Subject Access Requests

In various embodiments, the system may be configured to collect customer satisfaction data, for example: (1) as part of a data subject access request submission form; (2) when providing one or more results of a data subject access request to the data subject; or (3) at any other suitable time. In various embodiments, the customer satisfaction data may be collected in the form of a suitable survey, free-form response questionnaire, or other suitable satisfaction data collection format (e.g., thumbs up vs. thumbs down, etc.).

FIG. 6 depicts an exemplary customer satisfaction survey that may be included as part of a data subject access request form, provided along with the results of a data subject access request, provided in one or more messages confirming receipt of a data subject access request, etc. As shown in the figure, the customer satisfaction survey may relate to how likely a customer (e.g., a data subject) is to recommend the company (e.g., to which the data subject has submitted the request) to a friend (e.g., or colleague). In the example shown in FIG. 6, the satisfaction survey may relate to a Net Promoter score (NPS), which may indicate a loyalty of a company's customer relationships. Generally speaking, the Net Promoter Score may measure a loyalty that exists between a provider and a consumer. In various embodiments, the provider may include a company, employer, or any other entity. In particular embodiments, the consumer may include a customer, employee, or other respondent to an NPS survey.

In particular embodiments, the question depicted in FIG. 6 is the primary question utilized in calculating a Net Promoter Score (e.g., "how likely is it that you would recommend our company/product/service to a friend or colleague?"). In particular embodiments, the question is presented with responses ranging from 0 (not at all likely) to 10 (extremely likely). In particular embodiments, the question may include any other suitable scale. As may be understood from FIG. 6, the system may be configured to assign particular categories to particular ratings on the 10-point scale. The system may be configured to track and store responses provided by consumers and calculate an overall NPS score for the provider. The system may be further configured to generate a visual representation of the NPS score, including a total number of responses received for each particular score and category as shown in FIG. 6.

In various embodiments, the system may be configured to measure data related to any other suitable customer satisfaction method (e.g., in addition to NPS). By integrating a customer satisfaction survey with the data subject access request process, the system may increase a number of consumers that provide one or more responses to the customer satisfaction survey. In particular embodiments, the system is configured to require the requestor to respond to the customer satisfaction survey prior to submitting the data subject access request.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general-purpose computer, special-purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

Figure 7:
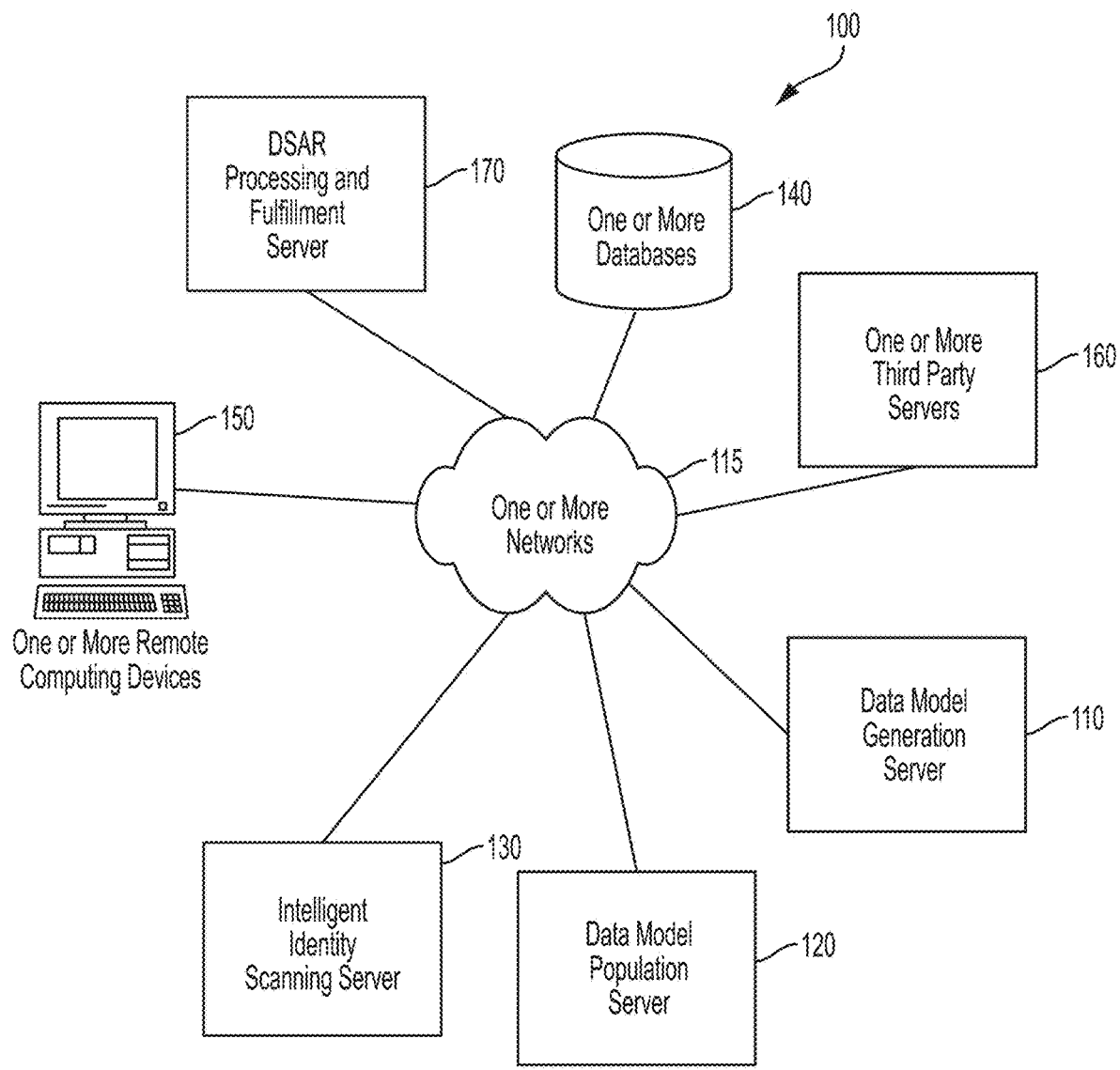
FIG. 7 depicts a data subject request processing and fulfillment system according to particular embodiments.

FIG. 7 is a block diagram of a data subject access request processing and fulfillment system 100 according to a particular embodiment. In various embodiments, the data subject access request processing and fulfillment system is part of a privacy compliance system (also referred to as a privacy management system), or other system, which may, for example, be associated with a particular organization and be configured to aid in compliance with one or more legal or industry regulations related to the collection and storage of Personal Data 108.

As may be understood from FIG. 7, the data subject access request processing and fulfillment system 100 includes one or more computer networks 115, a Data Model Generation Server 110, a Data Model Population Server 120, an Intelligent Identity Scanning Server 130, One or More Databases 140 or other data structures, one or more remote computing devices 150 (e.g., a desktop computer, laptop computer, tablet computer, smartphone, etc.), and One or More Third Party Servers 160. In particular embodiments, the one or more computer networks 115 facilitate communication between the Data Model Generation Server 110, Data Model Population Server 120, Intelligent Identity Scanning Server 130, One or More Databases 140, one or more remote computing devices 150 (e.g., a desktop computer, laptop computer, tablet computer, smartphone, etc.), One or More Third Party Servers 160, and DSAR Processing and Fulfillment Server 170. Although in the embodiment shown in FIG. 1, the Data Model Generation Server 110, Data Model Population Server 120, Intelligent Identity Scanning Server 130, One or More Databases 140, one or more remote computing devices 150 (e.g., a desktop computer, laptop computer, tablet computer, smartphone, etc.), One or More Third Party Servers 160, and DSAR Processing and Fulfillment Server 170 are shown as separate servers, it should be understood that in other embodiments, one or more of these servers and/or computing devices may comprise a single server, a plurality of servers, one or more cloud-based servers, or any other suitable configuration.

The one or more computer networks 115 may include any of a variety of types of wired or wireless computer networks such as the Internet, a private intranet, a public switch telephone network (PSTN), or any other type of network. The communication link between The Intelligent Identity Scanning Server 130 and the One or More Third Party Servers 160 may be, for example, implemented via a Local Area Network (LAN) or via the Internet. In other embodiments, the One or More Databases 140 may be stored either fully or partially on any suitable server or combination of servers described herein.

Figure 8:
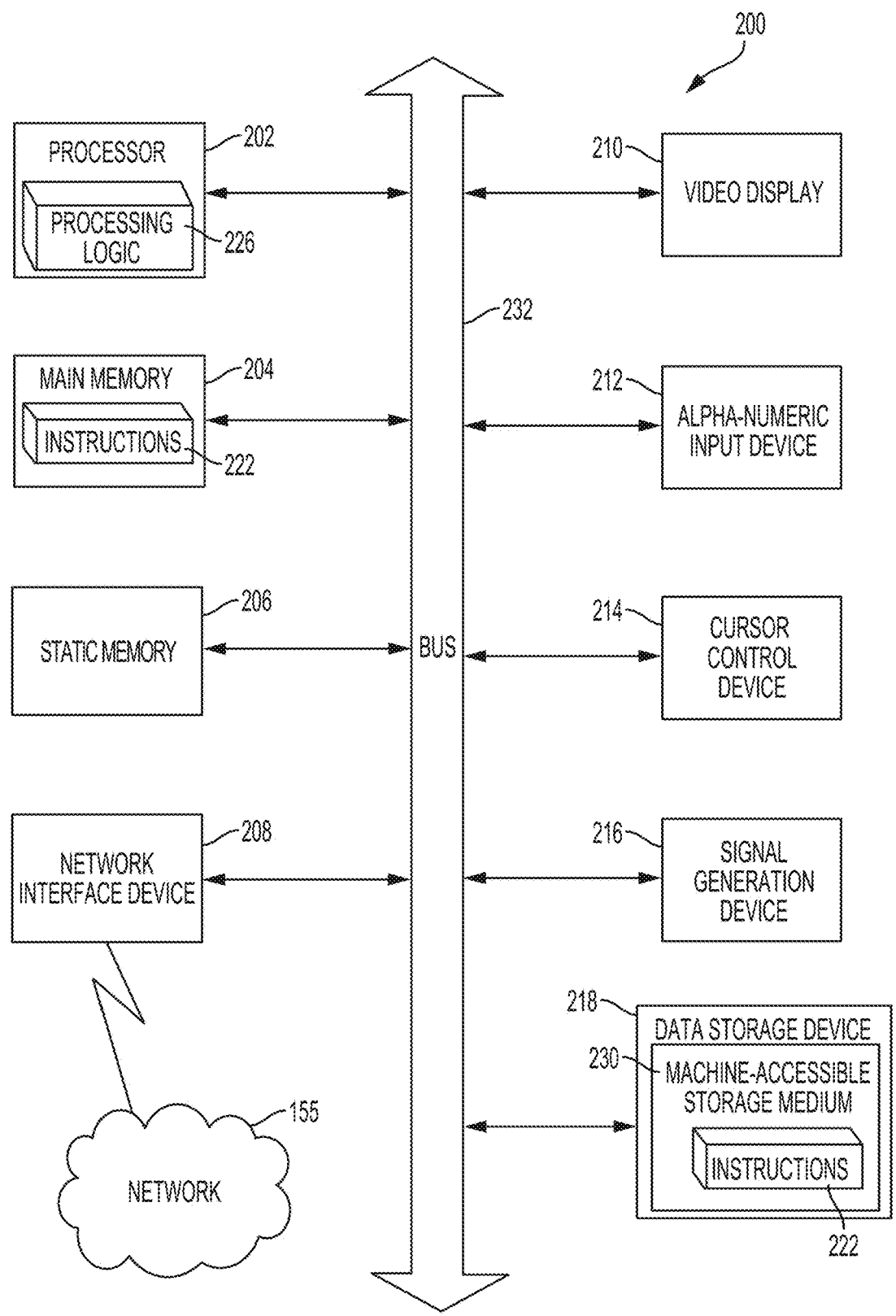
FIG. 8 is a schematic diagram of a computer (such as the data model generation server 110, or data model population server 120) that is suitable for use in various embodiments of the data subject request processing and fulfillment system shown in FIG. 7.

FIG. 8 illustrates a diagrammatic representation of a computer 200 that can be used within the data subject access request processing and fulfillment system 100, for example, as a client computer (e.g., one or more remote computing devices 150 shown in FIG. 7), or as a server computer (e.g., Data Model Generation Server 110, Data Model Population Server 120, Intelligent Identity Scanning Server 130, One or More Third Party Servers 160, and DSAR Processing and Fulfillment Server 170 shown in FIG. 7). In particular embodiments, the computer 200 may be suitable for use as a computer within the context of the data subject access request processing and fulfillment system 100 that is configured to generate a data model and map one or more relationships between one or more pieces of data that make up the model.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 200 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software instructions 222) embodying any one or more of the methodologies or functions described herein. The software instructions 222 may also reside, completely or at least partially, within main memory 204 and/or within processing device 202 during execution thereof by computer 200-main memory 204 and processing device 202 also constituting computer-accessible storage media. The software instructions 222 may further be transmitted or received over a network 115 via network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Systems for Managing Data Subject Access Requests

In various embodiments, the system may include a ticket management system and/or other systems for managing data subject access requests. Various embodiments of such systems are described below.

Overview

Ticket management systems, according to various embodiments, are adapted to receive data subject access requests (DSAR's) from particular data subjects, and to facilitate the timely processing of valid DSAR's by an appropriate respondent. In particular embodiments, the ticket management system receives DSAR's via one or more webforms that each may be accessed via an appropriate link on a respective web page. In other embodiments, the system may receive DSAR's through any other suitable mechanism, such as via a computer software application (e.g., a messaging application such as Slack, Twitter), or through entry by a representative who may receive the information, for example, via suitable paper forms or over the phone.

The ticket management system may include a webform creation tool that is adapted to allow a user to create customized webforms for receiving DSAR's from various different data subject types and for routing the requests to appropriate individuals for processing. The webform creation tool may, for example, allow the user to specify the language that the form will be displayed in, what particular information is to be requested for the data subject and/or provided by the data subject, who any DSAR's that are received via the webform will be routed to, etc. In particular embodiments, after the user completes their design of the webform, the webform creation tool generates code for the webform that may be cut and then pasted into a particular web page.

The system may be further adapted to facilitate processing of DSAR's that are received via the webforms, or any other suitable mechanism. For example, the ticket management system may be adapted to execute one or more of the following steps for each particular DSAR received via the webforms (or other suitable mechanism) described above: (1) before processing the DSAR, confirm that the DSAR request was actually submitted by the particular data subject of the DSAR (or, for example, by an individual authorized to make the DSAR request on the data subject's behalf, such as a parent, guardian, power-of-attorney holder, etc.)—any suitable method may be used to confirm the identity of the entity/individual submitting the DSAR—for example, if the system receives the DSAR via a third-party computer system, the system may validate authentication via API secret, or by requiring a copy of one or more particular legal documents (e.g., a particular contract between two particular entities)—the system may validate the identity of an individual by, for example, requiring the individual (e.g., data subject) to provide particular account credentials, by requiring the individual to provide particular out-of-wallet information, through biometric scanning of the individual (e.g., finger or retinal scan), or via any other suitable identity verification technique; (2) if the DSAR was not submitted by the particular data subject, deny the request; (3) if the DSAR was submitted by the particular data subject, advance the processing of the DSAR; (4) route the DSAR to the correct individual(s) or groups internally for handling; (5) facilitate the assignment of the DSAR to one or more other individuals for handling of one or more portions of the DSAR; and/or (6) facilitate the suspension of the data subject access request. In particular embodiments, the system may perform any one or more of the above steps automatically. The system then generates a receipt for the DSAR request that the user can use for a transactional record of their submitted request.

In particular embodiments, the ticket management system may be adapted to generate a graphical user interface (e.g., a DSAR request-processing dashboard) that is adapted to allow a user (e.g., a privacy officer of an organization that is receiving the DSAR) to monitor the progress of any the DSAR requests. The GUI interface may display, for each DSAR, for example, an indication of how much time is left (e.g., quantified in days and/or hours) before a legal and/or internal deadline to fulfill the request. The system may also display, for each DSAR, a respective user-selectable indicium that, when selected, may facilitate one or more of the following: (1) verification of the request; (2) assignment of the request to another individual; (3) requesting an extension to fulfill the request; (4) rejection of the request; or (5) suspension of the request.

As noted immediately above, and elsewhere in this application, in particular embodiments, any one or more of the above steps may be executed by the system automatically. As a particular example, the system may be adapted to automatically verify the identity of the DSAR requestor and then automatically fulfill the DSAR request by, for example, obtaining the requested information via a suitable data model and communicating the information to the requestor. As another particular example, the system may be configured to automatically route the DSAR to the correct individual for handling based at least in part on one or more pieces of information provided (e.g., in the webform).

Operation of Example Implementation

Figure 10:
Figure 11:

FIGS. 9-49 are screen shots that demonstrate the operation of a particular embodiment. FIGS. 9-12 show a graphical user interface (GUI) of an example webform construction tool. FIG. 9 shows a user working to design a webform called "Web_form_1". As may be understood from the vertical menu shown on the left-hand side of the screen, the webform construction tool allows users to design a webform by: (1) specifying the details of the form (via the "Form Details" tab); (2) defining the fields that will be displayed on the webform (via the "Webform Fields" tab); (3) defining the styling of the webform (via the "Form Styling" tab); and (4) defining various settings associated with the webform (via the "Settings" tab). As shown in FIGS. 10-12, the user may also specify text to be displayed on the webform (e.g., via a "Form Text" tab).

FIG. 10 shows that, by selecting the "Form Details" tab, the user may define which answers a requestor will be able to specify on the webform in response to prompts for information regarding what type of individual they are (customer, employee, etc.) and what type of request they are making via the webform. Example request types include: (1) a request for all Personal Data 108 that an organization is processing for the data subject (a copy of the Personal Data 108 in a commonly used, machine-readable format); (2) a request for all such Personal Data 108 to be deleted; (3) a request to update Personal Data 108 that the organization is storing for the data subject; (4) a request to opt out of having the organization use the individual's personal information in one or more particular ways (e.g., per the organization's standard business practices); (5) file a complaint; and/or (6) other.

FIG. 11 shows that, by selecting the "Settings" tab, the user may specify various system settings, such as whether Captcha will be used to verify that information is being entered by a human, rather than a computer.

Figure 12:
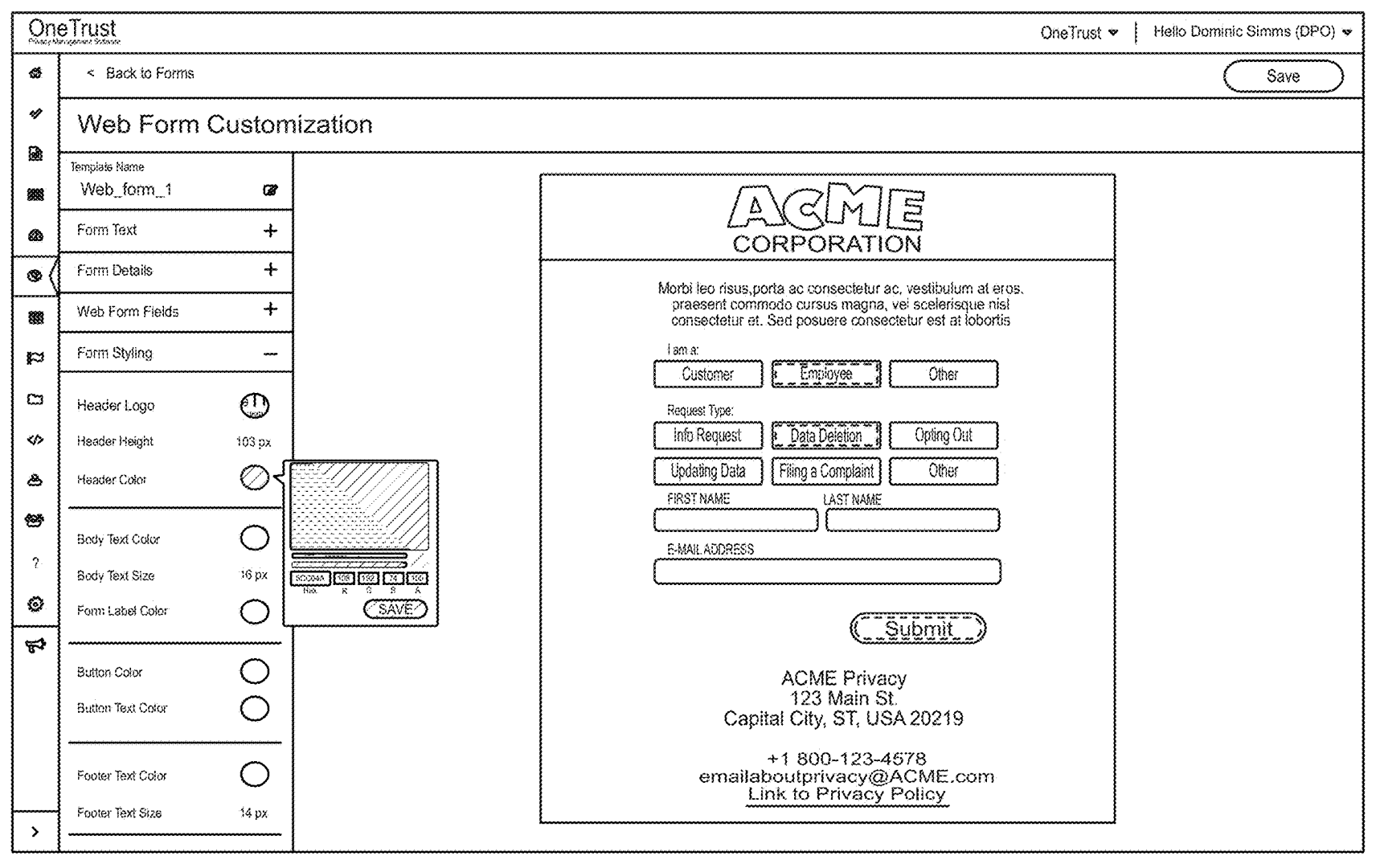

FIG. 12 shows that, by selecting the Form Styling tab, the user may specify the styling of the webform. The styling may include, for example: (1) a header logo; (2) header height; (3) header color; (4) body text color; (5) body text size; (6) form label color; (7) button color; (8) button text color; (9) footer text color; (10) footer text size; and/or any other suitable styling related to the webform.

In other embodiments, the system is configured to enable a user to specify, when configuring a new webform, what individual at a particular organization (e.g., company) will be responsible for responding to requests made via the webform. The system may, for example, enable the user to define a specific default sub-organization (e.g., within the organization) responsible for responding to DSAR's submitted via the new webform. As such, the system may be configured to automatically route a new DSAR made via the new webform to the appropriate sub-organization for processing and fulfillment. In various embodiments, the system is configured to route one or more various aspects of the DSAR to one or more different sub-organizations within the organization.

In still other embodiments, the system is configured to enable a user generating webforms to assign multiple webforms to multiple different suborganizations within an organization. For example, an organization called ACME, Inc. may have a website for each of a plurality of different brands (e.g., sub-organizations) under which ACME sells products (e.g., UNICORN Brand T-shirts, GRIPP Brand Jeans, etc.). As may be understood in light of this disclosure, each website for each of the particular brands may include an associated webform for submitting DSAR's. Each respective webform may be configured to route a DSAR made via its associated brand website to a particular sub-organization within ACME for handling DSAR's related to the brand.

As noted above, after the user uses the webform construction tool to design a particular webform for use on a particular web page, the webform construction tool generates code (e.g., HTML code) that may be pasted into the particular web page to run the designed webform page.

Figure 13:
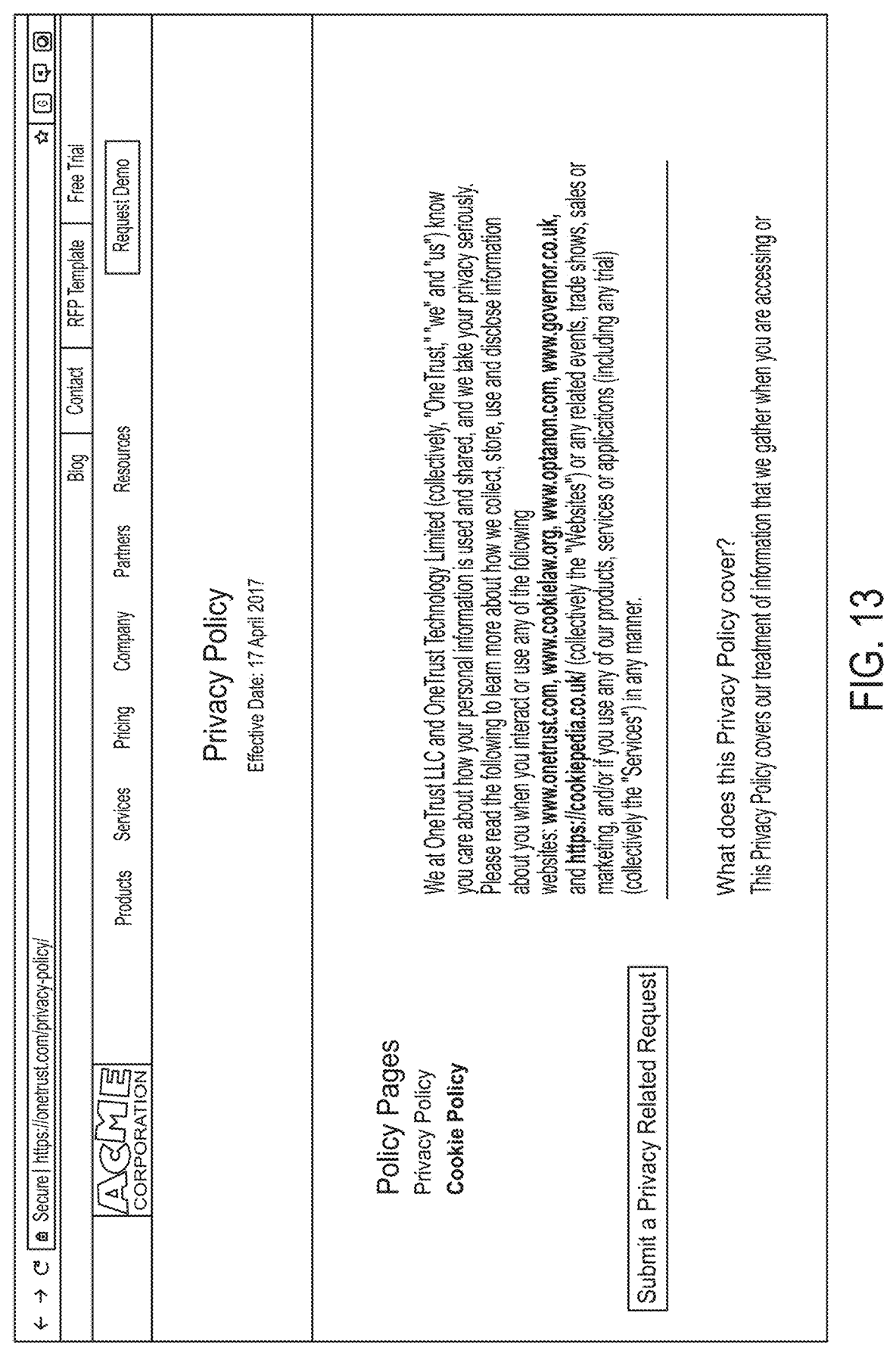

FIG. 13 shows the privacy webpage of a company (e.g., the ACME corporation). As shown in this figure, a requestor may submit a DSAR by selecting a "Submit a Privacy Related Request" button on the web page.

Figure 14:

FIG. 14 shows a webform that is displayed after a requestor selects the "Submit a Privacy Related Request" button on the privacy webpage of FIG. 13. As may be understood from this figure, the requestor may complete the webform by specifying which type of user they are, and what type of request they are making. The webform also asks the requestor to provide enough personal information to confirm their identity (e.g., and fulfill the request). As shown in this figure, the system may prompt a user submitting a DSAR to provide information such as, for example: (1) what type of requestor the user is (e.g., employee, customer, etc.); (2) what the request involves (e.g., requesting info, opting out, deleting data, updating data, etc.); (3) first name; (4) last name; (5) email address; (6) telephone number; (7) home address; (8) one or more other pieces of identifying information; and/or (9) one or more details associated with the request. FIG. 15 shows an example populated version of the webform.

As shown in FIG. 16, after a requestor completes the webform and selects a "submit" indicia, the system displays a message to the requestor indicating that their DSAR has been successfully submitted. The system also displays a Request ID associated with the request. In response to the requestor successfully submitting the request, the system may also send an email to the requestor confirming the request. An example of a suitable confirmation email is shown in FIG. 17.

In various embodiments, the system includes a dashboard that may be used by various individuals within an organization (e.g., one or more privacy officers of an organization) to manage multiple DSAR requests. As discussed above, the dashboard may display DSAR's submitted, respectively, to a single organization, any of multiple different sub-organizations (divisions, departments, subsidiaries etc.) of a particular organization, and/or any of multiple independent organizations. For example, the dashboard may display DSAR's that were submitted from a parent organization and from the parent organization's U.S. and European subsidiaries. This may be advantageous, for example, because it may allow an organization to manage all DSAR requests of all of its sub-organizations centrally.

FIGS. 18-29, 31-33, 35-40, and 45-47 depict various example user-interface screens of a DSAR request-management dashboard. As may be understood from FIG. 18, after an appropriate user (e.g., a privacy officer associated with a particular organization) logs into the system, the system may display a Data Subject Request Queue that may, for example, display a listing of all data subject access requests that the appropriate individual has been designated to process. As shown in FIG. 18, each data subject access request may be represented by a respective row of information that includes: (1) an ID number for the request; (2) the name of the data subject who has submitted the request; (3) the status of the request; (4) the number of days that are left to respond to the request (e.g., according to applicable laws and/or internal procedures); (5) an indication as to whether the deadline to respond to the request has been extended; (6) a creation date of the request; (7) an indication of the type of requestor that submitted the request (customer, employee, etc.); (8) the name of the individual who has been assigned to process the request (e.g., the respondent). This screen may also include selectable "Edit" and "Filter" buttons that respectively facilitate acting on and filtering the various requests displayed on the page.

As shown in FIG. 19, in response to a respondent selecting the edit button, the system displays a dropdown menu allowing the respondent to select between taking the following actions: (1) verify the request; (2) assign the request to another individual; (3) request an extension; (4) reject the request; or (5) suspend the request.

Figure 20:
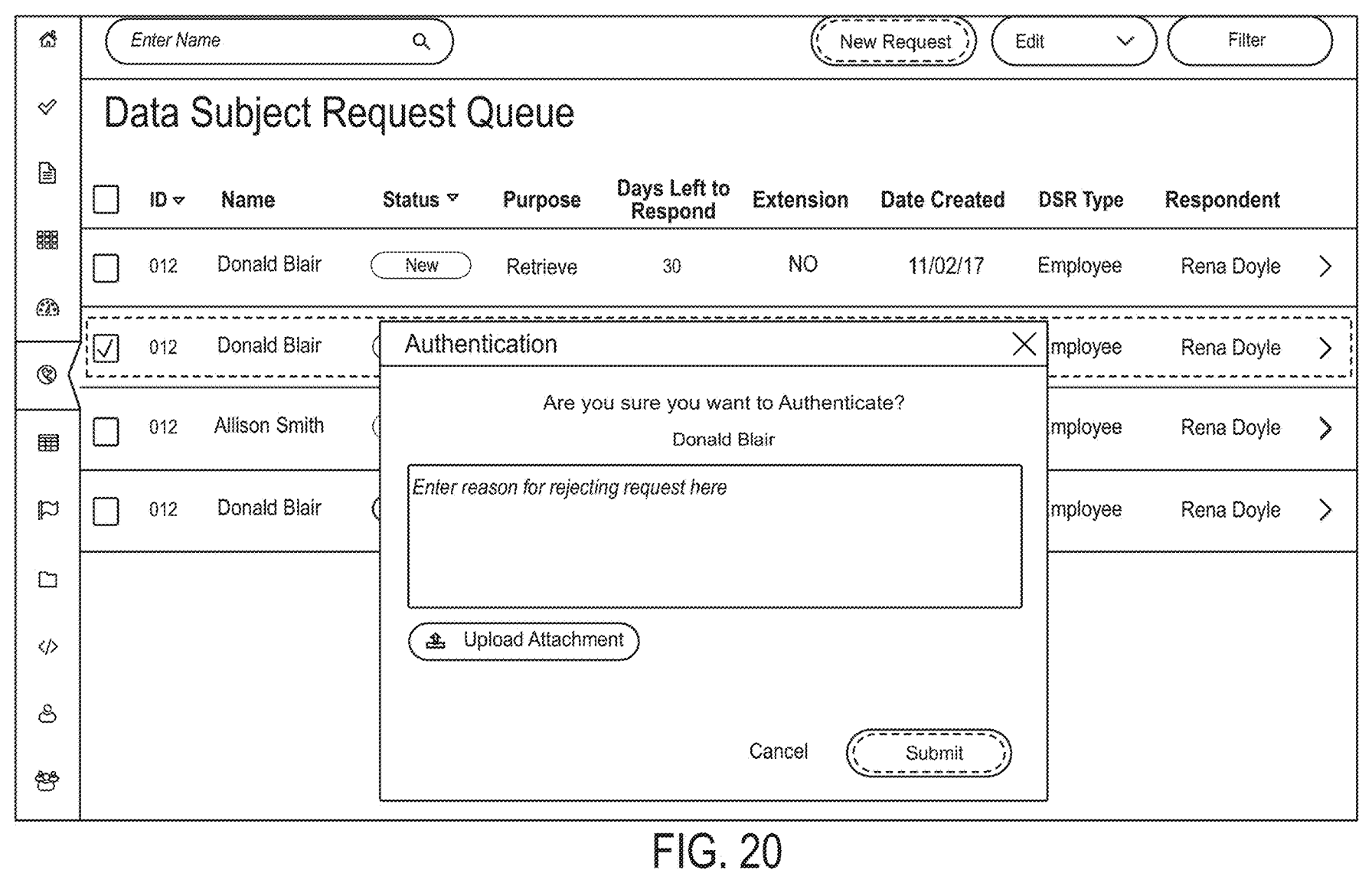
Figure 21:
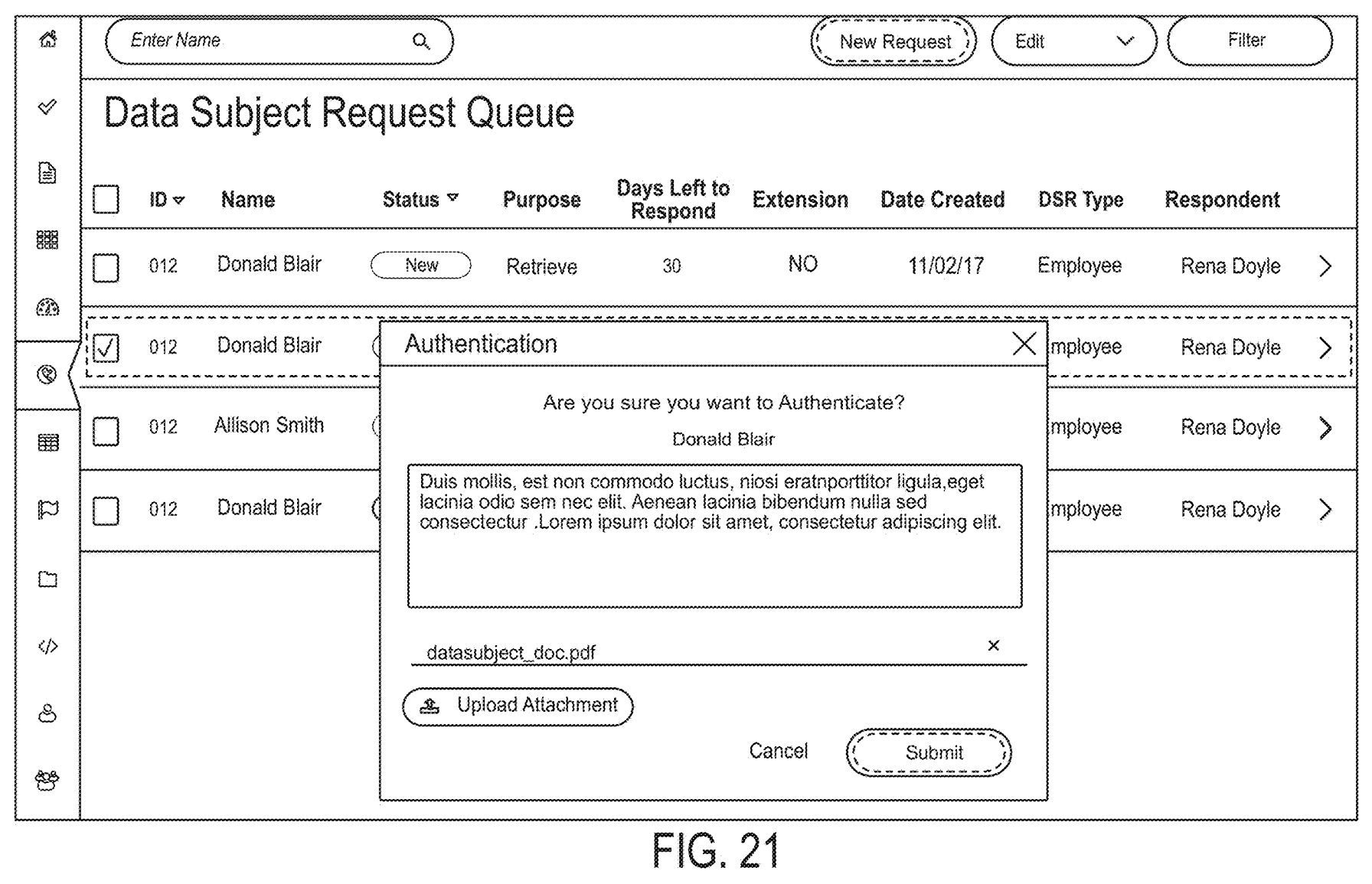

FIGS. 20 and 21 show a message that the system displays to the respondent in response to the respondent selecting the "verify" option. As shown in this figure, the system prompts the respondent to indicate whether they are sure that they wish to authenticate the request. The system also presents an input field where the respondent can enter text to be displayed to the requestor along with a request for the requestor to provide information verifying that they are the data subject associated with the request. After the respondent populates the input field, they may submit the request by selecting a "Submit" button.

In other embodiments, the input field may enable the respondent to provide one or more supporting reasons for a decision, by the respondent, to authenticate the request. The respondent may also upload one or more supporting documents (such as an attachment). The supporting documents or information may include, for example, one or more documents utilized in confirming the requestor's identity, etc.

In response to the respondent selecting the Submit button, the system changes the status of the request to "In Progress" and also changes the color of the request's status from orange to blue (or to any other suitable color)—see FIG. 22. The system also generates and sends a message (e.g., an electronic or paper message) to the requestor asking them to submit information verifying the request. The message may include the text that the respondent entered in the text box of FIGS. 20 and 21.

Figure 24:
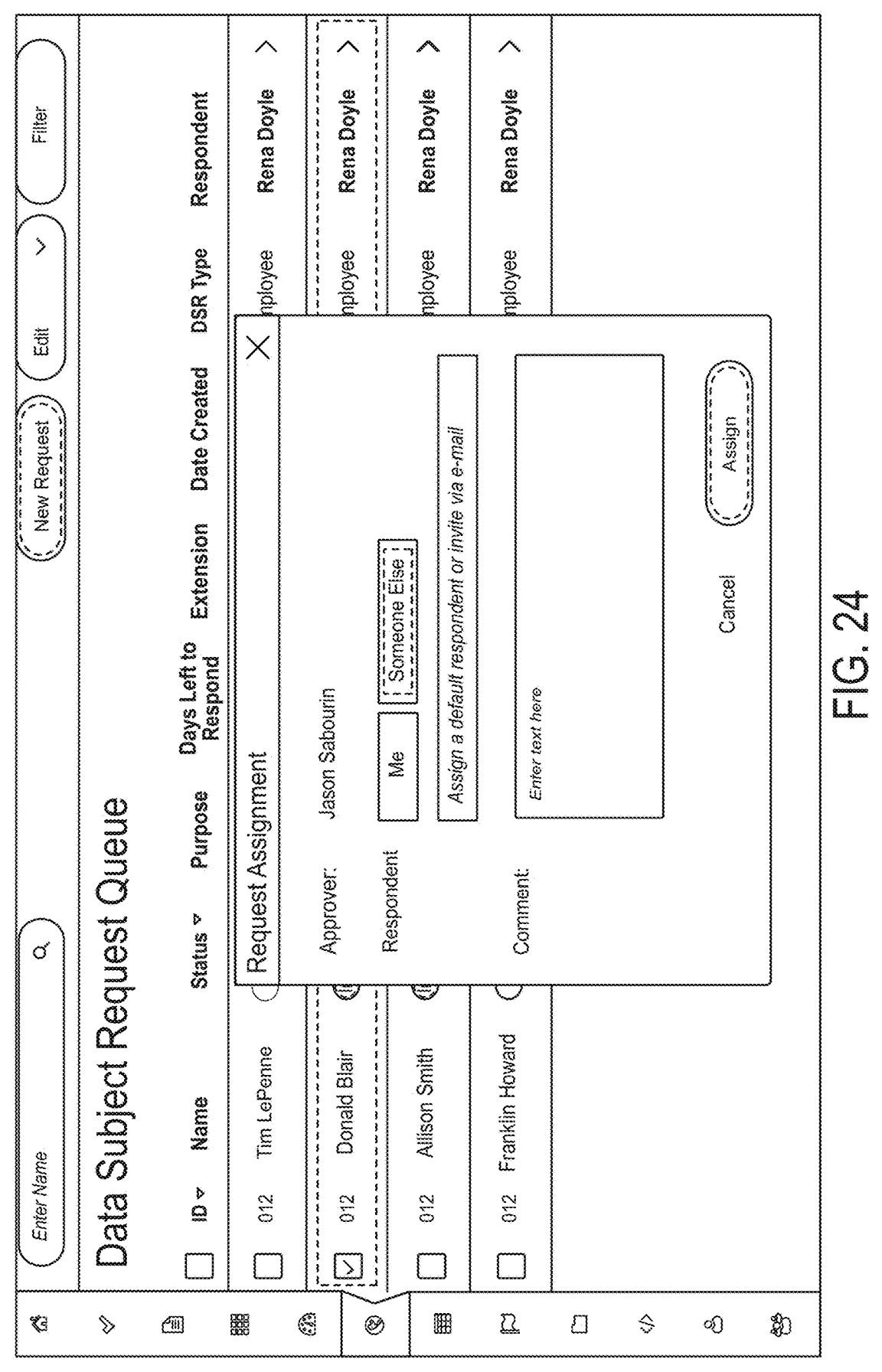

As shown in FIGS. 23-25, in response to a respondent selecting the "Edit" button and then selecting the "Assign" indicia from the displayed dropdown menu, the system displays a Request Assignment interface that allows a respondent to indicate who the request should be assigned to. For example, the respondent may indicate that they will be handling the request, or assign the request to another suitable individual, who may, for example, then be designated as the respondent for the request. If the respondent assigns the request to another individual, they may also provide an email address or other correspondence information for the individual. The Request Assignment interface includes a comment box for allowing a respondent to add a message to the individual that the assignment will be assigned to regarding the assignment. In response to the respondent selecting the "Assign" button, the system assigns the request to the designated individual for handling. If the request has been assigned to another individual, the system automatically generates and sends a message (e.g., an electronic message such as an email or SMS message) to the individual informing them of the assignment.

As shown in FIGS. 26-28, in response to a respondent selecting the "Edit" button and then selecting the "Reject" indicia from the displayed dropdown menu, the system displays a Reject Request interface. This interface includes a comment box for allowing a respondent to add a message to the requestor as to why the request was rejected. In response to the respondent selecting the "Submit" button, the system changes the status of the request to "Rejected" and changes the color of the request's status indicator to red (See FIG. 29). The system may also automatically generate a message (e.g., an electronic or paper message) to the requestor notifying them that their request has been rejected and displaying the text that the respondent entered into the Reject Request interface of FIG. 28. An example of such a message is shown in FIG. 30.

As shown in FIGS. 31-32, in response to a respondent selecting the "Edit" button and then selecting the "Request Extension" indicia from the displayed dropdown menu, the system displays a Request Extension interface. This includes a text box for allowing a user to indicate the number of days for which they would like to extend the current deadline for responding to the request. For example, the dialog box of FIG. 32 shows the respondent requesting that the current deadline be extended by 90 days. In response to the respondent entering a desired extension duration and selecting the "Submit" button, the system updates the deadline in the system's memory (e.g., in an appropriate data structure) to reflect the extension. For instance, in the example of FIG. 32, the system extends the deadline to be 90 days later than the current deadline. As shown in FIG. 33, the system also updates the "Days Left to Respond" field within the Data Subject Request Queue to reflect the extension (e.g., from 2 days from the current date to 92 days from the current date). As shown in FIG. 34, the system may also generate an appropriate message (e.g., an electronic or paper message) to the requestor indicating that the request has been delayed. This message may provide a reason for the delay and/or an anticipated updated completion date for the request.

In particular embodiments, the system may include logic for automatically determining whether a requested extension complies with one or more applicable laws or internal policies and, in response, either automatically grant or reject the requested extension. For example, if the maximum allowable time for replying to a particular request is 90 days under the controlling laws and the respondent requests an extension that would result in the fulfillment of the request 91 or more days from the date that the request was submitted, the system may automatically reject the extension request. In various embodiments, the system may also communicate, to the respondent (e.g., via a suitable electronic message or text display on a system user interface) an explanation as to why the extension request was denied, and/or a maximum amount of time (e.g., a maximum number of days) that the deadline may be extended under the applicable laws or policies. In various embodiments, if the system determines that the requested extension is permissible under the applicable laws and/or policies, the system may automatically grant the extension. In other embodiments, the system may be configured to automatically modify a length of the requested extension to conform with one or more applicable laws and/or policies.

As shown in FIGS. 35-40, a respondent may obtain additional details regarding a particular request by selecting (e.g., clicking on) the request on the Data Subject Request Queue screen. For example, FIG. 36 shows a Data Subject Request Details screen that the system displays in response to a respondent selecting the "Donald Blair" request on the user interface screen of FIG. 35. As shown in FIG. 36, the Data Subject Request Details screen shows all correspondence between the organization and the requesting individual regarding the particular data subject access request. As may be understood from FIG. 37, when a respondent selects a particular correspondence (e.g., email), the system displays the correspondence to the respondent for review or other processing.

Figure 38:
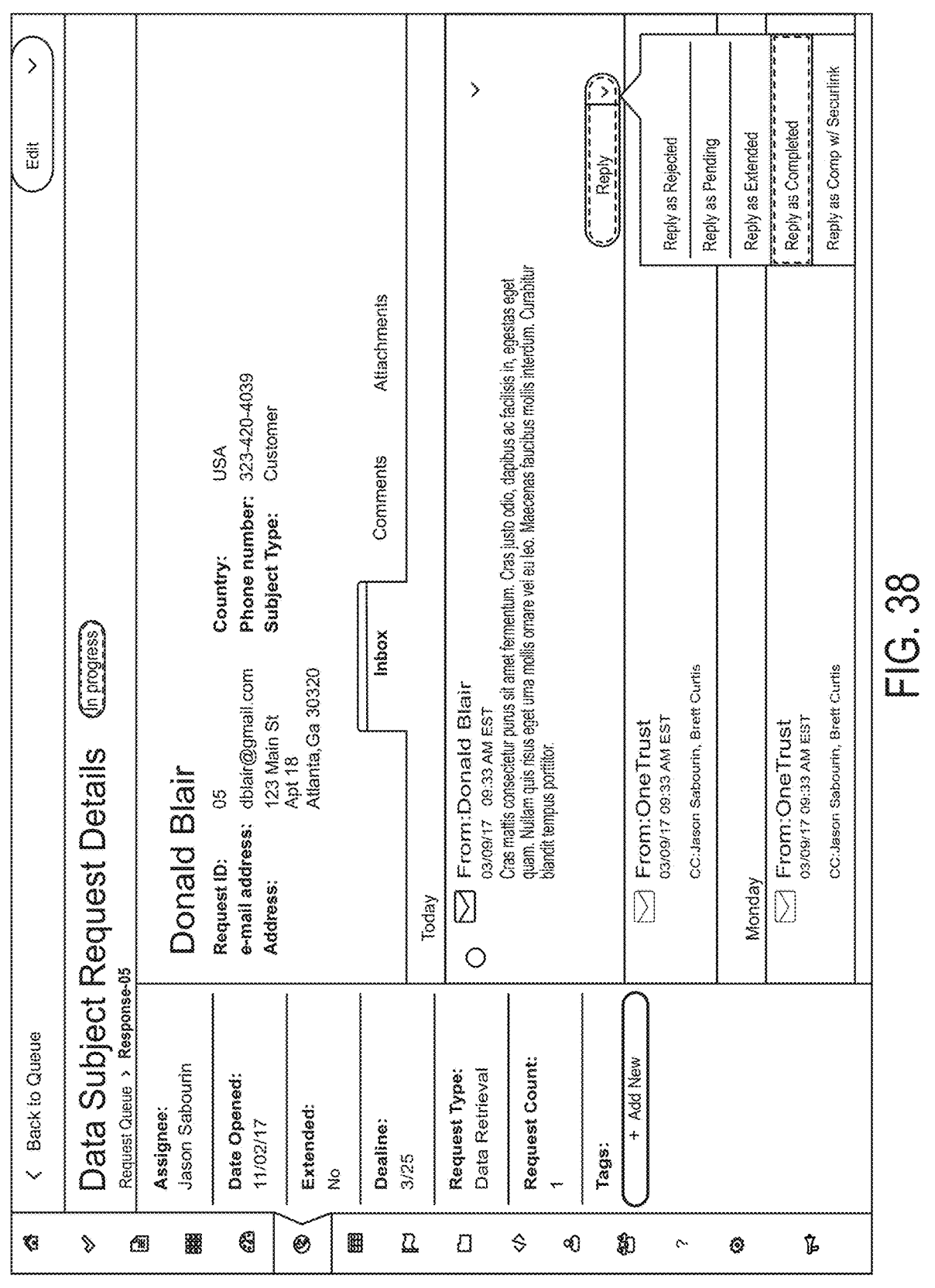

As shown in FIG. 38, in various embodiments, the system may provide a selectable "Reply" indicia that allows the respondent to reply to particular correspondence from an individual. As may be understood from this figure, in response to the respondent selecting the "Reply" indicia, the system may display a dropdown menu of various standard replies. For example, the dropdown menu may provide the option of generating a reply to the requestor indicating that the request has been rejected, is pending, has been extended, or that the request has been completed.

As shown in FIG. 39, in response to the respondent selecting "Reply as Completed", the system may display a draft email to the requestor explaining that the request has been completed. The respondent may then edit this email and send the correspondence (e.g., via email) to the requestor by selecting a "Send as Complete" indicia. As shown in FIG. 40, the system may, in response, display an indicator adjacent the correspondence indicating that the correspondence included a reply indicating that the request was complete. This may be useful in allowing individuals to understand the contents of the correspondence without having to open it.

Figure 41:
Figure 43:
Figure 45:
Figure 48:
Figure 49:
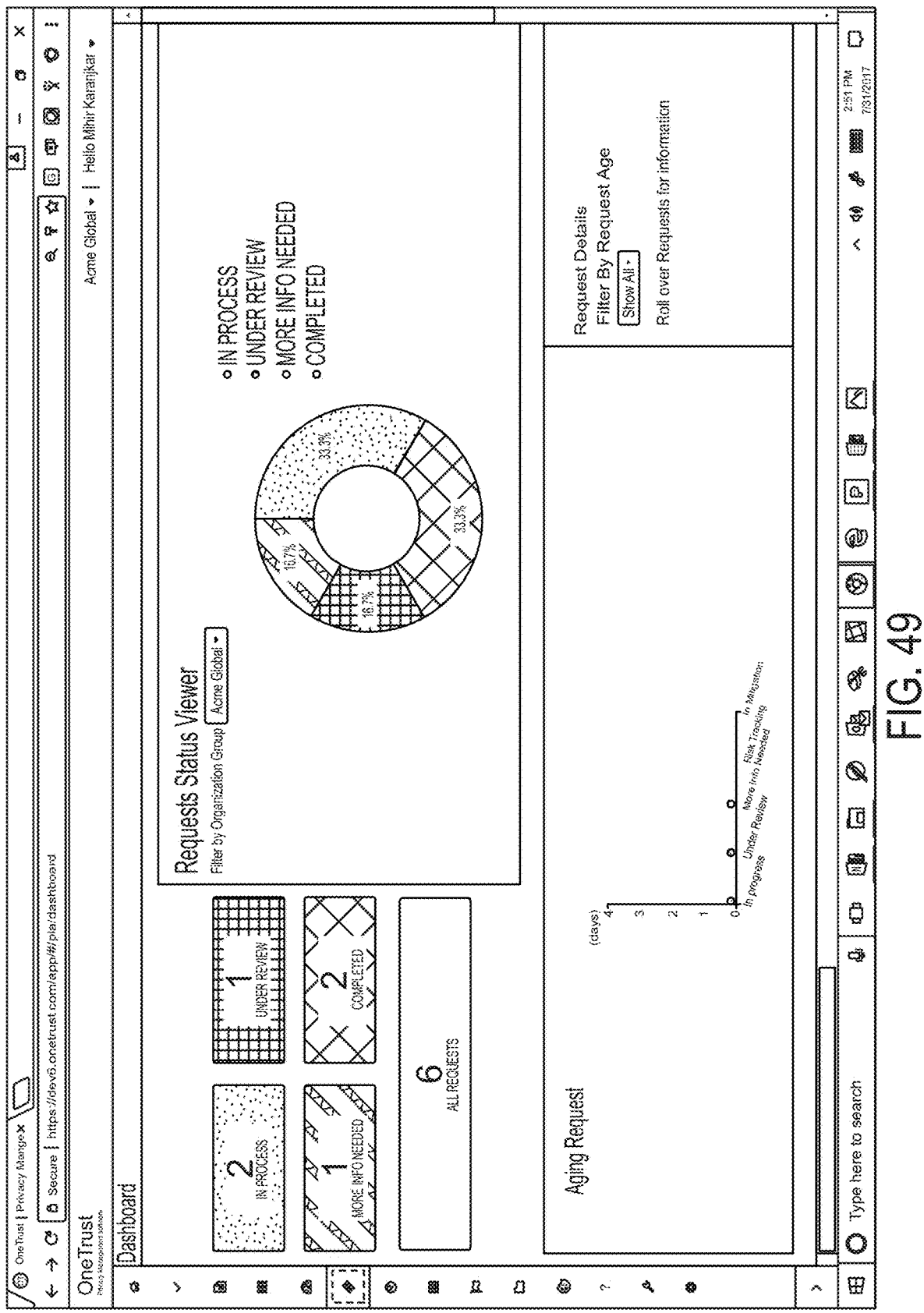

FIG. 41 shows an example email automatically generated by the system in response to the respondent selecting "Reply as Completed" on the screen shown in FIG. 38. As shown in FIG. 41, the correspondence may include a secure link that the requestor may select to access the data that was requested in the DSAR. In particular embodiments, the link is a link to a secure website, such as the website shown in FIG. 42, that provides access to the requested data (e.g., by allowing a user to download a .pdf file, or other suitable file, that includes the requested data). As shown in FIG. 42, the website may require multiple pieces of data to verify that the requestor is permitted to access the site. For example, in order to access the website, the requestor may be required to provide both the unique ID number of the request, and an authentication token, which the system may send to the user via email—See FIGS. 43 and 44.

FIGS. 45-49 are computer screen shots that depict additional user interfaces according to various embodiments.

Additional Concepts

Automated Data Subject Verification

In various embodiments, before a data subject request can be processed, the data subject's identity needs to be verified. In various embodiments, the system provides a mechanism to automatically detect the type of authentication required for a particular data subject based on the type of Data Subject Access Request being made and automatically issues a request to the data subject to verify their identity against that form of identification. For example, a subject rights request might only require two types of authentication, but a deletion request may require four types of data to verify authentication. The system may automatically detect which is type of authentication is required based on the DSAR and send an appropriate request to the data subject to verify their identity.

Intelligent Prioritization of DSAR's

In various embodiments, the system may be adapted to prioritize the processing of DSAR's based on metadata about the data subject of the DSAR. For example, the system may be adapted for: (1) in response to receiving a DSAR, obtaining metadata regarding the data subject; (2) using the metadata to determine whether a priority of the DSAR should be adjusted based on the obtained metadata; and (3) in response to determining that the priority of the DSAR should be adjusted based on the obtained metadata, adjusting the priority of the DSAR.

Examples of metadata that may be used to determine whether to adjust the priority of a particular DSAR include: (1) the type of request, (2) the location from which the request is being made, (3) current sensitivities to world events, (4) a status of the requestor (e.g., especially loyal customer), or (5) any other suitable metadata.

In various embodiments, in response to the system determining that the priority of a particular DSAR should be elevated, the system may automatically adjust the deadline for responding to the DSAR. For example, the system may update the deadline in the system's memory and/or modify the "Days Left to Respond" field (See FIG. 19) to include a fewer number of days left to respond to the request. Alternatively, or in addition, the system may use other techniques to convey to a respondent that the request should be expedited (e.g., change the color of the request, send a message to the respondent that they should process the request before non-prioritized requests, etc.)

In various embodiments, in response to the system determining that the priority of a particular DSAR should be lowered, the system may automatically adjust the deadline for responding to the DSAR by adding to the number of days left to respond to the request.

Automatic Deletion of Data Subject Records Based on Detected Systems

In particular embodiments, in response a data subject submitting a request to delete their Personal Data 108 from an organization's systems, the system may: (1) automatically determine where the data subject's Personal Data 108 is stored; and (2) in response to determining the location of the data (which may be on multiple computing systems), automatically facilitate the deletion of the data subject's Personal Data 108 from the various systems (e.g., by automatically assigning a plurality of tasks to delete data across multiple business systems to effectively delete the data subject's Personal Data 108 from the systems). In particular embodiments, the step of facilitating the deletion may comprise, for example: (1) overwriting the data in memory; (2) marking the data for overwrite; (2) marking the data as free (e.g., and deleting a directory entry associated with the data); and/or (3) any other suitable technique for deleting the Personal Data 108. In particular embodiments, as part of this process, the system uses an appropriate data model (see discussion above) to efficiently determine where all of the data subject's Personal Data 108 is stored.

Automatic Determination of Business Processes that Increase Chance of Deletion Requests In various embodiments, the system is adapted to store, in memory, a log of DSAR actions.

The system may also store, in memory, additional information regarding the data subjects of each of the requests. The system may use this information, for example, to determine which business processes are most commonly associated with a data subject submitting a request to have their personal information deleted from the organization's systems. The organization may then use this information to revise the identified business processes in an effort to reduce the number of deletion requests issued by data subjects associated with the business processes.

As a particular example, the system may analyze stored information to determine that a high number (e.g., 15%) of all participants in a company's loyalty program submit requests to have their personal information deleted from the company's systems. In response to making this determination, the system may issue an electronic alert to an appropriate individual (e.g., a privacy officer of the company), informing them of the high rate of members of the company's loyalty program issuing Personal Data 108 delete requests. This alert may prompt the individual to research the issue and try to resolve it.

CONCLUSION

Although embodiments above are described in reference to various privacy compliance monitoring systems, it should be understood that various aspects of the system described above may be applicable to other privacy-related systems, or to other types of systems, in general.

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer-implemented data processing method for responding to a data subject access request, the method comprising:
    receiving, by one or more computer processors, the data subject access request from a requestor, the data subject access request comprising one or more request parameters, the one or more request parameters comprising one or more pieces of personal data associated with the requestor;
    identifying, by the one or more computer processors, the requestor based at least in part on the one or more request parameters;
    at least partially in response to identifying the requestor, determining, by the one or more computer processors, based at least in part on the data subject access request, whether the data subject access request is subject to verification using one or more pieces of additional information associated with the requestor;
    at least partially in response to determining that the data subject access request is subject to verification using the one or more pieces of additional information associated with the requestor, soliciting, by the one or more computer processors via a graphical user interface, the one or more pieces of additional information associated with the requestor from the requestor;
    receiving, by the one or more computer processors via the graphical user interface, the one or more pieces of additional information associated with the requestor;
    determining, by the one or more computer processors, based at least in part on the one or more request parameters and the received one or more pieces of additional information associated with the requestor, whether to fulfill the data subject access request;
    at least partially in response to determining to fulfill the data subject access request, fulfilling, by the one or more computer processors, the data subject access request using the one or more request parameters; and
    at least partially in response to determining not to fulfill the data subject access request, presenting, by the one or more computer processors via the graphical user interface, a notification that the data subject access request has not been fulfilled.

2. The computer-implemented data processing method of claim 1, wherein at least one of the one or more pieces of additional information associated with the requestor is selected from a group consisting of:
    (a) a subset of a social security number associated with the requestor;
    (b) a name of a person associated with the requestor;
    (c) a place of birth associated with a person associated with the requestor; and
    (d) birth information associated with the requestor.

3. The computer-implemented data processing method of claim 1, wherein fulfilling the data subject access request comprises:
    determining, by the one or more computer processors, whether the data subject access request is subject to one or more request fulfillment constraints associated with the requestor; and
    at least partially in response to determining that the data subject access request is not subject to the one or more request fulfillment constraints, fulfilling, by the one or more computer processors, the data subject access request.

4. The computer-implemented data processing method of claim 3, wherein determining whether the data subject access request is subject to the one or more request fulfillment constraints comprises determining, by the one or more computer processors, whether the data subject request comprises one of a threshold quantity of data subject access requests from the requestor within a threshold time period.

5. The computer-implemented data processing method of claim 4, wherein determining whether the data subject request comprises one of the threshold quantity of data subject access requests from the requestor within the threshold time period is based at least in part on historical data associated with the requestor.

6. The computer-implemented data processing method of claim 1, wherein determining whether to fulfill the data subject access request comprises:
    verifying, by the one or more computer processors, the requestor based at least in part on the one or more request parameters and the one or more of the one or more pieces of additional information; and
    at least partially in response to validating the requestor, determining, by the one or more computer processors, to fulfill the data subject access request.

7. The computer-implemented data processing method of claim 1, wherein the notification that the data subject access request has not been fulfilled comprises a request for one or more processing fees prior to fulfilling the data subject access request.

8. A non-transitory computer-readable medium storing computer-executable instructions for responding to a data subject access request by:
    receiving, by one or more computer processors, the data subject access request from a data subject access request source, the data subject access request comprising one or more request parameters, the one or more request parameters comprising one or more pieces of personal data associated with a requestor;

identifying, by the one or more computer processors, the requestor based at least in part on the one or more request parameters;

at least partially in response to identifying the requestor, determining, by the one or more computer processors, based at least in part on the data subject access request, whether the data subject access request is subject to verification using one or more pieces of additional information associated with the requestor;

at least partially in response to determining that the data subject access request is subject to verification using the one or more pieces of additional information associated with the requestor, soliciting, by the one or more computer processors via a graphical user interface, one or more pieces of additional information associated with the requestor from the requestor;

receiving, by the one or more computer processors via the graphical user interface, the one or more pieces of additional information associated with the requestor;

verifying, by the one or more computer processors, the requestor based at least in part on the one or more request parameters and the one or more pieces of additional information;

at least partially in response to verifying the requestor, determining, by the one or more computer processors, based at least in part on the one or more request parameters, whether to fulfill the data subject access request;

at least partially in response to determining to fulfill the data subject access request, fulfilling, by the one or more computer processors, the data subject access request using the one or more request parameters; and at least partially in response to determining not to fulfill the data subject access request, denying, by the one or more computer processors, the data subject access request.

9. The non-transitory computer-readable medium of claim 8, wherein:
the one or more request parameters comprise one or more pieces of source data; and
the computer-executable instructions further comprise instructions for identifying, by the one or more computer processors, the data subject access request source based at least in part on the one or more pieces of source data.

10. The non-transitory computer-readable medium of claim 9, wherein determining whether to fulfill the data subject access request comprises determining, by the one or more computer processors, based at least in part on the data subject access request source, whether to fulfill the data subject access request.

11. The non-transitory computer-readable medium of claim 10, wherein determining, based at least in part on the data subject access request source, whether to fulfill the data subject access request comprise determining, by the one or more computer processors, whether one or more request fulfillment constraints are associated with the data subject access request source.

12. The non-transitory computer-readable medium of claim 8, wherein the data subject access request source is selected from a group consisting of:
(a) a particular IP address,
(b) a particular domain;
(c) a particular geographical region;
(d) a particular country; and
(e) a particular group.

13. The non-transitory computer-readable medium of claim 8, wherein fulfilling the data subject access request comprises updating, by the one or more computer processors, fulfillment constraint data associated with the data subject access request source to reflect fulfilling the data subject access request.

14. The non-transitory computer-readable medium of claim 13, wherein updating the fulfillment constraint data associated with the data subject access request source comprises updating, by the one or more computer processors, the fulfillment constraint data associated with the data subject access request source to reflect a date of fulfilling the data subject access request.

15. A system for processing data subject access requests, the system comprising:
one or more computer processors; and
a computer memory comprising a non-transitory computer-readable medium that stores computer-executable instructions for processing the data subject access requests that, when executed by the one or more computer processors, cause the one or more computer processors to perform operations comprising:
receiving a particular data subject access request from a requestor, the particular data subject access request comprising one or more request parameters, wherein the one or more request parameters comprise one or more pieces of personal data associated with the requestor;
identifying the requestor based at least in part on the one or more request parameters;
at least partially in response to identifying the requestor, determining, based at least in part on the particular data subject access request, whether the particular data subject access request is subject to verification using one or more pieces of additional information associated with the requestor;
at least partially in response to determining that the particular data subject access request is subject to verification using the one or more pieces of additional information associated with the requestor, soliciting the one or more pieces of additional information associated with the requestor from the requestor;
receiving one or more of the one or more pieces of additional information associated with the requestor;
determining, based at least in part on the one or more pieces of additional information associated with the requestor, whether the particular data subject access request is subject to one or more request fulfillment constraints associated with the requestor;
at least partially in response to determining that the particular data subject access request is subject to the one or more request fulfillment constraints, determining, based at least in part on the one or more request fulfillment constraints, whether to fulfill the particular data subject access request;
at least partially in response to determining to fulfill the particular data subject access request, fulfilling the particular data subject access request using one or more of the one or more request parameters; and
at least partially in response to determining not to fulfill the particular data subject access request taking one or more actions selected from a group of actions comprising:
(a) denying the particular data subject access request;

(b) requesting one or more processing fees prior to fulfilling the particular data subject access request; and (c) presenting a notification that the particular data subject access request has not been fulfilled.

16. The system of claim 15, wherein determining whether to fulfill the particular data subject access request is based at least in part on historical data associated with the requestor comprising one or more pieces of data selected from a group consisting of:

(a) one or more spending characteristics of the requestor;

(b) one or more complaint characteristics of the requestor; and (c) a status of the requestor.

17. The system of claim 15, wherein fulfilling the particular data subject access request using the one or more of the one or more request parameters comprises:

using the one or more of the one or more request parameters, identifying one or more second pieces of personal data associated with the requestor, the one or more second pieces of personal data being stored in one or more data repositories; and using the one or more second pieces of personal data to fulfill the particular data subject access request.

18. The system of claim 15, wherein the notification that the particular data subject access request has not been fulfilled comprises an indication of the one or more request fulfillment constraints.

19. The system of claim 15, wherein:

the one or more pieces of additional information associated with the requestor comprises a status of the requestor; and the status of the requestor comprises an indication that the requestor is associated with a competitor of an entity receiving the particular data subject access request.

20. The system of claim 15, wherein determining whether to fulfill the particular data subject access request comprises analyzing a customer history associated with the requestor using the one or more request fulfillment constraints.

* * * * *